US012659202B2

(12) United States Patent
Kuriki et al.

(10) Patent No.: US 12,659,202 B2
(45) Date of Patent: Jun. 16, 2026

(54) COMMUNICATION CONTROL APPARATUS, COMMUNICATION APPARATUS, AND COMMUNICATION CONTROL METHOD

(71) Applicant: SONY GROUP CORPORATION, Tokyo (JP)

(72) Inventors: Hiroto Kuriki, Tokyo (JP); Ryota Kimura, Tokyo (JP); Hiroki Matsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 76 days.

(21) Appl. No.: 17/593,568

(22) PCT Filed: Feb. 13, 2020

(86) PCT No.: PCT/JP2020/005654
§ 371 (c)(1),
(2) Date: Sep. 21, 2021

(87) PCT Pub. No.: WO2020/202829
PCT Pub. Date: Oct. 8, 2020

(65) Prior Publication Data
US 2022/0173944 A1 Jun. 2, 2022

(30) Foreign Application Priority Data

Mar. 29, 2019 (JP) ................................. 2019-069182

(51) Int. Cl.
*H04L 27/00* (2006.01)
*H04W 4/02* (2018.01)
(Continued)

(52) U.S. Cl.
CPC ........... *H04L 27/0006* (2013.01); *H04W 4/02* (2013.01); *H04W 28/26* (2013.01); *H04W 64/006* (2013.01)

(58) Field of Classification Search
CPC ............. H04W 72/04; H04W 72/0446; H04W 72/0453; H04W 4/029; H04W 88/02;
(Continued)

(56) References Cited

U.S. PATENT DOCUMENTS 5,862,489 A * 1/1999 Aalto .................... H04W 52/50
455/436
2009/0163215 A1 6/2009 Abedi
(Continued)

FOREIGN PATENT DOCUMENTS

CN 102763443 A 10/2012
CN 102960010 A 3/2013
(Continued)

OTHER PUBLICATIONS

International Search Report and Written Opinion of PCT Application No. PCT/JP2020/005654, issued on May 12, 2020, 08 pages of ISRWO.
(Continued)

*Primary Examiner* — Kwasi Karikari
(74) *Attorney, Agent, or Firm* — CHIP LAW GROUP

(57) ABSTRACT

A communication control apparatus includes: an action prediction range acquisition unit that acquires movement prediction range information indicating a range where a use terminal that performs secondary use of a predetermined frequency band is predicted to move; a position acquisition unit that acquires position information of the use terminal; a determination unit that determines whether or not the secondary use of the use terminal is possible based on the movement prediction range information and the position information, which have been acquired; and a notification unit that notifies the use terminal of determination of whether or not the secondary use is possible.

19 Claims, 25 Drawing Sheets

(51) Int. Cl.
    *H04W 28/26*     (2009.01)
    *H04W 64/00*     (2009.01)

(58) Field of Classification Search
    CPC ..... H04W 16/10; H04W 72/20; H04W 28/26;
            H04W 4/02; H04W 72/53; H04W 72/563;
            H04W 76/10; H04W 72/52; H04W 36/32;
            H04W 84/005; H04W 72/27; H04W 8/02;
            H04W 40/20; H04W 28/20; H04W
            36/245; H04W 4/027; H04W 4/46; H04W
                      28/18; H04W 4/16
    See application file for complete search history.

(56)            References Cited

U.S. PATENT DOCUMENTS

| | | | | |
|---|---|---|---|---|
| 2011/0143761 | A1* | 6/2011 | Uusitalo | ............... H04W 72/02 |
| | | | | 455/450 |
| 2013/0102344 | A1 | 4/2013 | Sawai | |
| 2014/0024380 | A1* | 1/2014 | Pedersen | ............ H04W 52/247 |
| | | | | 455/438 |
| 2014/0295863 | A1 | 10/2014 | Oyama et al. | |
| 2014/0315565 | A1 | 10/2014 | Ihara et al. | |
| 2015/0181596 | A1* | 6/2015 | Sridharan | ......... H04W 72/0446 |
| | | | | 455/450 |
| 2015/0230243 | A1 | 8/2015 | Sawai | |
| 2015/0254987 | A1 | 9/2015 | Altintas et al. | |
| 2016/0255508 | A1 | 9/2016 | Buchmayer et al. | |
| 2016/0278157 | A1 | 9/2016 | Sawai | |
| 2018/0270890 | A1 | 9/2018 | Sawai | |
| 2019/0289659 | A1 | 9/2019 | Sawai | |
| 2020/0068641 | A1 | 2/2020 | Sawai | |

FOREIGN PATENT DOCUMENTS

| | | |
|---|---|---|
| CN | 104012135 A | 8/2014 |
| CN | 104041100 A | 9/2014 |
| CN | 105792226 A | 7/2016 |
| DK | 3579599 T3 | 11/2021 |
| EP | 2073584 A1 | 6/2009 |
| EP | 2510719 A1 | 10/2012 |
| EP | 2592856 A1 | 5/2013 |
| EP | 2779726 A1 | 9/2014 |
| EP | 2804412 A1 | 11/2014 |
| EP | 2916505 A1 | 9/2015 |
| EP | 3170331 A1 | 5/2017 |
| EP | 3579599 A1 | 12/2019 |
| EP | 3910980 A1 | 11/2021 |
| JP | 5233653 B2 | 7/2013 |
| JP | 5617676 B2 | 11/2014 |
| JP | 5741390 B2 | 7/2015 |
| JP | 2015-171018 A | 9/2015 |
| JP | 5871015 B2 | 3/2016 |
| KR | 10-2014-0105523 A | 9/2014 |
| KR | 10-2017-0007412 A | 1/2017 |
| WO | 2011/070224 A1 | 6/2011 |
| WO | 2012/005092 A1 | 1/2012 |
| WO | 2013/069688 A1 | 5/2013 |
| WO | 2013/105220 A1 | 7/2013 |
| WO | 2015/193294 A1 | 12/2015 |

OTHER PUBLICATIONS

Wireless Innovation Forum, "CBRS Certified Professional Installer Accreditation Technical Specification", Document WINNF-TS-0247, Version V1.0.0, Oct. 16, 2017, 18 pages.

Wireless Innovation Forum, "Signaling Protocols and Procedures for Citizens Broadband Radio Service (CBRS): Spectrum Access System (SAS)—Citizens Broadband Radio Service Device (CBSD) Interface Technical Specification", Document WINNF-TS-0016, Version V1.2.1 3, Jan. 2018, 60 pages.

ECC Report 186, "Technical and operational requirements for the operation of white space devices under geo-location approach", Jan. 2013, 181 pages.

White Space Database Provider (WSDB) Contract, 2015, 125 pages.

Wireless Innovation Forum, "Signaling Protocols and Procedures for Citizens Broadband Radio Service (CBRS): Spectrum Access System (SAS)—SAS Interface Technical Specification", Document WINNF-TS-0096, Version 1.2.0, Oct. 20, 2017, 42 pages.

Wireless Innovation Forum, "Requirements for Commercial Operation in the U.S. 3550-3700 MHz Citizens Broadband Radio Service Band", Working Document WINNF-TS-0112, Version V1.4.1, Jan. 16, 2018, 77 pages.

Extended European Search Report of EP Application No. 20782156.2, issued on Mar. 23, 2022, 12 pages.

* cited by examiner

BASE STATION APPARATUS 20 /
PROXY APPARATUS 50

COMMUNICATION
CONTROL
APPARATUS 40₁

COMMUNICATION
CONTROL
APPARATUS 40₂

S41

GENERATE SPECTRUM
USE NOTIFICATION

SPECTRUM USE
NOTIFICATION          S42
(SUCH AS Heartbeat Request)

S43

EXECUTE DETERMINATION
PROCESSING

DETERMINATION RESULT S44
(SUCH AS Heartbeat Response)

BASE STATION APPARATUS 20 /
PROXY APPARATUS 50

COMMUNICATION
CONTROL
APPARATUS 40₁

COMMUNICATION
CONTROL
APPARATUS 40₂

EXCHANGE
MANAGEMENT    S51
INFORMATION

COMMUNICATION CONTROL APPARATUS, COMMUNICATION APPARATUS, AND COMMUNICATION CONTROL METHOD

CROSS REFERENCE TO RELATED APPLICATIONS

This application is a U.S. National Phase of International Patent Application No. PCT/JP2020/005654 filed on Feb. 13, 2020, which claims priority benefit of Japanese Patent Application No. JP 2019-069182 filed in the Japan Patent Office on Mar. 29, 2019. Each of the above-referenced applications is hereby incorporated herein by reference in its entirety.

FIELD

An embodiment of the present invention relates to a communication control apparatus, a communication apparatus, and a communication control method.

BACKGROUND

A problem of depletion of radio resources (wireless resources) capable of being allocated to wireless systems (wireless apparatuses) has been brought into the surface. Allocation of new radio resources to wireless systems is difficult since incumbent wireless systems (wireless apparatuses) already use every radio band. Therefore, in recent years, further effective use of radio resources by using cognitive wireless technology has started to attract attention. In the cognitive wireless technology, radio resources are generated by using temporal/spatial empty radio waves (white space) of the incumbent wireless systems.

CITATION LIST

Non Patent Literature

Non Patent Literature 1: WINNF-TS-0247-V1.0.0 CBRS Certified Professional Installer Accreditation Technical Specification.

Non Patent Literature 2: WINNF-TS-0016-V1.2.1 Signaling Protocols and Procedures for Citizens Broadband Radio Service (CBRS): Spectrum Access System (SAS)—Citizens Broadband Radio Service Device (CBSD) Interface Technical Specification Non Patent Literature 3: ECC Report 186, Technical and operational requirements for the operation of white space devices under geo-location approach, CEPT ECC, 2013 January Non Patent Literature 4: White Space Database Provider (WSDB) Contract, available at https://www.ofcom.org.uk/_data/assets/pdf_file/0026/84077/white_space_database_contract_for_operational_use_of_wsds.pdf Non Patent Literature 5: WINNF-TS-0096-V1.2.0 Signaling Protocols and Procedures for Citizens Broadband Radio Service (CBRS): Spectrum Access System (SAS)—SAS Interface Technical Specification Non Patent Literature 6: WINNF-TS-0112-V1.4.1 Requirements for Commercial Operation in the U.S. 3550-3700 MHz Citizens Broadband Radio Service Band

SUMMARY

Technical Problem

Effective use of radio resources, however, cannot always be achieved simply by using empty radio waves. For example, in order to effectively use radio resources, efficient distribution of empty radio waves to wireless systems (wireless apparatuses) is needed, but the efficient distribution of empty radio waves is not easy since there are various use modes of radio waves such as radio wave use of a mobile terminal including a mobile phone, a field pickup unit (FPU), and the like.

Therefore, the present disclosure proposes a communication control apparatus, a communication apparatus, and a control method capable of efficiently using radio resources.

Solution to Problem

To solve the above problem, a communication control apparatus according to the present disclosure includes: an action prediction range acquisition unit that acquires movement prediction range information indicating a range where a use terminal that performs secondary use of a predetermined frequency band is predicted to move; a position acquisition unit that acquires position information of the use terminal; a determination unit that determines whether or not the secondary use of the use terminal is possible based on the movement prediction range information and the position information, which have been acquired; and a notification unit that notifies the use terminal of determination of whether or not the secondary use is possible.

DESCRIPTION OF EMBODIMENTS

Figure 1:
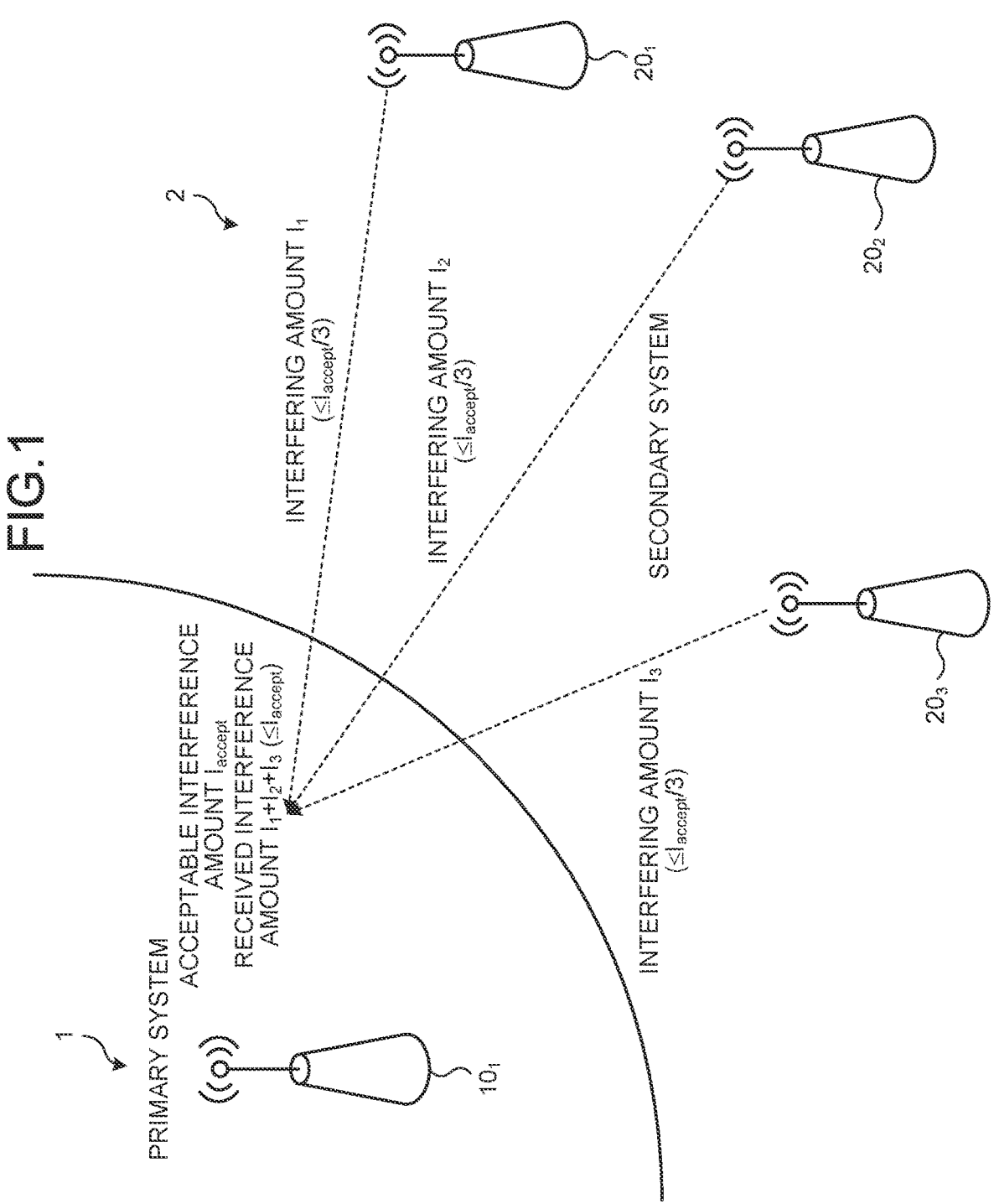
FIG. 1 is an explanatory diagram illustrating an example of distribution of an interference margin to each communication apparatus constituting a secondary system.

An embodiment of the present disclosure will be described in detail below with reference to the drawings. Note that, in the following embodiment, the same signs are attached to the same parts to omit duplicate description.

Furthermore, in the present specification and the drawings, a plurality of components having substantially the same functional configuration may be distinguished by attaching different numbers after the same signs. For example, a plurality of configurations having substantially the same functional configuration is distinguished as communication control apparatuses $40_1$ and $40_2$, as necessary. Note, however, that, when it is not necessary to particularly distinguish a plurality of components having substantially the same functional configuration, only the same signs are attached. For example, when it is not necessary to particularly distinguish the communication control apparatuses $40_1$ and $40_2$, the communication control apparatuses $40_1$ and $40_2$ are simply referred to as communication control apparatuses 40.

Furthermore, the present disclosure will be described in accordance with the following item order.

1. Introduction
1-1. Wireless System Control for Achieving Spectrum Access 1-2. Outline of Embodiment
1-3. Terms Related to Frequency and Sharing
2. Configuration of Communication System
2-1. Overall Configuration of Communication System
2-2. Configuration of Base Station Apparatus
2-3. Configuration of Terminal Apparatus
2-4. Configuration of Communication Control Apparatus
2-5. Configuration of Proxy Apparatus
3. Interference Model
4. Method of Protecting Primary System
4-1. Interference margin simultaneously distributed type
4-2. Interference Margin Sequentially Distributed Type
5. Description of Various Procedures
5-1. Registration Procedure
5-2. Available Spectrum Query Procedure
5-3. Spectrum Grant Procedure
5-4. Spectrum Use Notification
5-5. Supplement to Various Procedures
5-6. Various Procedures Regarding Terminal Apparatus
5-7. Procedure Occurring Between Communication Control Apparatuses
6. Operation Related to Grant
6-1. Initial Registration Sequence (When Current Position Is in Permitted Area)
6-2. Sequence of Determining Whether or Not Communication Can Be Continued (When Current Position Is in Permitted Area)
6-3. Sequence of Determining Whether or Not Communication Can Be Continued (First Case Where Interval Control Is Performed)
6-4. Sequence of Determining Whether or Not Communication Can Be Continued (Second Case Where Interval Control Is Performed)
6-5. Sequence of Determining Whether or Not Communication Can Be Continued (Third Case Where Interval Control Is Performed)
6-6. Initial Registration Sequence (Variation)
7. Variation
7-1. Variation Related to System Configuration
7-2. Other Variations
8. Conclusion

1. INTRODUCTION

Recent wireless environments in which various wireless systems are mixed and the increase and diversification of an amount of wirelessly communicated content bring a problem of depletion of radio resources (frequencies) capable of being allocated to the wireless systems into the surface. It has, however, been found that allocation of new radio resources is difficult since incumbent wireless systems already use every radio band. Therefore, in order to generate necessary radio resources, utilization of temporal/spatial empty radio waves (white space) in the incumbent wireless systems (dynamic spectrum access (DSA)) by using cognitive wireless technology has started to be required.

In recent years, the United States has aimed to open Federal use band (3.55 to 3.70 GHz) to the public. Federal use band overlaps a frequency band regarded worldwide as 3GPP band 42 and 43. The legalization/standardization of citizens broadband radio service (CBRS) using spectrum access technology has been accelerated. Furthermore, the cognitive wireless technology contributes not only to dynamic spectrum access but to improvement of frequency use efficiency in a wireless system. For example, inter-wireless system coexistence technology utilizing a database is specified in ETSI EN 303 387 and IEEE 802.19.1-2014.

<1-1. Wireless System Control for Achieving Spectrum Access>

In general, in the spectrum access, national regulatory authorities (NRAs) obligate primary users licensed or authorized for using a frequency band to protect a wireless system (primary system). Typically, the NRAs set an acceptable interference reference value in the primary system, and require that the interfering generated by sharing falls below the acceptable interference reference value in a wireless system (secondary system) of secondary users.

In order to achieve the spectrum access, for example, a communication control apparatus (e.g., frequency management database) controls communication of the secondary system to avoid fatal interference to the primary system. The communication control apparatus manages communication and the like between communication apparatuses. For example, the communication control apparatus is an apparatus (system) for managing geo-location database (GLDB) and radio resources (e.g., frequency) of a spectrum access system (SAS) and the like. In the case of the embodiment, the communication control apparatus corresponds to a later-described communication control apparatus 40. The communication control apparatus 40 will be described in detail later.

Here, the primary system is, for example, a system (e.g., incumbent system) that preferentially uses radio waves in a predetermined frequency band over other systems such as the secondary system. Furthermore, for example, the secondary system secondarily uses (e.g., performs dynamic spectrum access for) radio waves in a frequency band used by the primary system. Each of the primary system and the secondary system may include a plurality of communication apparatuses, or may include one communication apparatus. The communication control apparatus distributes an interference acceptable amount to one or a plurality of communication apparatuses such that the interference aggregation of one or a plurality of communication apparatuses constituting the secondary system to the primary system does not exceed an interference acceptable amount (also referred to as interference margin) of the primary system. At the time, the interference acceptable amount may be an interference amount preliminarily determined by an operator of the primary system, a public organization that manages radio waves, and the like. In the following description, the interference margin refers to the interference acceptable amount. Furthermore, the interference aggregation may be referred to as aggregated interfering power.

FIG. 1 is an explanatory diagram illustrating an example of distribution of an interference margin to each communication apparatus constituting a secondary system. In the example of FIG. 1, a communication system 1 corresponds to the primary system, and a communication system 2 corresponds to the secondary system. The communication system 1 includes a wireless communication apparatus 10₁ and the like. Furthermore, the communication system 2 includes base station apparatuses 20₁, 20₂, and 20₃, and the like. Note that, although the communication system 1 includes only one wireless communication apparatus 10 in the example of FIG. 1, the communication system 1 may include a plurality of wireless communication apparatuses 10. Furthermore, although the communication system 2 includes three base station apparatuses 20 in the example of FIG. 1, the communication system 2 may include less than three base station apparatuses 20 or more than three base station apparatuses 20. Furthermore, the wireless communication apparatus of the communication system 2 is not necessarily a base station apparatus. Note that, although only one primary system (communication system 1 in example of FIG. 1) and one secondary system (communication system 2 in example of FIG. 1) are illustrated in the example of FIG. 1, a plurality of primary systems and a plurality of secondary systems may be provided.

Each of the wireless communication apparatus 10₁ and the base station apparatuses 20₁, 20₂, and 20₃ can transmit and receive radio waves. An interference amount accepted by the wireless communication apparatus 10₁ is $I_{accept}$. Furthermore, interference amounts given to predetermined protection points of the communication system 1 (primary system) by the base station apparatuses 20₁, 20₂, and 20₃ are interfering amounts $I_1$, $I_2$, and $I_3$, respectively. Here, the protection point is an interference calculation reference point for protecting the communication system 1.

The communication control apparatus distributes the interference margin $I_{accept}$ to a plurality of base station apparatuses 20 such that the interference aggregation to a predetermined protection point of the communication system 1 (received interference amount $I_1+I_2+I_3$ in FIG. 1) does not exceed the interference margin $I_{accept}$. For example, the communication control apparatus distributes the interference margin $I_{accept}$ to each of the base station apparatuses 20 such that each of the interfering amounts $I_1$, $I_2$, and $I_3$ becomes $I_{accept}/3$. Alternatively, the communication control apparatus distributes the interference margin $I_{accept}$ to each of the base station apparatuses 20 such that each of the interfering amounts $I_1$, $I_2$, and $I_3$ becomes $I_{accept}/3$ or less. Of course, the method of distributing an interference margin is not limited to the example.

The communication control apparatus calculates a maximum transmission power (hereinafter, referred to as maximum acceptable transmission power) accepted by each of the base station apparatuses 20 based on the interference amount that has been distributed (hereinafter, referred to as distributed interference amount). For example, the communication control apparatus calculates the maximum acceptable transmission power of each of the base station apparatuses 20 by back calculation from the distributed interference amount based on propagation loss, antenna gain, and the like. Then, the communication control apparatus notifies each of the base station apparatuses 20 of information of the calculated maximum acceptable transmission power.

<1-2. Outline of Embodiment>

For example, in CBRS, television white space, and the like in the United States, a standard is determined on the assumption of protecting a primary system from a fixed station such as an access point. Furthermore, it may become necessary to protect the primary system from mobile terminals such as mobile phones and FPUs in the future. Even now, notifying a communication control apparatus that an access point has moved a certain distance is made obligatory. These are, however, merely based on the assumption of the possibility of moving an access point and the like, and it is not assumed that a mobile terminal serves as a secondary use system.

Generally, mobile terminals perform communication while moving. When there is an area that interferes in the primary system within a certain distance that needs renotification, protecting the primary system is difficult now. Moreover, when a mobile terminal moves around in an area where the interference amount does not vary much even if the mobile phone moves a certain distance, recalculation for each certain distance is not necessarily efficient.

Therefore, in the embodiment, the communication control apparatus (e.g., SAS) acquires movement prediction range information and position information of a use terminal (e.g., mobile terminal) of the secondary system. The movement prediction range information indicates a range in which the use terminal is predicted to move. Furthermore, the communication control apparatus determines whether or not the secondary use of the use terminal is possible based on the acquired movement prediction range information and position information, and notifies the use terminal of the determination about whether or not the secondary use is possible.

Figure 2:
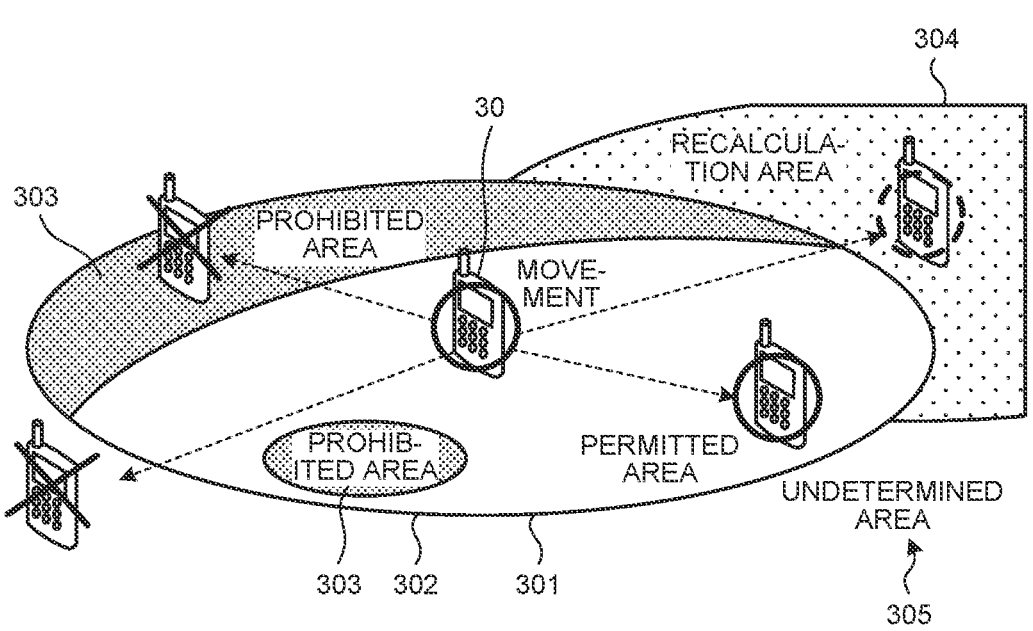
FIG. 2 is an explanatory diagram illustrating an example of whether or not radio wave use is possible based on the position of a terminal apparatus and a predicted action area.

FIG. 2 is an explanatory diagram illustrating an example of whether or not radio wave use is possible based on the position of a terminal apparatus and a predicted action area. Here, a terminal apparatus 30 in FIG. 2 corresponds to a use terminal of the secondary system. The communication control apparatus acquires the current position of the terminal apparatus 30 and a predicted movement area 301 where the terminal apparatus 30 is predicted to move. Next, the communication control apparatus preliminarily determines whether or not fatal interference is given to the primary system for the entire predicted movement area 301, and determines a permitted area 302, a prohibited area 303, and a recalculation area 304. In the permitted area 302, communication by the secondary use is permitted. In the prohibited area 303, communication by the secondary use is prohibited. The recalculation area 304 needs recalculation. Next, the communication control apparatus determines whether or not the secondary use of the terminal apparatus 30 is possible in accordance with which area the current position of the terminal apparatus 30 belongs to, for example, even if the terminal apparatus 30 has moved, and notifies the terminal apparatus 30 of the determination of whether or not the secondary use is possible.

Therefore, when moving in the permitted area 302 determined by the communication control apparatus, the terminal apparatus 30 can continue communication by the secondary use. Furthermore, when the terminal apparatus 30 is about to enter the prohibited area 303 or is about to exit to an undetermined area 305 outside a calculated area, communication by the secondary use is immediately stopped, or area recalculation is performed.

As described above, in the embodiment, the primary system can be more reliably protected even in a situation where the mobile terminal performs communication while moving. Furthermore, in the embodiment, it is possible to avoid a situation in which continuous recalculation is needed in spite of the fact that the interference amount does not vary.

<1-3. Terms Related to Frequency and Sharing>

Note that, in the embodiment, the primary system (communication system 1) and the secondary system (communication system 2) are in the environment of the dynamic spectrum access. Hereinafter, the embodiment will be described by taking CBRS, which is legislated by Federal Communications Commission (FCC) of the United States, as an example. Note that the communication system 1 and the communication system 2 of the embodiment are not limited to the CBRS.

Figure 3:
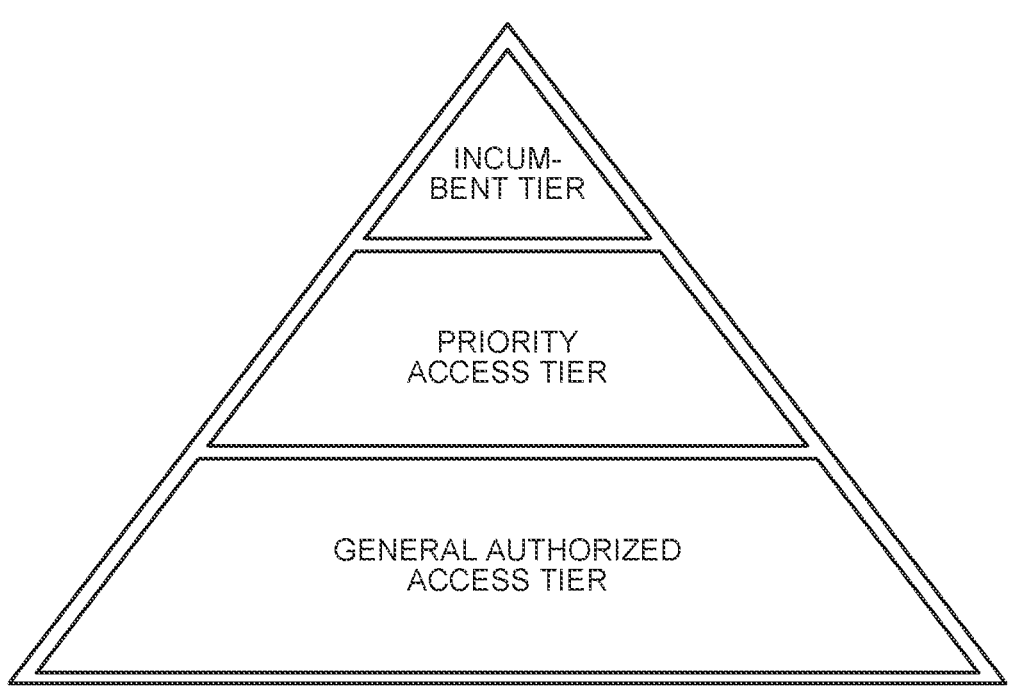
FIG. 3 is an explanatory diagram illustrating a hierarchical structure in CBRS.

FIG. 3 is an explanatory diagram illustrating a hierarchical structure in CBRS. As illustrated in FIG. 3, each of users in a frequency band is classified into one of three groups. The groups are called "tiers". In each of the three groups, a hierarchical structure including an incumbent tier, a priority access tier, and a general authorized access tier is defined. In the hierarchical structure, the priority access tier is positioned above the general authorized access tier, and the incumbent tier is positioned above the priority access tier. In an example of the CBRS, a system positioned in the incumbent tier (incumbent system) corresponds to the primary system, and a system positioned in the general authorized access tier and the priority access tier corresponds to the secondary system.

The incumbent tier is a group of incumbent users in a shared frequency band. In the CBRS, the Department of Defense (DOD), a fixed satellite operator, and a Grandfathered Wireless Broadband Licensee (GWBL) are determined as incumbent users. The "incumbent Tier" is not required to avoid or inhibit interference to the "priority access tier" and the "general authorized access (GAA) tier" with lower priority. Furthermore, the "incumbent tier" is protected from interference of the "priority access tier" and the "GAA tier". That is, users in the "incumbent tier" can use the frequency band without considering the existence of other groups.

The priority access tier is a group of users having a license called a priority access license (PAL). Although avoiding or inhibiting interference to the "incumbent tier" with higher priority than the "priority access tier" is required, avoiding or inhibiting interference to the "GAA tier" with lower priority is not required. Furthermore, the "priority access tier" is not protected from interference of the "incumbent tier" with higher priority, but are protected from interference of the "GAA tier" with lower priority. The general authorized access tier (GAA tier) is a group of all other users not belonging to the above-described "incumbent tier" and "priority access tier". Avoiding or inhibiting interference to the "incumbent tier" and the "priority access tier" with higher priority is required. Furthermore, the "GAA tier" is not protected from interference of the "incumbent tier" and the "priority access tier" with higher priority. That is, in the "GAA tier", opportunistic frequency use is legislatively required.

Note that the hierarchical structure is not limited to these definitions. The CBRS is generally called a three-tier structure, but may be a two-tier structure. One typical example includes a two-tier structure such as licensed shared access (LSA) and TV band white space (TVWS). In the LSA, a structure equivalent to the combination of the above-described "incumbent tier" and "priority access tier" is adopted. Furthermore, in the TVWS, a structure equivalent to the combination of the above-described "incumbent tier" and "GAA tier" is adopted. Furthermore, four or more tiers may be provided. Specifically, for example, an intermediate tier corresponding to the "priority access tier" may be further prioritized. Furthermore, for example, the "GAA tier" may be similarly prioritized.

Figure 4:
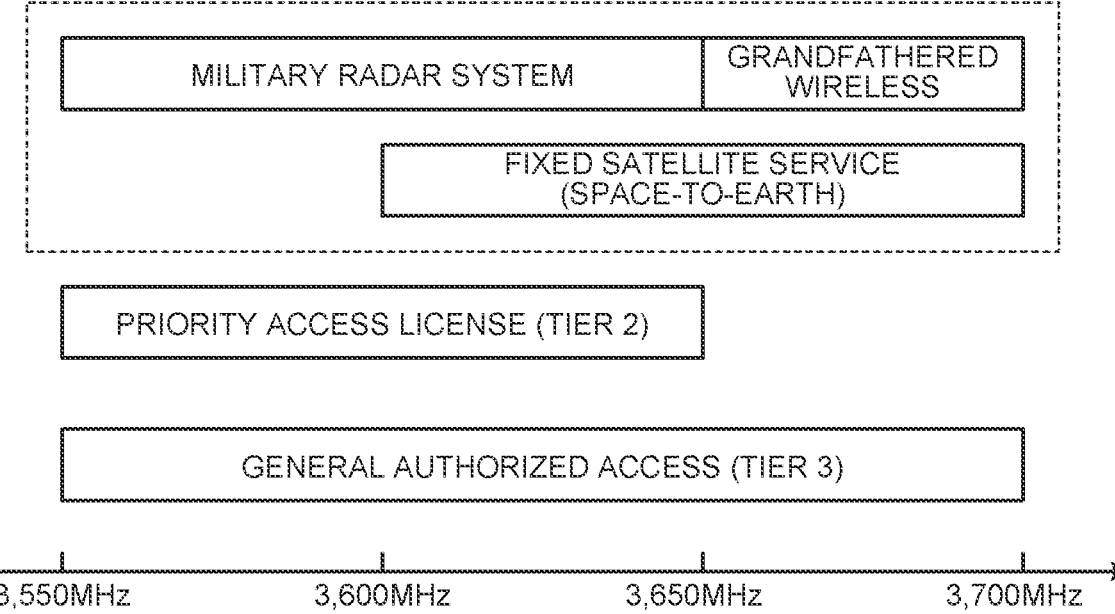
FIG. 4 is an explanatory diagram illustrating a band of the CBRS.

FIG. 4 is an explanatory diagram illustrating a band of the CBRS. In an example of the above-described CBRS, the primary system corresponds to a military radar system, a grandfathered wireless system, or fixed satellite service (space-to-earth). Here, the military radar system is typically a ship-based radar. Furthermore, the secondary system is a wireless network system including a base station and a terminal called a citizens broadband radio service device (CBSD) and an end user device (EUD). The secondary system further has priority. A priority access license (PAL) with which a shared band can be used and general authorized access (GAA) equivalent to access without needing a license are determined. A tier 1 in FIG. 4 corresponds to the incumbent tier in FIG. 3. Furthermore, a tier 2 in FIG. 4 corresponds to the priority access tier in FIG. 3. Furthermore, a tier 3 in FIG. 4 corresponds to the general authorized access tier in FIG. 3.

Note that the primary system (communication system 1) of the embodiment is not limited to the example in FIG. 4. Another type of wireless system may be used as the primary system (communication system 1). For example, another wireless system may be used as the primary system in accordance with a nation/region/frequency band to which the other wireless system is to be applied. For example, the primary system may be a television broadcasting system such as a digital video broadcasting-terrestrial (DVB-T) system. Furthermore, the primary system may be a wireless system called a fixed system (FS). Furthermore, spectrum access in another frequency band may be used. For example, one typical example includes LSA and TV band white space (TVWS). Furthermore, the primary system may be a cellular communication system such as long term evolution (LTE) and new radio (NR). Furthermore, the primary system may be an aeronautical wireless system such as aeronautical radio navigation service (ARNS). Of course, the primary system is not limited to the above-described wireless systems, and may be another type of wireless system.

Furthermore, empty radio waves (white space) used by the communication system 2 is not limited to the frequency band of the Federal use band (3.55 to 3.70 GHz). The communication system 2 may secondarily use a frequency band different from the Federal use band (3.55 to 3.70 GHz). For example, when the primary system (communication system 1) is a television broadcasting system, the communication system 2 may secondarily uses TV white space. Here, the TV white space refers to a frequency band that is not used by a television broadcasting system (primary system) among frequency channels allocated to the television broadcasting system. In the case, the TV white space may be a channel that is not used in accordance with an area.

Furthermore, the relation between the communication system 1 and the communication system 2 is not limited to the spectrum access relation in which the communication system 1 is a primary system and the communication system 2 is a secondary system. The relation between the communication system 1 and the communication system 2 may be a network coexistence relation between the same or different wireless systems using the same frequency.

In general, in the spectrum access, an incumbent system using a target band is referred to as a primary system, and a system of a secondary user is referred to as a secondary system. When the embodiment is applied to an environment other than the spectrum access environment, however, these (primary system and secondary system) may be replaced with a system of another term. For example, a macro cell in HetNet may be used as a primary system, and a small cell or a relay station may be used as a secondary system. Furthermore, a base station may be used as a primary system, and relay UE or vehicle UE that implements D2D or V2X existing in the coverage thereof may be used as a secondary system. The base station is not limited to a fixed type of base station, and may be a portable/mobile type of base station. In such a case, for example, the communication control apparatus provided by the present invention may be included in a base station, a relay station, relay UE, and the like.

Note that the term "frequency" in the following description may be replaced with another term. For example, the term "frequency" may be replaced with terms such as "resource", "resource block", "resource element", "channel", "component carrier", "carrier", and "subcarrier" or terms having similar meanings. Note that the frequency is a type of radio resource. The "radio resources" can be rephrased with "frequency resources".

2. CONFIGURATION OF COMMUNICATION SYSTEM

Hereinafter, the communication system 2 according to the embodiment of the present disclosure will be described. The communication system 2 is a wireless communication system that performs wireless communication by secondarily using a frequency band used by the communication system 1 (first wireless system). For example, the communication system 2 is a wireless communication system that performs dynamic spectrum access for a part or all of a frequency band allocated to the communication system 1. The communication system 2 provides wireless service to a user or an apparatus owned by the user by using predetermined radio access technology.

Here, the communication system 2 may be a cellular communication system such as wideband code division multiple access (W-CDMA), code division multiple access 2000 (cdma 2000), LTE, NR, and the like. In the following description, "LTE" includes LTE-Advanced (LTE-A), LTE-Advanced Pro (LTE-A Pro), and evolved universal terrestrial radio access (EUTRA). Furthermore, "NR" includes new radio access technology (NRAT) and Further EUTRA (FEUTRA). Note that the communication system 2 is not limited to the cellular communication system. For example, the communication system 2 may be another wireless communication system such as a wireless local area network (LAN) system, a television broadcasting system, an aeronautical wireless system, and a space wireless communication system.

In the embodiment, the communication system 1 corresponds to the primary system, and the communication system 2 corresponds to the secondary system. As described above, a plurality of communication systems 1 and a plurality of communication systems 2 may be provided. Note that, in the example of FIG. 1, the communication system 1 includes one wireless communication apparatus 10 (wireless communication apparatus 10₁ in FIG. 1), but may include a plurality of wireless communication apparatuses 10. The wireless communication apparatus 10 may have the same configuration as the later-described base station apparatus 20 or the terminal apparatus 30.

<2-1. Overall Configuration of Communication System>

The communication system 2 typically includes the following entities.

Communication apparatus (e.g., base station apparatus and proxy apparatus)

Terminal apparatus

Communication control apparatus

Note that, in the following description, an entity serving as a communication apparatus is the base station apparatus 20 and/or a proxy apparatus 50. The entity serving as the communication apparatus is not limited to the base station apparatus 20 and the proxy apparatus 50, and may be another communication apparatus (e.g., terminal apparatus 30 or communication control apparatus 40).

Figure 5:
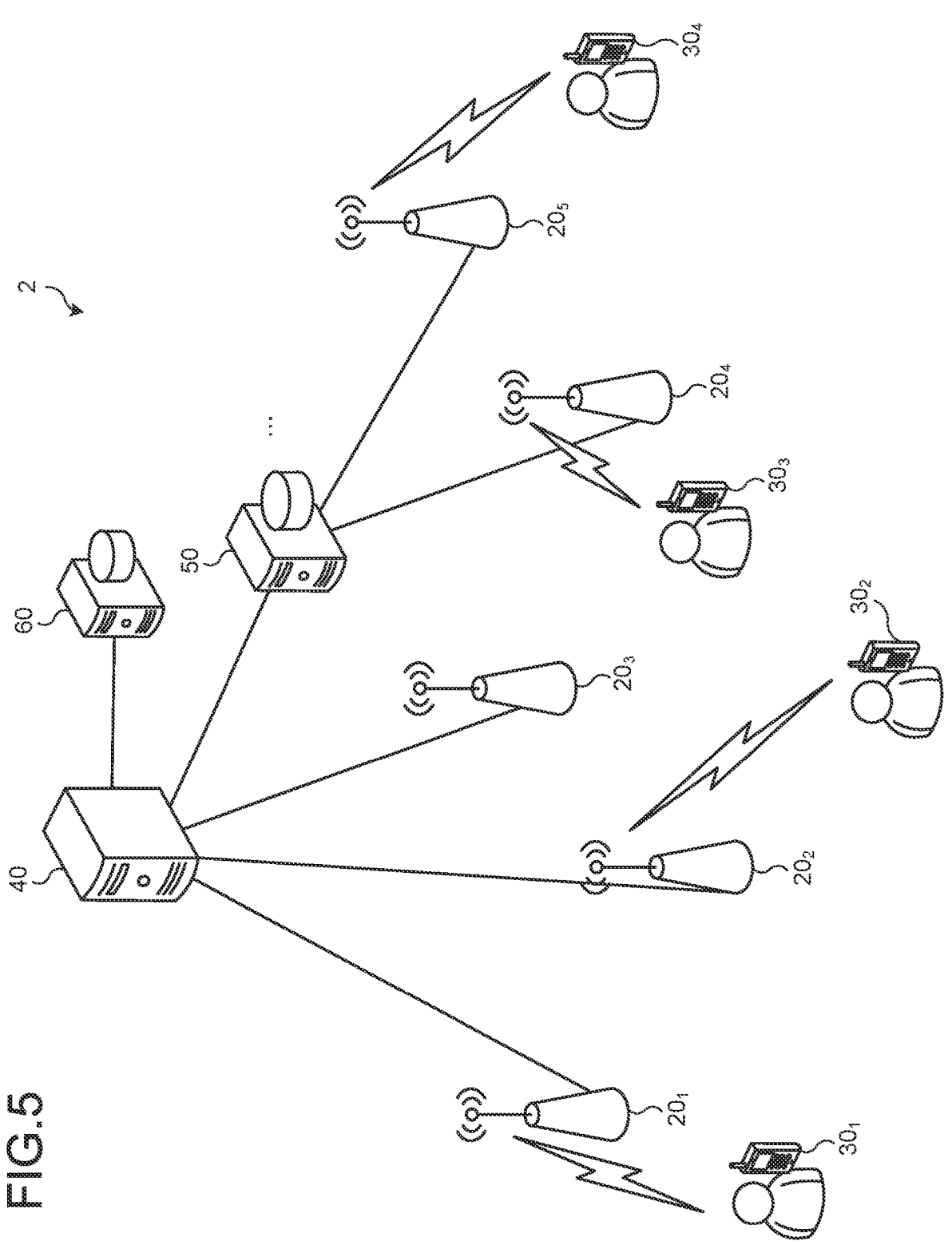
FIG. 5 illustrates a configuration example of a communication system according to an embodiment of the present disclosure.

FIG. 5 illustrates a configuration example of the communication system 2 according to the embodiment of the present disclosure. The communication system 2 includes the base station apparatus 20, the terminal apparatus 30, the communication control apparatus 40, and the proxy apparatus 50. The communication system 2 provides wireless service to a user or an apparatus owned by the user by apparatuses (e.g., communication apparatus such as wireless communication apparatus) constituting the communication system 2 operating in cooperation with each other. The wireless communication apparatus has a function of wireless communication. In the example of FIG. 5, the base station apparatus 20 and the terminal apparatus 30 correspond to the wireless communication apparatus.

Note that the communication control apparatus 40 and the proxy apparatus 50 may have a wireless communication function. In the case, the communication control apparatus 40 and the proxy apparatus 50 can also be regarded as the wireless communication apparatuses. In the following description, the wireless communication apparatus may be simply referred to as a communication apparatus. Note that the communication apparatus is not limited to the wireless communication apparatus. For example, an apparatus that does not have the wireless communication function and can only perform wired communication can also be regarded as a communication apparatus.

The communication system 2 may include a plurality of base station apparatuses 20, a plurality of terminal apparatuses 30, a plurality of communication control apparatuses 40, and a plurality of proxy apparatuses 50. In the example of FIG. 5, the communication system 1 includes base station apparatuses $20_1$, $20_2$, $20_3$, $20_4$, $20_5$, and the like as the base station apparatus 20. Furthermore, the communication system 2 includes terminal apparatuses $30_1$, $30_2$, $30_3$, $30_4$, and the like as the terminal apparatus 30. Furthermore, the communication system 1 includes communication control apparatuses $40_1$, $40_2$, and the like as the communication control apparatus 40.

Note that, in the following description, the wireless communication apparatus may be referred to as a wireless system. For example, each of the wireless communication apparatus 10 and the base station apparatus $20_1$ to $20_5$ are one wireless system. Furthermore, each of the terminal apparatuses $30_1$ to $30_4$ is one wireless system. Note that, although, in the following description, the communication system 1 is referred to as the first wireless system, each of one or a plurality of wireless communication apparatuses 10 of the communication system 1 may be regarded as the first wireless system. Furthermore, although, in the following description, each of one or the plurality of base station apparatuses 20 of the communication system 2 is referred to as a second wireless system, the communication system 2 itself may be regarded as the second wireless system, and each of one or a plurality of terminal apparatuses 30 of the communication system 2 may be regarded as the second wireless system. If the communication control apparatus 40 and the proxy apparatus 50 have a wireless communication function, each of the communication control apparatuses 40 or each of the proxy apparatuses 50 may be regarded as the second wireless system.

Note that the wireless system may be one system including a plurality of communication apparatuses including at least one wireless communication apparatus. For example, a system including one or a plurality of base station apparatuses 20 and one or a plurality of terminal apparatuses 30 thereunder may be regarded as one wireless system. Furthermore, each of the communication system 1 and the communication system 2 can be regarded as one wireless system. In the following description, a communication system including a plurality of communication apparatuses including at least one wireless communication apparatus may be referred to as a wireless communication system or simply as a communication system. Note that one system including a plurality of communication apparatuses including one wireless communication apparatus may be regarded as the first wireless system or the second wireless system.

[Base Station Apparatus]

The base station apparatus 20 (second wireless system) is a wireless communication apparatus that wirelessly communicates with the terminal apparatus 30 or another communication apparatus (another base station apparatus 20 and another proxy apparatus 50). The base station apparatus 20 is a type of communication apparatus. The base station apparatus 20 corresponds to, for example, a wireless base station (e.g., Node B, eNB, and gNB) or a wireless access point. The base station apparatus 20 may be a wireless relay station. The base station apparatus 20 may be an on-road base station apparatus such as a road side unit (RSU). Furthermore, the base station apparatus 20 may be an optical extension apparatus called a remote radio head (RRH). Furthermore, the base station apparatus 20 may be a receiving station of a field pickup unit (FPU). In the embodiment, a base station of a wireless communication system may be referred to as a base station apparatus. Note that the wireless access technology used by the base station apparatus 20 may be cellular communication technology or wireless LAN technology. Of course, the wireless access technology used by the base station apparatus 20 is not limited thereto, and may be other wireless access technology.

The base station apparatus 20 is not necessarily fixed, and may be installed in a moving object such as an automobile. Furthermore, the base station apparatus 20 is not necessarily required to be on the ground. A communication apparatus function may be provided in an object existing in the air or space, such as an aircraft, a drone, a helicopter, and a satellite, and an object existing on/under the sea, such as a ship and a submarine. In such a case, the base station apparatus 20 can wirelessly communicate with another fixedly installed communication apparatus.

The coverage of the base station apparatus 20 may be as large as a macro cell, and as small as a pico cell. Of course, the coverage of the base station apparatus 20 may be as extremely small as a femto cell. Furthermore, when the base station apparatus 20 has a beamforming capability, a cell or a service area may be formed for each beam.

The base station apparatus 20 may be used, operated, and/or managed by various entities. For example, the base station apparatus 20 may be assumed to be a mobile network operator (MNO), a mobile virtual network operator (MVNO), a mobile virtual network enabler (MVNE), a neutral host network (NHN) operator, a broadcaster, an enterprise, an educational institution (e.g., educational corporation and school board of each local government), a real estate (e.g., building and apartment) administrator, an individual, and the like. Of course, a subject that uses, operates, and/or manages the base station apparatus 20 is not limited thereto.

The base station apparatus 20 may be installed and/or operated by one operator, or may be installed and/or operated by one individual. Of course, a subject of the installation/operation of the base station apparatus 20 is not limited thereto. For example, the base station apparatus 20 may be installed/operated by a plurality of operators or a plurality of individuals in cooperation. Furthermore, the base station apparatus 20 may be shared facilities used by a plurality of operators or a plurality of individuals. In the case, a third party different from a user may install/operate the facilities.

The base station apparatus 20 operated by an operator is typically connected to the Internet via a core network. Furthermore, the base station apparatus 20 is subject to operation management/maintenance by a function called operation, administration & maintenance (OA&M). Note that, for example, a network manager can be provided in the communication system 2. The network manager integrally controls the base station apparatus 20 in a network.

Note that the concept of the base station includes an access point and a wireless relay station (also referred to as relay apparatus). Furthermore, the concept of the base station includes not only a structure having a function of the base station but an apparatus installed in the structure. The structure is, for example, a building such as an office building, a house, a steel tower, station facilities, airport facilities, harbor facilities, and a stadium. Note that the concept of the structure includes not only a building but a non-building structure, such as a tunnel, a bridge, a dam, a wall, and an iron pillar, and facilities, such as a crane, a gate, or a windmill. Furthermore, the concept of the structure includes not only a structure on land (on the ground in narrow sense) or on the ground but a structure on water, such as a pier and a megafloat, and a structure under water such as marine observation facilities.

Furthermore, the base station may be a movable base station (mobile station). In the case, the base station (mobile station) may be a wireless communication apparatus installed in a moving object, or may be a moving object itself. Furthermore, the moving object may be a moving object (e.g., vehicle such as automobile, bus, truck, train, and linear motor car) that moves on land (on the ground in narrow sense) or a moving object (e.g., subway) that moves in the ground (e.g., in tunnel). Of course, the moving object may be a mobile terminal such as a smartphone. Furthermore, the moving object may be a moving object (e.g., vessel such as passenger ship, cargo ship, and hovercraft) that moves over water or a moving object (e.g., submersible ship such as submersible, submarine, and unmanned submersible machine) that moves under water. Furthermore, the moving object may be a moving object (e.g., aircraft such as airplane, airship, and drone) that moves in the atmosphere or a space moving object (e.g., artificial celestial body such as artificial satellite, spacecraft, space station, and probe) that moves outside the atmosphere.

Terminal Apparatus

The terminal apparatus 30 is communication equipment having a communication function. The terminal apparatus 30 is typically communication equipment such as a smartphone. The terminal apparatus 30 may be a user terminal such as a mobile phone, a smart device (smartphone or tablet), a wearable terminal, a personal digital assistant (PDA), and a personal computer. Furthermore, the terminal apparatus 30 may be a motorcycle, a moving relay vehicle, and the like mounted with communication equipment such as an FPU. The terminal apparatus 30 may be referred to as user equipment, a user terminal, a user station, a mobile terminal, a mobile station, and the like.

Note that the terminal apparatus 30 is not necessarily used by a person. The terminal apparatus 30 may be a sensor installed in a machine or a building of a factory like so-called machine type communication (MTC). Furthermore, the terminal apparatus 30 may be a machine to machine (M2M) device or an Internet of Things (IoT) device. Furthermore, the terminal apparatus 30 may have a relay communication function as represented by device to device (D2D) and vehicle to everything (V2X). Furthermore, the terminal apparatus 30 may be equipment called client premises equipment (CPE) used in a wireless backhaul and the like. Furthermore, the terminal apparatus 30 may be a wireless communication apparatus installed in a moving object, or may be a moving object itself.

Furthermore, the terminal apparatus 30 is not necessarily required to be on the ground. The terminal apparatus 30 may be an object existing in the air or space, such as an aircraft, a drone, a helicopter, and a satellite, and an object existing on/under the sea, such as a ship and a submarine.

[Communication Control Apparatus]

The communication control apparatus 40 manages the base station apparatus 20. For example, the communication control apparatus 40 controls wireless communication of the base station apparatus 20. For example, the communication control apparatus 40 determines a communication parameter (also referred to as operation parameter) to be used by the base station apparatus 20, and gives grant or an instruction to the base station apparatus 20. In the case, the communication control apparatus 40 may be a network manager that integrally controls a wireless apparatus in a network. In examples of ETSI EN 303 387 or IEEE 802.19.1-2014, the communication control apparatus 40 may be a control apparatus such as a spectrum manager/coexistence manager that controls radio interference between pieces of wireless equipment. Furthermore, for example, a registered location secure server (RLSS) specified in IEEE 802.11-2016 can also be the communication control apparatus 40. Furthermore, in a spectrum access environment, a database (database server, apparatus, and system) such as a geolocation database (GLDB) and a spectrum access system (SAS) can be the communication control apparatus 40. Although the communication control apparatus 40 basically targets at the base station apparatus 20 for control, the communication control apparatus 40 may control the terminal apparatus 30 below the base station apparatus 20.

Figure 6:
FIG. 6 illustrates a model in which communication control apparatuses are dispersively arranged.

Note that a plurality of communication control apparatuses 40 may be provided in one communication system 2. FIG. 6 illustrates a model in which the communication control apparatuses 40 are dispersively arranged. In the case, a plurality of communication control apparatuses 40 (communication control apparatus $40_1$ and communication control apparatus $40_2$ in example of FIG. 6) exchange information on the base station apparatuses 20 managed by each other, and perform allocation of necessary frequencies and calculation of interference control.

Figure 7:
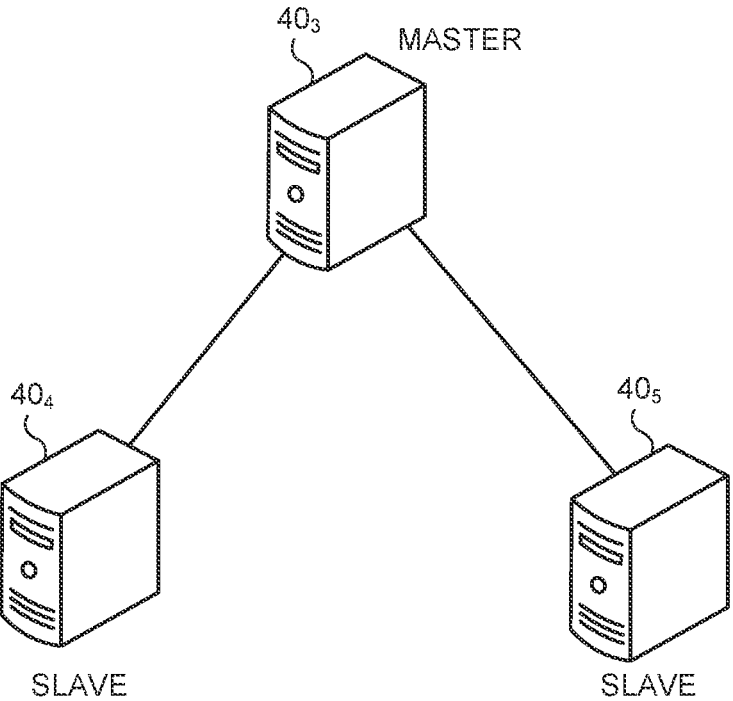
FIG. 7 illustrates a model in which one communication control apparatus entirely controls a plurality of communication control apparatuses in a centrally controlled manner.

Furthermore, the communication control apparatus 40 may be a master-slave apparatus. FIG. 7 illustrates a model (so-called master-slave model) in which one communication control apparatus entirely controls a plurality of communication control apparatuses in a centrally controlled manner. In the example of FIG. 7, a communication control apparatus $40_3$ is a master communication control apparatus, and communication control apparatuses $40_4$ and $40_5$ are slave communication control apparatuses. In such a system, the master communication control apparatus can entirely control a plurality of slave communication control apparatuses to intensively make a decision. Furthermore, the master communication control apparatus can also, for example, delegate/discard decision-making authority to each slave communication control apparatus for the purpose of load dispersion (load balancing).

Note that the communication control apparatus 40 can acquire necessary information also from an entity other than the base station apparatus 20, the terminal apparatus 30, and the proxy apparatus 50 in order to fulfill the role. Specifically, the communication control apparatus 40 can acquire information necessary for protection, such as position information of the primary system, from a database (regulatory database) managed/operated by a national/local radio governmental agency, for example. One example of the regulatory database includes a universal licensing system (ULS) operated by the United States Federal Communications Commissions. Other examples of information necessary for protection can include out-of-band emission limit (OOBE), adjacent channel leakage ratio (ACLR), adjacent channel selectivity, fading margin, protection ratio (PR), and/or the like. In these examples, when numerical values are fixedly given, it is legislatively desirable to use the numerical values.

Furthermore, in another example, the communication control apparatus 40 can be assumed to acquire radio sensing information from a radio sensing system installed/operated for detecting radio waves from the primary system. In one specific example, the communication control apparatus 40 can acquire radio detection information of the primary system from a radio sensing system such as an environmental sensing capability (ESC) in the United States CBRS. Furthermore, when the communication apparatus and the terminal have a sensing function, the communication control apparatus 40 may acquire radio detection information of the primary system from the communication apparatus and the terminal.

[Proxy Apparatus]

The proxy apparatus 50 (proxy system) communicates with the communication control apparatus 40 for (and on behalf of) one or a plurality of communication apparatuses (e.g., base station apparatus 20). The proxy apparatus 50 is also a type of communication apparatus. The proxy apparatus 50 may be a domain proxy (DP) specified in Non Patent Literature 2 and the like. Here, the DP refers to an entity that communicates with an SAS instead of each of a plurality of CBSDs or a network including a plurality of CBSDs. Note that the proxy apparatus 50 is not limited to the DP specified in Non Patent Literature 2 as long as the proxy apparatus 50 has a function of communicating with the communication control apparatus 40 for (and on behalf of) one or a plurality of communication apparatuses. A network manager that integrally controls the base station apparatus 20 in the network may be regarded as the proxy apparatus 50.

An interface between the entities may be wired or wireless. For example, not only a wired line but a wireless interface that does not depend on spectrum access can be used for an interface between the communication control apparatus and the communication apparatus. In the case, the wireless interface may be, for example, a wireless interface provided by a mobile communication carrier via a licensed band, a wireless interface (e.g., wireless interface using Wi-Fi communication) using an incumbent license-exempt band, and the like.

Hereinafter, the configuration of each apparatus constituting the communication system 2 will be specifically described.

<2-2. Configuration of Base Station Apparatus>

Figure 8:
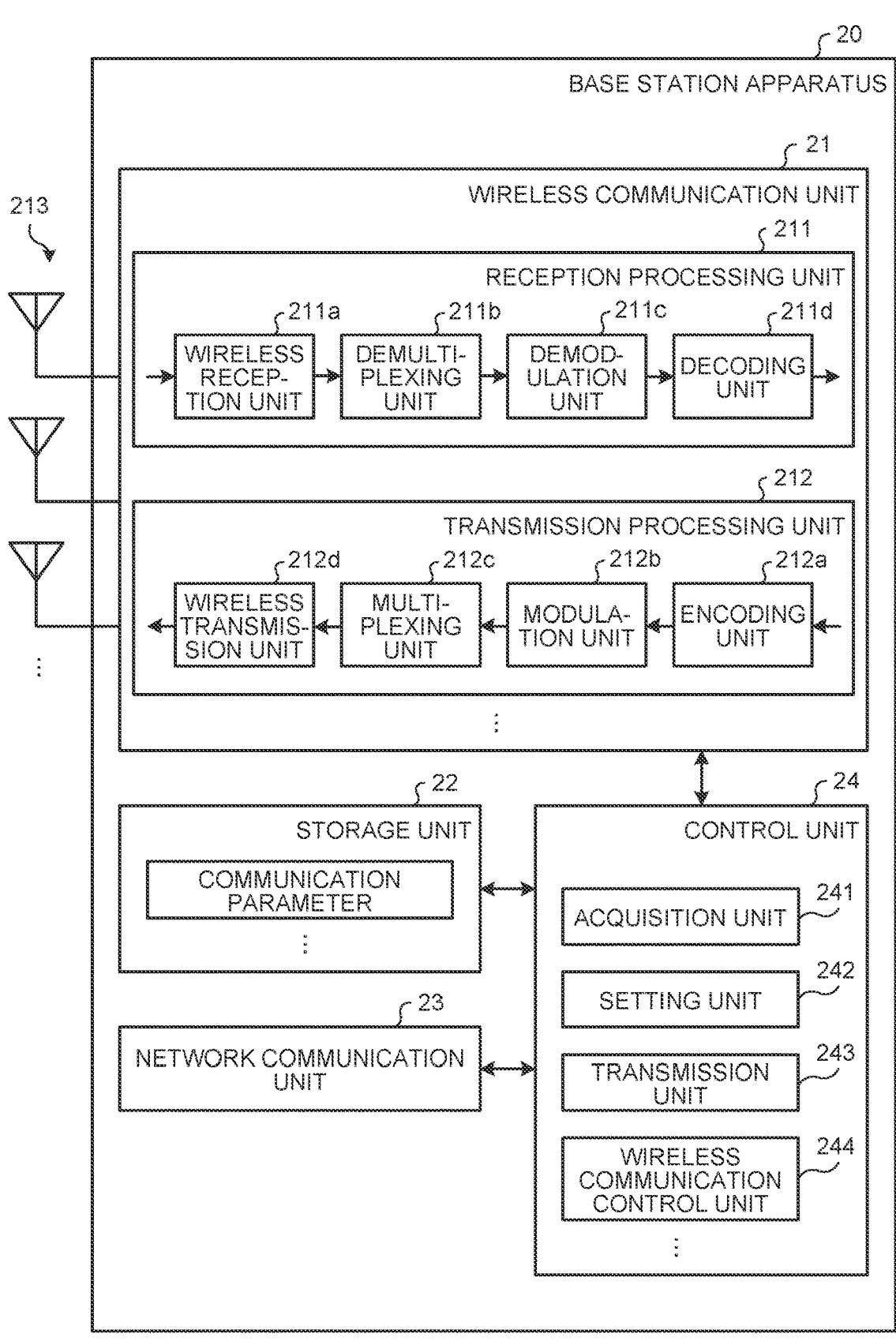
FIG. 8 illustrates a configuration example of a communication apparatus according to the embodiment of the present disclosure.

First, the configuration of the base station apparatus 20 will be described. FIG. 8 illustrates a configuration example of the base station apparatus 20 according to the embodiment of the present disclosure. The base station apparatus 20 is a wireless communication apparatus (wireless system) that wirelessly communicates with the terminal apparatus 30 under the control of the communication control apparatus 40. For example, the base station apparatus 20 is a base station apparatus (ground station apparatus) located on the ground. In the case, the base station apparatus 20 may be disposed in a structure on the ground, or may be installed in a moving object that moves on the ground. More specifically, the base station apparatus 20 may be an antenna installed in a structure such as a building and a signal processing apparatus connected to the antenna. Of course, the base station apparatus 20 may be a structure or a moving object itself. The "on the ground" has a broad sense including not only on the land (on ground in narrow sense) but in the ground, on water, and under water. The base station apparatus 20 is a type of communication apparatus.

Note that the base station apparatus 20 is not limited to the ground station apparatus. For example, the base station apparatus 20 may be a base station apparatus (non-ground station apparatus) that moves or floats in the air or space. In the case, the base station apparatus 20 may be an aircraft station apparatus or a satellite station apparatus.

The aircraft station apparatus may be mounted in an aircraft and the like, or may be an aircraft itself. The concept of the aircraft includes not only a heavy aircraft such as an airplane and a glider but a light aircraft such as a balloon and an airship. Furthermore, the concept of the aircraft also includes a rotorcraft such as a helicopter and an autogyro. Note that the aircraft station apparatus (or aircraft mounted with aircraft station apparatus) may be a manned aircraft or an unmanned aircraft such as a drone.

The satellite station apparatus may be mounted in a space moving object such as an artificial satellite, or may be a space moving object itself. A satellite serving as the satellite station apparatus may be any of a low earth orbiting (LEO) satellite, a medium earth orbiting (MEO) satellite, a geostationary earth orbiting (GEO) satellite, and a highly elliptical orbiting (HEO) satellite. Of course, the satellite station apparatus may be mounted in a low earth orbiting satellite, a middle earth orbiting satellite, a geostationary satellite, or a high elliptical orbiting satellite.

Furthermore, the base station apparatus 20 may be a relay station apparatus. The relay station apparatus is, for example, an aeronautical station and an earth station. The relay station apparatus can be regarded as a type of the above-described relay apparatus. The aeronautical station is a wireless station installed in a moving object that moves on or in the ground to communicate with an aircraft station apparatus. Furthermore, the earth station is a wireless station located on the earth (including air) to communicate with a satellite station apparatus. The earth station may be a large earth station or a small earth station such as a very small aperture terminal (VSAT). Note that the earth station may be a VSAT control earth station (also referred to as master station or HUB station) or a VSAT earth station (also referred to as slave station). Furthermore, the earth station may be a wireless station installed in a moving object that moves on the ground. Examples of an earth station mounted on a vessel include earth stations on board vessels (ESVs). Furthermore, the earth station may include an aircraft earth station that is installed in an aircraft (including helicopter) and communicates with a satellite station. Furthermore, the earth station may include an aeronautical earth station that is installed in a moving object that moves on the ground and communicates with the aircraft earth station via a satellite station. Note that the relay station apparatus may be a portable and movable wireless station that communicates with a satellite station and an aircraft station.

The base station apparatus 20 includes a wireless communication unit 21, a storage unit 22, a network communication unit 23, and a control unit 24. Note that FIG. 8 illustrates a functional configuration, and a hardware configuration may be different from the configuration. Furthermore, the functions of the base station apparatus 20 may be dispersively implemented in a plurality of physically separated apparatuses.

The wireless communication unit 21 is a wireless communication interface that wirelessly communicates with another communication apparatus (e.g., terminal apparatus 30, communication control apparatus 40, proxy apparatus 50, and another base station apparatus 20). The wireless communication unit 21 operates under the control of the control unit 24. The wireless communication unit 21 may support a plurality of wireless access methods. For example, the wireless communication unit 21 may support both NR and LTE. The wireless communication unit 21 may support another cellular communication method such as W-CDMA and cdma 2000. Furthermore, the wireless communication unit 21 may support a wireless LAN communication method in addition to a cellular communication method. Of course, the wireless communication unit 21 may correspond only to one wireless access method.

The wireless communication unit 21 includes a reception processing unit 211, a transmission processing unit 212, and an antenna 213. The wireless communication unit 21 may include a plurality of reception processing units 211, a plurality of transmission processing units 212, and a plurality of antennas 213. Note that, when the wireless communication unit 21 supports a plurality of wireless access methods, each unit of the wireless communication unit 21 can be individually configured for each wireless access method. For example, when the base station apparatus 20 supports NR and LTE, the reception processing unit 211 and the transmission processing unit 212 may be individually configured by NR and LTE.

The reception processing unit 211 processes an uplink signal received via the antenna 213. The reception processing unit 211 includes a wireless reception unit 211*a*, a demultiplexing unit 211*b*, a demodulation unit 211*c*, and a decoding unit 211*d*.

The wireless reception unit 211*a* performs, on the uplink signal, down-conversion, removal of an unnecessary frequency component, control of an amplification level, quadrature demodulation, conversion to a digital signal, removal of a guard interval, extraction of a frequency domain signal by fast Fourier transform, and the like. For example, the wireless access method of the base station apparatus 20 is the cellular communication method such as LTE. In the case, the demultiplexing unit 211*b* separates an uplink channel such as a physical uplink shared channel (PUSCH) and a physical uplink control channel (PUCCH) and an uplink reference signal from signals output from the wireless reception unit 211*a*. The demodulation unit 211*c* demodulates a received signal by using a modulation method such as binary phase shift keying (BPSK) and quadrature phase shift keying (QPSK) for a modulation symbol of the uplink channel. The modulation method used by the demodulation unit 211*c* may be 16 quadrature amplitude modulation (QAM), 64 QAM, or 256 QAM. The decoding unit 211*d* performs decoding processing on a demodulated encoded bit of the uplink channel. Decoded uplink data and uplink control information are output to the control unit 24.

The transmission processing unit 212 performs processing of transmitting downlink control information and downlink data. The transmission processing unit 212 includes an encoding unit 212*a*, a modulation unit 212*b*, a multiplexing unit 212*c*, and a wireless transmission unit 212*d*.

The encoding unit 212*a* encodes downlink control information and downlink data input from the control unit 24 by using an encoding method such as block encoding, convolutional encoding, turbo encoding, and the like. The modulation unit 212*b* modulates an encoded bit output from the encoding unit 212*a* in a predetermined modulation method such as BPSK, QPSK, 16QAM, 64QAM, and 256QAM. The multiplexing unit 212*c* multiplexes a modulation symbol of each channel and a downlink reference signal, and places the multiplexed modulation symbol and the downlink reference signal to a predetermined resource element. The wireless transmission unit 212*d* performs various pieces of signal processing on a signal from the multiplexing unit 212*c*. For example, the wireless transmission unit 212*d* performs processing such as conversion into a time domain by fast Fourier transform, addition of a guard interval, generation of a baseband digital signal, conversion into an analog signal, quadrature modulation, up-conversion, removal of an extra frequency component, and power amplification. A signal generated by the transmission processing unit 212 is transmitted from the antenna 213.

The storage unit 22 is a storage apparatus capable of reading and writing data, such as a DRAM, an SRAM, a flash memory, and a hard disk. The storage unit 22 functions as a storage means of the base station apparatus 20. The storage unit 22 stores desired transmission power information, an operation parameter, holding resource information, and the like.

The desired transmission power information relates to transmission power required by the base station apparatus 20 to the communication control apparatus 40 as information on transmission power necessary for transmitting radio waves.

The operation parameter is information (e.g., setting information) on radio wave transmission operation of the base station apparatus 20. For example, the operation parameter is information on the maximum value (maximum acceptable transmission power) of transmission power accepted by the base station apparatus 20. Of course, the operation parameter is not limited to information on the maximum acceptable transmission power.

Furthermore, the holding resource information relates to holding of wireless resources of the base station apparatus 20. For example, the holding resource information relates to wireless resources that can be currently used by the base station apparatus 20. For example, the holding resource information relates to a holding amount of the interference margin allocated from the communication control apparatus 40 to the base station apparatus 20. The information on the holding amount may relate to a later-described resource block. That is, the holding resource information may be information (e.g., resource block holding amount) on a resource block held by the base station apparatus 20.

The network communication unit 23 is a communication interface for communicating with another apparatus (e.g., communication control apparatus 40, proxy apparatus 50, and another base station apparatus 20). For example, the network communication unit 23 is a local area network (LAN) interface such as a network interface card (NIC). The network communication unit 23 may be a universal serial bus (USB) interface including a USB host controller, a USB port, and the like. Furthermore, the network communication unit 23 may be a wired interface or a wireless interface. The network communication unit 23 functions as a network communication means of the base station apparatus 20. The network communication unit 23 communicates with another apparatus under the control of the control unit 24.

The control unit 24 is a controller that controls each unit of the base station apparatus 20. The control unit 24 is implemented by, for example, a processor such as a central processing unit (CPU) and a micro processing unit (MPU). For example, the control unit 24 is implemented by a processor executing various programs stored in a storage apparatus in the base station apparatus 20 by using a random access memory (RAM) or the like as a work area. Note that the control unit 24 may be implemented by an integrated circuit such as an application specific integrated circuit (ASIC) and a field programmable gate array (FPGA). Any of the CPU, the MPU, the ASIC, and the FPGA can be regarded as a controller.

As illustrated in FIG. 8, the control unit 24 includes an acquisition unit 241, a setting unit 242, a transmission unit 243, and a wireless communication control unit 244. Each block (acquisition unit 241 to wireless communication control unit 244) constituting the control unit 24 is a functional block indicating a function of the control unit 24. These functional blocks may be software blocks or hardware blocks. For example, each of the above-described functional blocks may be one software module implemented by software (including microprogram), or may be one circuit block on a semiconductor chip (die). Of course, each functional block may be one processor or one integrated circuit. Any method of forming a functional block can be adopted. Note that the control unit 24 may include a functional unit different from the above-described functional blocks.

Each block (acquisition unit 241 to wireless communication control unit 244) constituting the control unit 24 may operate as follows, for example.

For example, the transmission unit 243 requests grant and transmits information on a use mode of the grant to the communication control apparatus 40. The communication control apparatus 40 includes an acquisition unit and a processing unit. The acquisition unit acquires information on the use mode of grant for a communication apparatus, which uses radio waves in a frequency band used by the first wireless system, to use the radio waves. The processing unit performs processing related to the grant based on information on the use mode of the grant. Then, the wireless communication control unit 244 controls the wireless communication unit 21 based on the grant given from the communication control apparatus 40 based on the grant request.

The operation of each block (acquisition unit 241 to wireless communication control unit 244) constituting the control unit 24 will be described later.

<2-3. Configuration of Terminal Apparatus>

Figure 9:
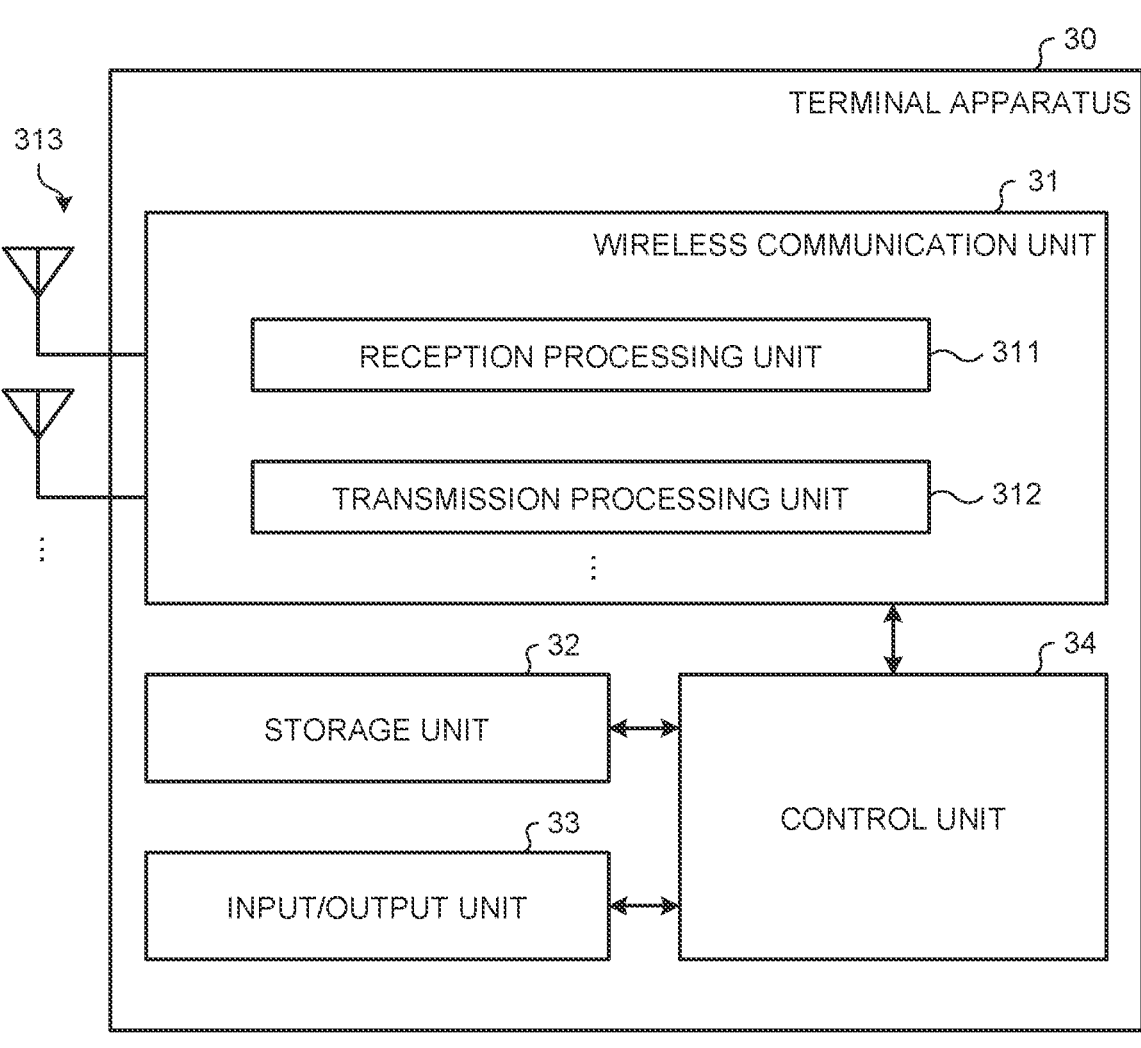
FIG. 9 illustrates a configuration example of a terminal apparatus according to the embodiment of the present disclosure.

Next, the configuration of the terminal apparatus 30 will be described. FIG. 9 illustrates a configuration example of the terminal apparatus 30 according to the embodiment of the present disclosure. The terminal apparatus 30 is a communication apparatus that wirelessly communicates with the base station apparatus 20 and/or the communication control apparatus 40. Note that, in the embodiment, the concept of the communication apparatus (or wireless communication apparatus) includes not only the base station apparatus and the proxy apparatus but the terminal apparatus. The communication apparatus (or wireless communication apparatus) can be rephrased with a wireless system.

The terminal apparatus 30 includes a wireless communication unit 31, a storage unit 32, an input/output unit 33, and a control unit 34. Note that FIG. 9 illustrates a functional configuration, and a hardware configuration may be different from the configuration. Furthermore, the functions of the terminal apparatus 30 may be dispersively implemented in a plurality of physically separated configurations.

The wireless communication unit 31 is a wireless communication interface that wirelessly communicates with another communication apparatus (e.g., base station apparatus 20 and another terminal apparatus 30). The wireless communication unit 31 operates under the control of the control unit 34. The wireless communication unit 31 supports one or a plurality of wireless access methods. For example, the wireless communication unit 31 supports both NR and LTE. The wireless communication unit 31 may support another wireless access method such as W-CDMA and cdma 2000.

The wireless communication unit 31 includes a reception processing unit 311, a transmission processing unit 312, and an antenna 313. The wireless communication unit 31 may include a plurality of reception processing units 311, a plurality of transmission processing units 312, and a plurality of antennas 313. Note that, when the wireless communication unit 31 supports a plurality of wireless access methods, each unit of the wireless communication unit 31 can be individually configured for each wireless access method. For example, the reception processing unit 311 and the transmission processing unit 312 may be individually configured by LTE and NR. The reception processing unit 311 and the transmission processing unit 312 have a configuration similar to those of the reception processing unit 211 and the transmission processing unit 212 of the base station apparatus 20, respectively.

The storage unit 32 is a storage apparatus capable of reading and writing data, such as a DRAM, an SRAM, a flash memory, and a hard disk. The storage unit 32 functions as a storage means of the terminal apparatus 30.

The input/output unit 33 is a user interface for communicating information with a user. For example, the input/output unit 33 is an operation apparatus for the user to perform various operations, such as a keyboard, a mouse, an operation key, and a touch panel. Alternatively, the input/output unit 33 is a display apparatus such as a liquid crystal display and an organic electroluminescence (EL) display. The input/output unit 33 may be an acoustic apparatus such as a speaker and a buzzer. Furthermore, the input/output unit 33 may be a lighting apparatus such as a light emitting diode (LED) lamp. The input/output unit 33 functions as an input/output means (input means, output means, operation means, or notification means) of the terminal apparatus 30.

The control unit 34 is a controller that controls each unit of the terminal apparatus 30. The control unit 34 is implemented by, for example, a processor such as a CPU and an MPU. For example, the control unit 34 is implemented by a processor executing various programs stored in a storage apparatus in the terminal apparatus 30 by using a RAM and the like as a work area. Note that the control unit 34 may be implemented by an integrated circuit such as an ASIC and an FPGA. Any of the CPU, the MPU, the ASIC, and the FPGA can be regarded as a controller.

<2-4. Configuration of Communication Control Apparatus>

The communication control apparatus 40 controls wireless communication of the base station apparatus 20. The communication control apparatus 40 may control wireless communication of the terminal apparatus 30 via the base station apparatus 20 or directly. The communication control apparatus 40 may be a network manager that integrally controls a wireless apparatus in a network. For example, the communication control apparatus 40 may be a spectrum manager/coexistence manager. Furthermore, the communication control apparatus 40 may be a database server such as a geolocation database (GLDB) and a spectrum access system (SAS).

Note that, when the communication system 2 is a cellular communication system, the communication control apparatus 40 may constitute a core network. A core network CN is, for example, an evolved packet core (EPC) or a 5G core network (5GC). When the core network is the EPC, the communication control apparatus 40 may have a function as a mobility management entity (MME), for example. Furthermore, when the core network is 5GC, the communication control apparatus 40 may have a function as an access and mobility management function (AMF), for example. Note that, even when the communication system 2 is a cellular communication system, the communication control apparatus 40 is not necessarily required to constitute the core network. For example, the communication control apparatus 40 may have a function as a radio network controller (RNC).

Note that the communication control apparatus 40 may have a function of a gateway. For example, when the core network is an EPC, the communication control apparatus 40 may have a function as a serving gateway (S-GW) and a packet data network gateway (P-GW). Furthermore, when the core network is 5GC, the communication control apparatus 40 may have a function as a user plane function (UPF). Note that the communication control apparatus 40 is not necessarily required to constitute the core network. For example, the core network is W-CDMA or cdma 2000. In the case, the communication control apparatus 40 may have a function as a radio network controller (RNC).

Furthermore, the communication control apparatus 40 may be a system that controls a plurality of secondary systems. In the case, the communication system 2 can be regarded as a system including a plurality of secondary systems.

Figure 10:
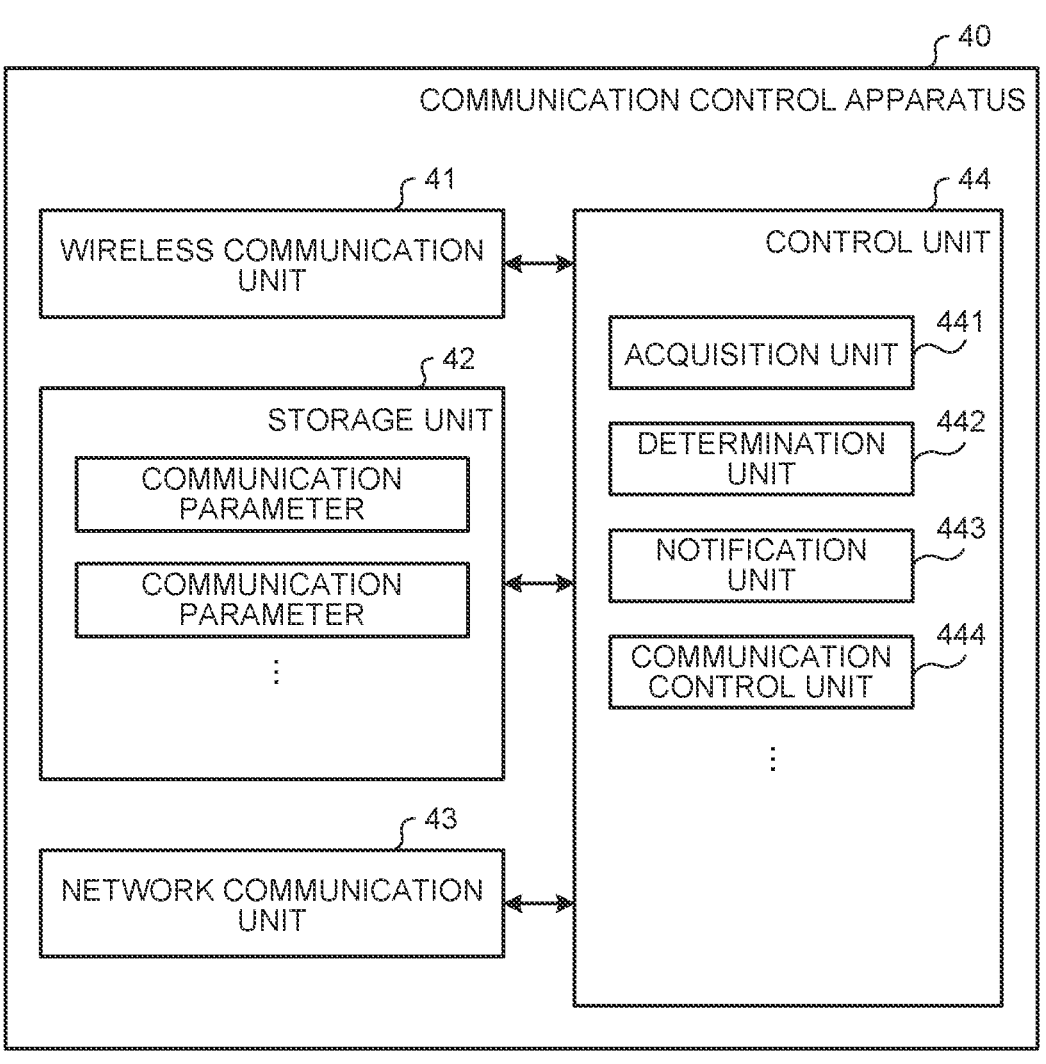
FIG. 10 illustrates a configuration example of a communication control apparatus according to the embodiment of the present disclosure.

FIG. 10 illustrates a configuration example of the communication control apparatus 40 according to the embodiment of the present disclosure. The communication control apparatus 40 includes a wireless communication unit 41, a storage unit 42, a network communication unit 43, and a control unit 44. Note that FIG. 10 illustrates a functional configuration, and a hardware configuration may be different from the configuration. Furthermore, the functions of the communication control apparatus 40 may be dispersively implemented in a plurality of physically separated configurations. For example, the communication control apparatus 40 may include a plurality of server apparatuses.

The wireless communication unit 41 is a wireless communication interface that wirelessly communicates with another communication apparatus (e.g., base station apparatus 20, terminal apparatus 30, proxy apparatus 50, and another communication control apparatus 40). The wireless communication unit 41 operates under the control of the control unit 44. The wireless communication unit 31 supports one or a plurality of wireless access methods. For example, the wireless communication unit 31 supports both NR and LTE. The wireless communication unit 31 may support another wireless access method such as W-CDMA and cdma 2000. The wireless communication unit 41 has a configuration similar to that of the wireless communication unit 21 of the base station apparatus 20.

The storage unit 42 is a storage apparatus capable of reading and writing data, such as a DRAM, an SRAM, a flash memory, and a hard disk. The storage unit 22 functions as a storage means of the base station apparatus 20. The storage unit 22 stores an operation parameter of each of the plurality of base station apparatuses 20 constituting the communication system 2. Note that the storage unit 22 may store the holding resource information of each of the plurality of base station apparatuses 20 constituting the communication system 2. As described above, the holding resource information relates to holding of wireless resources of the base station apparatus 20. Note that the communication control apparatus 40 may store information in a file server 60.

The network communication unit 43 is a communication interface for communicating with another apparatus (e.g., base station apparatus 20, proxy apparatus 50, and another communication control apparatus 40). The network communication unit 43 may be a network interface or an equipment-connected interface. For example, the network communication unit 43 may be a local area network (LAN) interface such as a network interface card (NIC). Furthermore, the network communication unit 43 may be a universal serial bus (USB) interface including a USB host controller, a USB port, and the like. Furthermore, the network communication unit 43 may be a wired interface or a wireless interface. The network communication unit 43 functions as a communication means of the communication control apparatus 40. The network communication unit 43 communicates with the base station apparatus 20, the terminal apparatus 30, and the proxy apparatus 50 under the control of the control unit 44.

The control unit 44 is a controller that controls each unit of the communication control apparatus 40. The control unit 44 is implemented by, for example, a processor such as a CPU and an MPU. For example, the control unit 44 is implemented by a processor executing various programs stored in a storage apparatus in the communication control apparatus 40 by using a RAM and the like as a work area. Note that the control unit 44 may be implemented by an integrated circuit such as an ASIC and an FPGA. Any of the CPU, the MPU, the ASIC, and the FPGA can be regarded as a controller. For example, the control unit 44 controls the operation related to the grant by communicating with the base station apparatus 20, the terminal apparatus 30, and the proxy apparatus 50 via the network communication unit 43.

As illustrated in FIG. 10, the control unit 44 includes an acquisition unit 441, a determination unit 442, a notification unit 443, and a communication control unit 444. Each block (acquisition unit 441 to communication control unit 444) constituting the control unit 44 is a functional block indicating a function of the control unit 44. These functional blocks may be software blocks or hardware blocks. For example, each of the above-described functional blocks may be one software module implemented by software (including microprogram), or may be one circuit block on a semiconductor chip (die). Of course, each functional block may be one processor or one integrated circuit. Any method of forming a functional block can be adopted. Note that the control unit 44 may include a functional unit different from the above-described functional blocks.

Each block (acquisition unit 441 to communication control unit 444) constituting the control unit 44 may operate as follows, for example.

The acquisition unit 441 is a processing unit that acquires various pieces of information, for example, in operations related to the grant by communicating with the base station apparatus 20, the terminal apparatus 30, and the proxy apparatus 50. For example, the acquisition unit 441 acquires information on a use mode of grant for the second wireless system that secondarily uses a frequency band used by the first wireless system to secondarily use the frequency band.

In one example, the acquisition unit 441 acquires the position information of the terminal apparatus 30. Furthermore, the acquisition unit 441 acquires area information (movement prediction range information) indicating the predicted movement area 301 where the terminal apparatus 30 is predicted to move.

The determination unit 442 is a processing unit that performs spectrum grant processing and area determination processing in response to a request (e.g., spectrum grant and spectrum use notification) from the second wireless system that secondarily uses the frequency band used by the first wireless system, and that determines whether or not the secondary use is possible (details will be described later). For example, for the terminal apparatus 30, the determination unit 442 determines whether or not the terminal apparatus 30 can secondarily use the frequency band used by the primary system (hereinafter, referred to as "secondary use of primary system") based on the area information and position information acquired by the acquisition unit 441.

The notification unit 443 is a processing unit that gives a response in accordance with a determination result of the determination unit 442 in response to a request (e.g., spectrum grant and spectrum use notification) from the second wireless system that secondarily uses the frequency band used by the first wireless system (details will be described later). For example, for the terminal apparatus 30, the notification unit 443 gives a notification of whether or not the terminal apparatus 30 can secondarily use the primary system, which has been determined by the determination unit 442, as a response.

The communication control unit 444 is a processing unit that controls communication with the base station apparatus 20, the terminal apparatus 30, and the proxy apparatus 50. For example, the communication control unit 444 controls intervals between spectrum use notifications (details will be described later).

The operation of each block (acquisition unit 441 to communication control unit 444) constituting the control unit 44 will be described later.

<2-5. Configuration of Proxy Apparatus>

Figure 11:
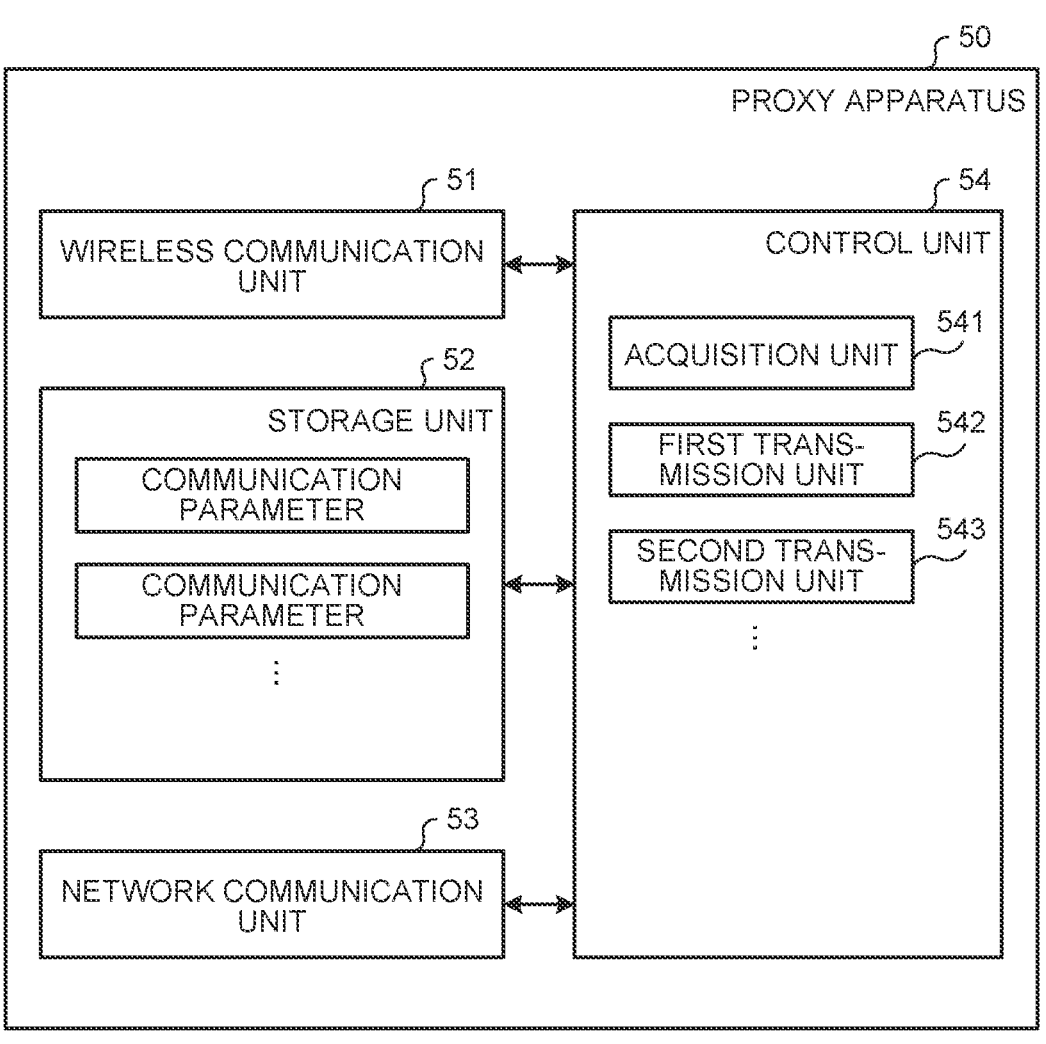
FIG. 11 illustrates a configuration example of a proxy apparatus according to the embodiment of the present disclosure.

Next, the configuration of the proxy apparatus 50 will be described. FIG. 11 illustrates a configuration example of the proxy apparatus 50 according to the embodiment of the present disclosure. The proxy apparatus 50 is a communication apparatus that communicates with the base station apparatus 20 and the communication control apparatus 40. The proxy apparatus 50 is a proxy system that communicates with the communication control apparatus 40 for (and on behalf of) one or a plurality of base station apparatuses 20. For example, the proxy apparatus 50 is a domain proxy (DP) substituted for (representing) a plurality of CBSDs.

Note that the proxy system may include one apparatus or a plurality of apparatuses. The proxy apparatus 50 and the base station apparatus 20 may communicate with each other by wire or wirelessly. Similarly, the proxy apparatus 50 and the communication control apparatus 40 may communicate with each other by wire or wirelessly.

Note that the communication apparatus for which the proxy apparatus 50 is substituted (represented by proxy apparatus 50) is not limited to the base station apparatus 20, and may be, for example, the terminal apparatus 30. In the following description, one or a plurality of communication apparatuses (e.g., one or plurality of base station apparatuses 20) for which the proxy apparatus 50 is substituted (represented by proxy apparatus 50) may be referred to as a subordinate communication apparatus (e.g., subordinate base station apparatus 20).

The proxy apparatus 50 includes a wireless communication unit 51, a storage unit 52, a network communication unit 53, and a control unit 54. Note that FIG. 10 illustrates a functional configuration, and a hardware configuration may be different from the configuration. Furthermore, the functions of the proxy apparatus 50 may be dispersively implemented in a plurality of physically separated configurations.

The wireless communication unit 51 is a wireless communication interface that wirelessly communicates with another communication apparatus (e.g., base station apparatus 20, terminal apparatus 30, communication control apparatus 40, and another proxy apparatus 50). The wireless communication unit 51 operates under the control of the control unit 54. The wireless communication unit 51 supports one or a plurality of wireless access methods. For example, the wireless communication unit 31 supports both NR and LTE. The wireless communication unit 51 may support another wireless access method such as W-CDMA and cdma 2000.

The storage unit 52 is a storage apparatus capable of reading and writing data, such as a DRAM, an SRAM, a flash memory, and a hard disk. The storage unit 52 functions as a storage means of the proxy apparatus 50. The storage unit 22 may store desired transmission power information, an operation parameter, holding resource information, and the like of each of the subordinate base station apparatuses 20.

The network communication unit 53 is a communication interface for communicating with another apparatus (e.g., base station apparatus 20, communication control apparatus 40, and another proxy apparatus 50). For example, the network communication unit 53 is a LAN interface such as an NIC. The network communication unit 53 may be a USB interface including a USB host controller, a USB port, and the like. Furthermore, the network communication unit 53 may be a wired interface or a wireless interface. The network communication unit 53 functions as a network communication means of the proxy apparatus 50. The network communication unit 53 communicates with another apparatus under the control of the control unit 54.

The control unit 54 is a controller that controls each unit of the proxy apparatus 50. The control unit 54 is implemented by, for example, a processor such as a central processing unit (CPU) and a micro processing unit (MPU). For example, the control unit 54 is implemented by a processor executing various programs stored in a storage apparatus in the proxy apparatus 50 by using a random access memory (RAM) and the like as a work area. Note that the control unit 24 may be implemented by an integrated circuit such as an application specific integrated circuit (ASIC) and a field programmable gate array (FPGA). Any of the CPU, the MPU, the ASIC, and the FPGA can be regarded as a controller.

As illustrated in FIG. 11, the control unit 54 includes an acquisition unit 541, a first transmission unit 542, and a second transmission unit 543. Each block (acquisition unit 541 to second transmission unit 543) constituting the control unit 54 is a functional block indicating a function of the control unit 54. These functional blocks may be software blocks or hardware blocks. For example, each of the above-described functional blocks may be one software module implemented by software (including microprogram), or may be one circuit block on a semiconductor chip (die). Of course, each functional block may be one processor or one integrated circuit. Any method of forming a functional block can be adopted. Note that the control unit 54 may include a functional unit different from the above-described functional blocks.

Each block (acquisition unit 541 to second transmission unit 543) constituting the control unit 54 may operate as follows, for example.

For example, the first transmission unit 542 requests grant for a subordinate communication apparatus (e.g., base station apparatus 20) and transmits information on a use mode of the grant to the communication control apparatus 40. The communication control apparatus 40 includes an acquisition unit and a processing unit. The acquisition unit acquires information on the use mode of grant for a communication apparatus, which uses radio waves in a frequency band used by the first wireless system, to secondarily use the frequency band. The processing unit performs processing related to the grant based on information on the use mode of the grant. Then, the first transmission unit 542 notifies a subordinate communication apparatus (e.g., base station apparatus 20) of information on the grant given from the communication control apparatus 40 based on the grant request.

Note that each block (acquisition unit 541 to second transmission unit 543) constituting the control unit 54 may operate in the same manner as each block (acquisition unit 241 to transmission unit 243) constituting the control unit 24 of the base station apparatus 20. For example, the acquisition unit 541 may be the same as the acquisition unit 241. The first transmission unit 542 and the second transmission unit 543 may be the same as the transmission unit 243. The acquisition unit 241 and the transmission unit 243 in the following description can be replaced with the acquisition unit 541 to the second transmission unit 543.

3. INTERFERENCE MODEL

Figure 12:
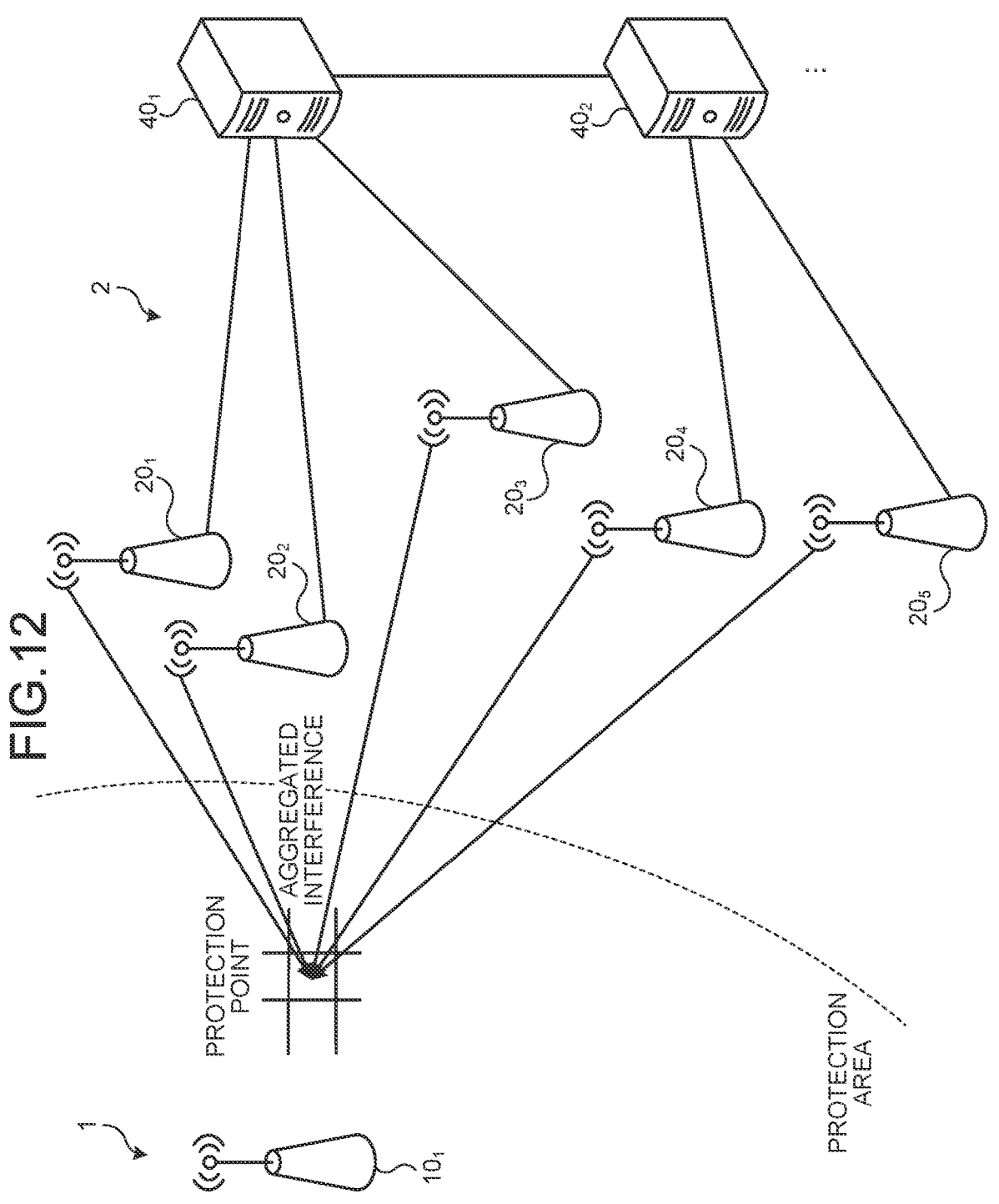
FIG. 12 is an explanatory diagram illustrating one example of an interference model assumed in the embodiment of the present disclosure.

Next, an interference model assumed in the embodiment will be described. FIG. 12 is an explanatory diagram illustrating one example of the interference model assumed in the embodiment of the present disclosure. Note that the base station apparatus 20 described in the following description can be replaced with a word indicating another communication apparatus having a wireless communication function.

The interference model in FIG. 12 is applied to the case where the primary system has a service area, for example. In the example of FIG. 12, the communication system 1 (primary system) is a wireless communication system having a service area. The service area is, for example, a protection area of the communication system 1. A plurality of interference calculation reference points (hereinafter, referred to as protection point) is set in the protection area. The protection point is set by, for example, an operator of the communication system 1 or a public organization that manages radio waves (hereinafter, referred to as administrator). For example, the administrator may divide the protection area into lattices, and set the center of a predetermined lattice as the protection point. Any method of determining a protection point may be adopted. An administrator or the like sets the interference margin of each protection point. FIG. 12 illustrates interference given to protection points by a plurality of base station apparatuses 20 constituting the communication system 2 (secondary system). The communication control apparatus 40 of the communication system 2 controls the transmission power of the plurality of base station apparatuses 20 such that aggregated interference at each protection point does not exceed the set interference margin.

Figure 13:
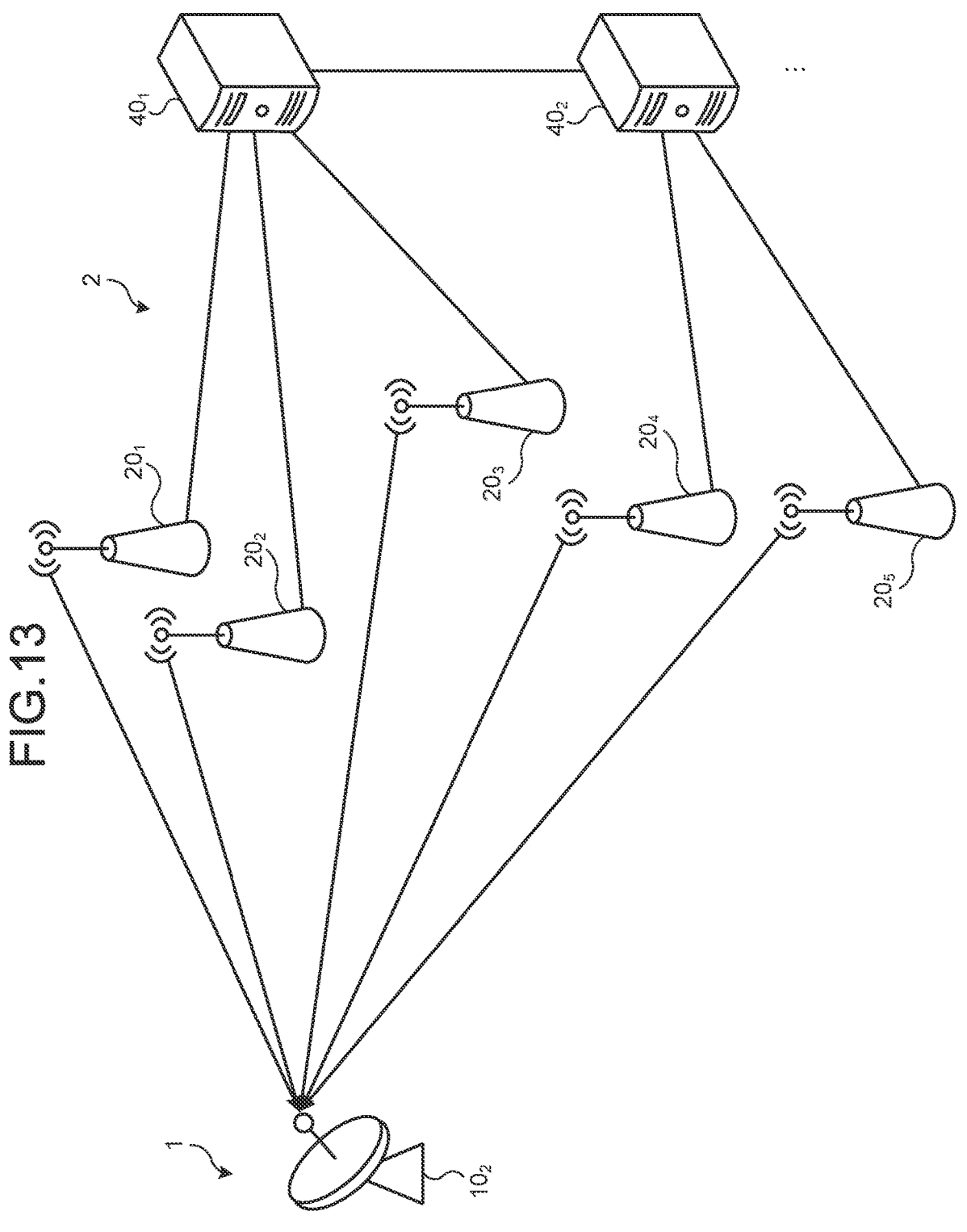
FIG. 13 is an explanatory diagram illustrating another example of the interference model assumed in the embodiment of the present disclosure.

FIG. 13 is an explanatory diagram illustrating another example of the interference model assumed in the embodiment of the present disclosure. For example, the interference model in FIG. 13 is applied to the case where the primary system performs only reception. In the example of FIG. 13, the communication system 1 (primary system) includes a reception antenna as a wireless communication apparatus 102. The wireless communication apparatus 102 is, for example, a reception antenna of a satellite ground station. The communication control apparatus 40 of the communication system 2 sets the position of the reception antenna as a protection point, and controls the transmission power of the plurality of base station apparatuses 20 such that aggregated interference at the point does not exceed the interference margin.

4. METHOD OF PROTECTING PRIMARY SYSTEM

Next, a method of protecting a primary system will be described. As described above, the method of protecting a primary system can be classified into, for example, the following two types.

(1) Interference margin simultaneously distributed type
(2) Interference margin sequentially distributed type Note that examples of the method of protecting a primary system of an interference margin simultaneously distributed type include an approach (e.g., approach of calculating maximum acceptable EIRP) disclosed in Non Patent Literature 3. Furthermore, examples of the method of protecting a primary system of an interference margin sequentially distributed type include an iterative allocation process (IAP) disclosed in Non Patent Literature 6.

Hereinafter, the method of protecting a primary system of the "interference margin simultaneously distributed type" and a method of protecting a prima system of the "interference margin sequentially distributed type" will be described. Note that the base station apparatus 20 described in the following description can be replaced with a word indicating another communication apparatus having a wireless communication function.

<4-1. Interference Margin Simultaneously Distributed Type>

Figure 14:
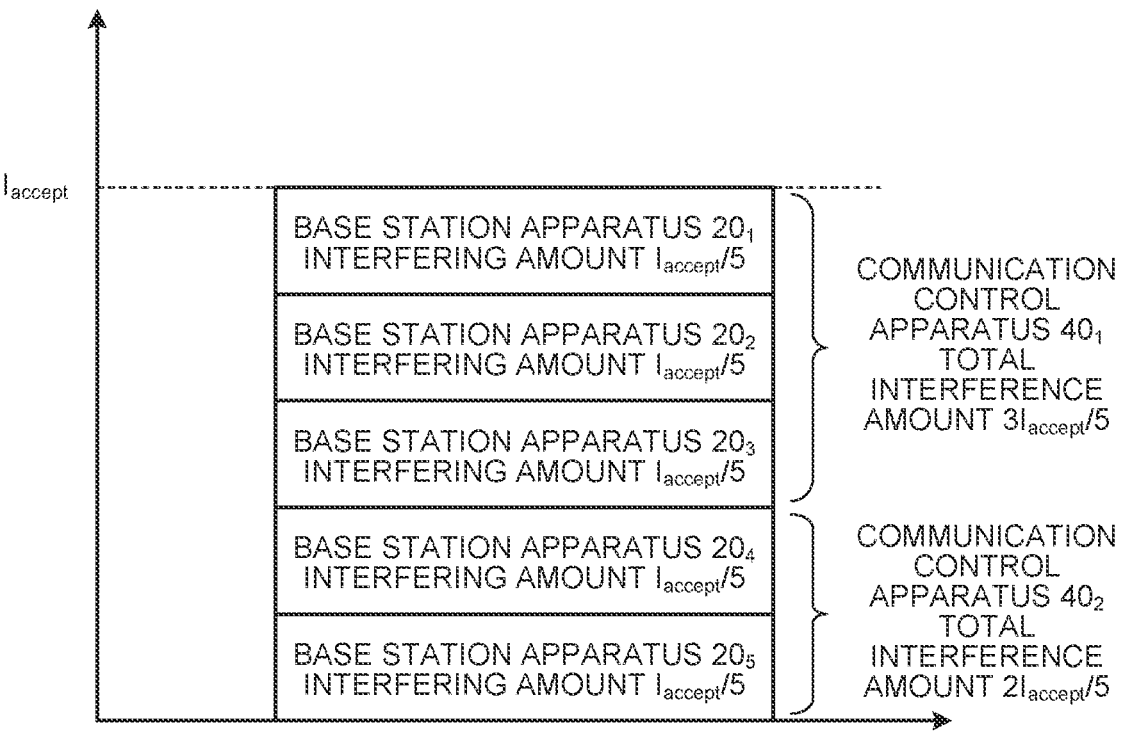
FIG. 14 is an explanatory diagram for illustrating a method of protecting a primary system of an interference margin simultaneously distributed type.

First, the method of protecting a primary system of the interference margin simultaneously distributed type will be described. FIG. 14 is an explanatory diagram for illustrating the method of protecting a primary system of the interference margin simultaneously distributed type. As described above, in the interference margin simultaneously distributed type, the communication control apparatus 40 calculates the maximum acceptable transmission power of the secondary system by using a "value uniquely determined by the positional relation between a protection reference point of the primary system and the secondary system" as a reference value. In the example of FIG. 14, the acceptable interference threshold of the primary system is $I_{accept}$. The threshold may be an actual threshold, or may be a value set in anticipation of a certain degree of margin (e.g., protection ratio) from the actual threshold in consideration of a calculation error and interference variation.

In the method of protecting a primary system of the interference margin simultaneously distributed type, the interference control means determining transmission power (e.g., EIRP and conducted power+antenna gain) of a wireless apparatus without exceeding an acceptable interference threshold. In the case, when a large number of base station apparatuses 20 are provided and each base station apparatus 20 does not exceed the acceptable interference threshold, interference power received in the communication system 1 (primary system) may exceed the acceptable interference threshold. Therefore, the interference margin (acceptable interference amount) is "distributed" based on the number of the base station apparatuses 20 registered in the communication control apparatus 40.

For example, in the example of FIG. 14, the base station apparatuses 20 of the total number of five are provided. For that reason, an acceptable interference amount of $I_{accept}/5$ is individually distributed. Since the base station apparatus 20 itself cannot recognize the distributed amount, the base station apparatus 20 recognizes the distributed amount through the communication control apparatus, or acquires transmission power determined based on the distributed amount. Since the communication control apparatus cannot recognize the number of wireless apparatuses managed by another communication control apparatus, the communication control apparatus can recognize the total number by mutually communicating information, and distribute the acceptable interference amount. For example, an acceptable interference amount of $3I_{accept}/5$ is allocated in the communication control apparatus $40_1$.

Figure 15:
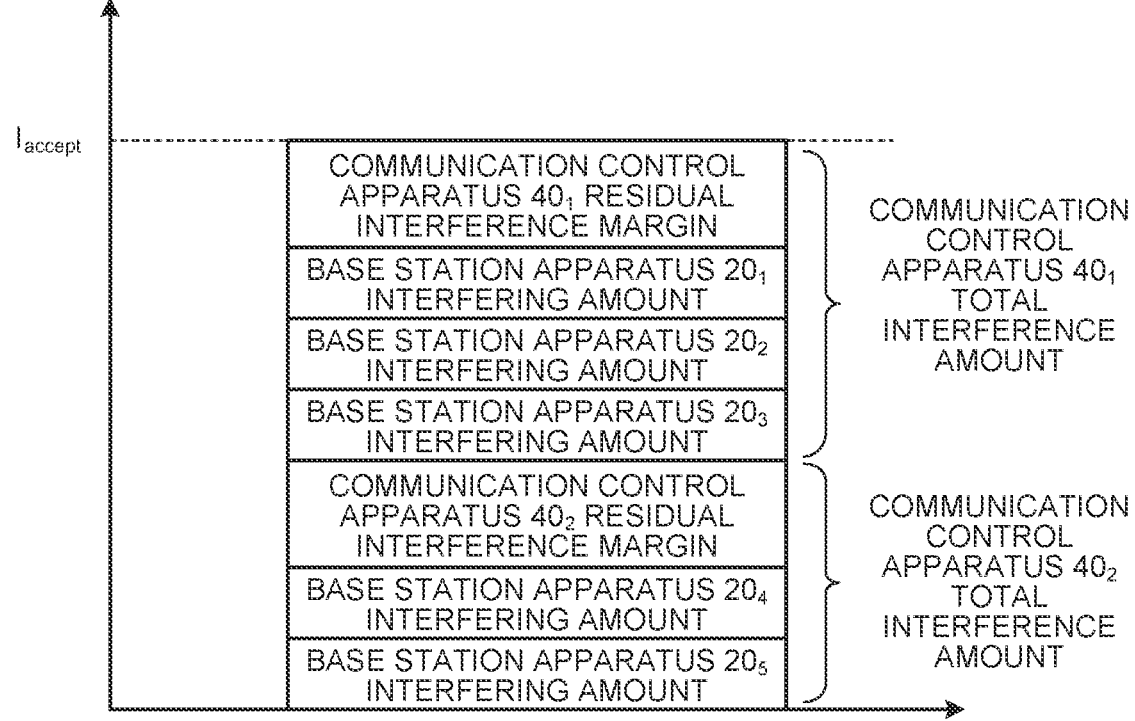
FIG. 15 illustrates the occurrence of a residual interference margin.

Note that, in the approach, an interference margin not used by the base station apparatus 20 can be a residual interference margin. FIG. 15 illustrates the occurrence of the residual interference margin. FIG. 15 illustrates total interference amounts set in each of the two communication control apparatuses 40 (communication control apparatuses 40₁ and 40₂). Furthermore, FIG. 15 illustrates an interference amount (interfering amount) given to a predetermined protection point of the communication system 1 by a plurality of base station apparatuses 20 (base station apparatuses 20₁ to 20₅) under the management of the two communication control apparatuses 40. An interference amount obtained by subtracting the interference amount of the base station apparatus 20 from the total interference amount of each of the two communication control apparatuses 40 is a residual interference margin. In the following description, a surplus interference amount is referred to as the residual interference margin. The residual interference margin can be rephrased with a residual interference amount.

<4-2. Interference Margin Sequentially Distributed Type>

Figure 16:
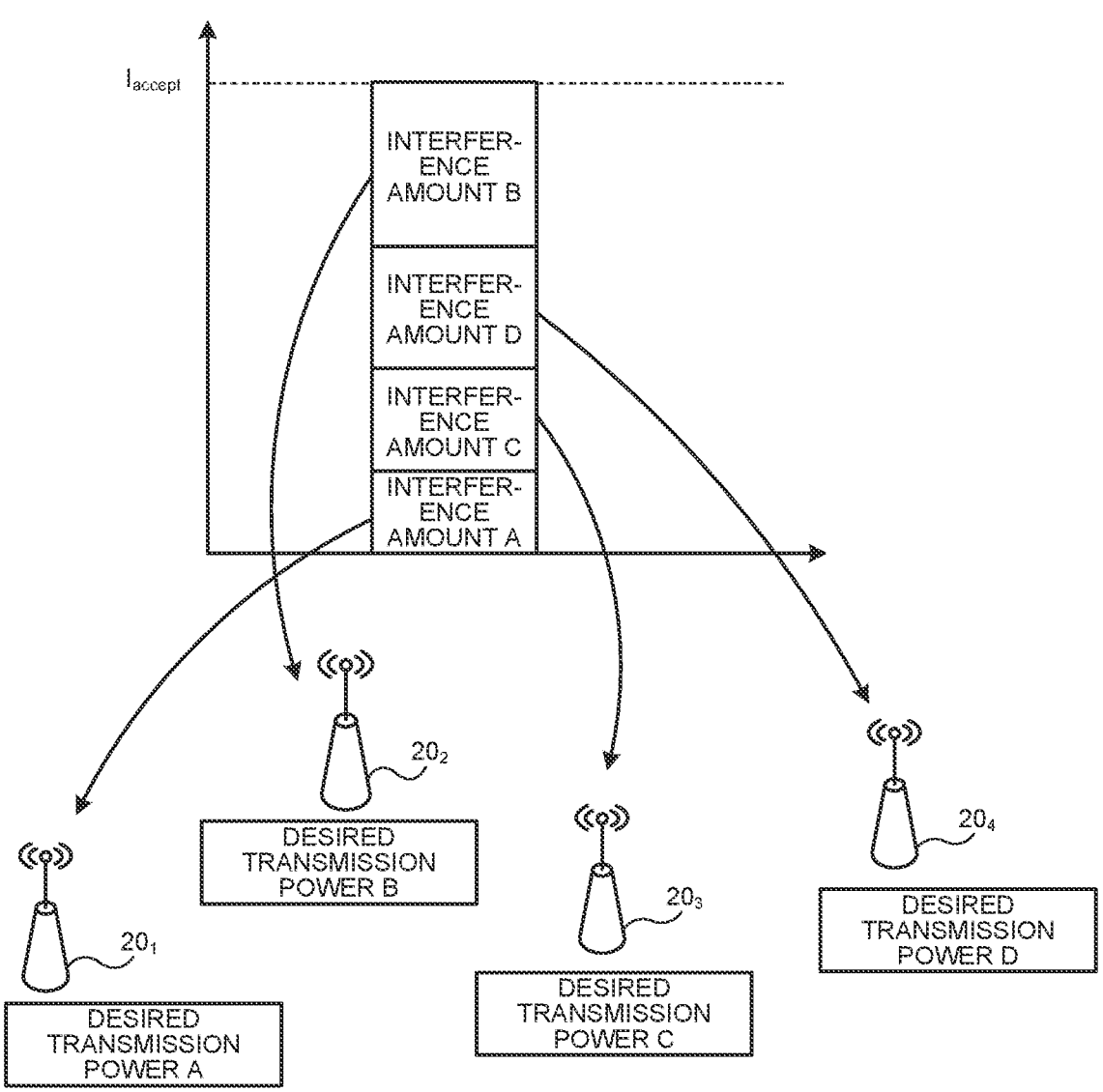
FIG. 16 is an explanatory diagram for illustrating the method of protecting a primary system of an interference margin sequentially distributed type.

Next, the method of protecting a primary system of the interference margin sequentially distributed type will be described. As described above, in the interference margin sequentially distributed type, the communication control apparatus 40 calculates the maximum acceptable transmission power of the secondary system by using the "desired transmission power of the secondary system" as a reference value. FIG. 16 is an explanatory diagram for illustrating the method of protecting a primary system of the interference margin sequentially distributed type. In the interference margin sequentially distributed type, for example, each of the plurality of base station apparatuses 20 stores the desired transmission power information in the storage unit 22. The desired transmission power information relates to transmission power required by the base station apparatus 20 to the communication control apparatus 40 as information on transmission power necessary for transmitting radio waves. In the example of FIG. 16, base station apparatus 201 to 204 holds desired transmission power information A to D, respectively. The communication control apparatus 40 allocates interference amounts A to D to the base station apparatus 201 to 204 based on the desired transmission power information A to D, respectively.

5. DESCRIPTION OF VARIOUS PROCEDURES

Next, various procedures that may occur between entities of the communication system 2 will be described. Note that the base station apparatus 20 described in the following description can be replaced with a word indicating another communication apparatus having a wireless communication function.

<5-1. Registration Procedure>

In a registration procedure, a device parameter related to the base station apparatus 20 and the like is registered in the communication control apparatus 40. Typically, the registration procedure is started when one or more communication systems including the base station apparatus 20 or a plurality of base station apparatuses 20 notify the communication control apparatus 40 of a registration request including the above-described device parameter. A communication system (e.g., proxy system such as proxy apparatus 50) substituted for (representing) one or a plurality of base station apparatuses 20 may transmit the registration request.

Although, in the following description, the communication system substituted for (representing) the plurality of base station apparatuses 20 is the proxy apparatus 50, a word of the proxy apparatus 50 described below can be replaced with a word indicating a communication system substituted for (representing) another communication apparatus such as the proxy system.

(Details of Required Parameter)

The device parameter refers to, for example, the following information.

Information specific to communication apparatus
Position information
Antenna information
Wireless interface information
Legal Information
Installer information At the time of implementation, information other than these pieces of information may be treated as a device parameter.

The information specific to a communication apparatus includes information by which the base station apparatus 20 can be identified, information on the hardware of the base station apparatus 20, and the like. For example, a serial number, a product model number, and the like may be included.

The information by which the base station apparatus 20 can be identified indicates communication apparatus user information, a communication apparatus manufacturing number, and the like. For example, a user ID, a call sign, and the like can be assumed as the communication apparatus user information. A communication apparatus user may uniquely generate the user ID, and the communication control apparatus 40 may preliminarily issue the user ID.

The information on the hardware of the base station apparatus 20 can include, for example, transmission power class information, manufacturer information, and the like. For example, in FCC C.F.R Part 96, two types of classes of Category A and Category B are specified in the transmission power class information, and either information can be included. Furthermore, in 3GPP TS 36.104 and TS 38.104, some classes of eNodeB and gNodeB are specified, and these classes may also be used.

The information on the software of the base station apparatus 20 can include, for example, version information, a build number, and the like related to an execution program in which processing necessary for interaction with the communication control apparatus 40 is written. Furthermore, version information, a build number, and the like of software for operating as the base station apparatus 20 may also be included.

Typically, the geographical position of the base station apparatus 20 can be identified by position-related information. For example, the position-related information includes coordinate information acquired by a positioning function represented by a global positioning system (GPS), Beidou, a quasi-zenith satellite system (QZSS), Galileo, and an assisted global positioning system (A-GPS). Typically, information related to latitude, longitude, altitude, and a positioning error may be included. Alternatively, for example, the position-related information may include position information registered in an information management apparatus managed by a national regulatory authority (NRA) or an agency thereof. Alternatively, for example, the position-related information may be coordinates of an X-axis, a Y-axis, and a Z-axis with a specific geographical position as an origin. Furthermore, an identifier indicating outdoor/indoor can be provided together with such coordinate information.

Furthermore, the position-related information may indicate a region in which the base station apparatus 20 is located. For example, information determined by the government such as a postal code, an address, and the like may be used. Furthermore, for example, a region may be indicated by a set of three or more geographical coordinates. Information indicating these regions may be provided together with the above-described coordinate information.

Furthermore, when the base station apparatus 20 is located indoors, information indicating a floor of a building may be given to the position-related information. For example, a floor number, an identifier indicating ground/underground, and the like may be given. Furthermore, for example, information indicating a further closed space inside a building, such as a room number and a room name in the building, may be given.

Typically, the above-described positioning function is desirably included in the base station apparatus 20. Position information satisfying a required accuracy, however, cannot necessarily be acquired depending on the performance and the installation position of the positioning function. For that reason, the positioning function may be used by an installer. In such a case, the position information measured by the installer is desirably written in the base station apparatus 20.

The antenna information typically indicates the performance, the configuration, and the like of an antenna of the base station apparatus 20. Typically, information such as an antenna installation height, downtilt, azimuth, a boresight, an antenna peak gain, and an antenna model can be included.

Furthermore, the antenna information can also include information on a formable beam. For example, information such as a beam width, a beam pattern, and an analog/digital beamforming capability can be included.

Furthermore, the antenna information can also include information on the performance and configuration of multiple input multiple output (MIMO) communication. For example, information such as the number of antenna elements and the maximum number of spatial streams can be included. Furthermore, codebook (codebook) information to be used, weight matrix information (unitary matrix obtained by singular value decomposition (SVD), eigen value decomposition (EVD), block diagonalization (BD), and the like, zero-forcing (ZF) matrix, and minimum mean square error (MMSE) matrix), and the like can be included. Furthermore, when maximum likelihood detection (MLD) and the like that require nonlinear calculation are provided, information indicating the MLD may be included.

The above-described antenna information may include Zenith of Direction (ZoD) and Departure. The ZoD is a type of radio arrival angle. The above-described ZoD may be estimated by another base station apparatus 20 from radio waves radiated from an antenna of the base station apparatus 20. In the case, the base station apparatus 20 may be a terminal apparatus that operates as a base station or an access point, an apparatus that performs D2D communication, a moving relay base station, or the like. The ZoD can be estimated by radio arrival direction estimating technology such as multiple signal classification (MUSIC) and estimation of signal propagation via rotation invariance techniques (ESPRITs). The ZoD can be used by the communication control apparatus 40 as measurement information.

The wireless interface information typically indicates wireless interface technology of the base station apparatus 20. For example, identifier information is included. The identifier information indicates technology used in GSM (registered trademark), CDMA2000, UMTS, E-UTRA, 5G New Radio (5GNR), or a further next-generation cellular system. The identifier information also indicates LTE-compliant derivative technology, such as MulteFire and LTE- Unlicensed (LTE-U), and standard technology such as a metropolitan area network (MAN) of WiMAX and WiMAX2+ and a wireless LAN of a type of IEEE 802.11. Furthermore, a version number or a release number of a technical specification that defines the technologies can also be given. The standard technology is not necessarily required to be included, and information indicating proprietary wireless technology may be included.

Furthermore, the wireless interface information can also include frequency band information supported by the base station apparatus 20. For example, the wireless interface information can be expressed by one or more combinations of an upper limit frequency and a lower limit frequency, one or more combinations of a central frequency and a bandwidth, one or more 3GPP operating band numbers, and the like.

Capability information of carrier aggregation (CA) or channel bonding can further be included as the frequency band information supported by the base station apparatus 20. For example, combinable band information and the like may be included. Furthermore, information on a band desired to be used as a primary component carrier (PCC) and a secondary component carrier (SCC) can be included for the carrier aggregation. Furthermore, the number of CCs that can be simultaneously aggregated can be included.

Furthermore, information indicating radio wave use priority such as the PAL and GAA may be included as the frequency band information supported by the base station apparatus 20.

Furthermore, the wireless interface information can also include modulation method information supported by the base station apparatus 20. For example, one typical example includes information indicating a primary modulation method and a secondary modulation method. The primary modulation method includes frequency shift keying (FSK), n-value phase shift keying (PSK) (n is 2, 4, 8, or the like), and n-value quadrature amplitude modulation (QAM) (n is 4, 16, 64, 256, or the like). The secondary modulation method includes orthogonal frequency division multiplexing (OFDM), DFT spread OFDM (DFT-s-OFDM), and a filter bank multi carrier (FBMC).

Furthermore, the wireless interface information can also include information on an error correcting code. For example, capabilities of a turbo code, a low density parity check (LDPC) code, and a polar code, and coding rate information to be applied can be included.

The modulation method information and the information on an error correcting code can also be expressed by a modulation and coding scheme (MCS) index in another aspect.

Furthermore, the wireless interface information may also include information indicating a function specific to each wireless technology supported by the base station apparatus 20. For example, one typical example include transmission mode (TM) information specified in LTE. In addition, those having two or more modes for a specific function can be included in the wireless interface information as in the above-described TM. Furthermore, in a technical specification, when the base station apparatus 20 supports a function that is not essential in the specification even if there are not two or more modes, information indicating the fact can also be included.

Furthermore, the wireless interface information can also include radio access technology (RAT) information supported by the base station apparatus 20. For example, information indicating orthogonal multiple access (OMA), non orthogonal multiple access (NOMA), opportunistic access, and the like can be included. The orthogonal multiple access (OMA) includes time division multiple access (TDMA), frequency division multiple access (FDMA), and orthogonal frequency division multiple access (OFDMA). The non orthogonal multiple access (NOMA) includes power division multiple access (PDMA) (approach implemented by a combination of superposition coding (SPC) and successive interference canceller (SIC) is typical example), code division multiple access (CDMA), sparse code multiple access (SCMA), interleaver division multiple access (IDMA), and spatial division multiple access (SDMA). The opportunistic access includes carrier sense multiple access/collision avoidance (CSMA/CA) and carrier sense multiple access/collision detection (CSMA/CD).

Furthermore, the wireless interface information can also include information related to a duplex mode supported by the base station apparatus 20. One typical example can include frequency division duplex (FDD), time division duplex (TDD), and full duplex (FD). When TDD is included as the wireless interface information, TDD frame configuration information used/supported by the base station apparatus 20 can be given. Furthermore, information related to the duplex mode may be included for each frequency band indicated by the above-described frequency band information.

Furthermore, the wireless interface information can also include information on a transmission diversity method supported by the base station apparatus 20. For example, space time coding (STC) and the like may be included.

Furthermore, the wireless interface information can also include guard band information. For example, information on a guard band size determined in conformity with a standard can be included. Alternatively, for example, information on a guard band size desired by the base station apparatus 20 may be included.

Legal information typically includes information on a regulation, which is determined by a national/local radio governmental agency or an equivalent organization and which the base station apparatus 20 is required to comply with, and authentication information acquired by the base station apparatus 20. Typically, the above-described information on a regulation can include, for example, upper limit value information on out-of-band radiation, information on blocking characteristics of a receiver, and the like. Typically, examples of the above-described authentication information can include type approval information (e.g., FCC ID and technical standard conformance certificate), legal regulation information serving as a standard for authentication acquisition (e.g., FCC rule number and ETSI harmonized standard number), and the like.

Information defined in a written standard of the wireless interface technology may be substituted for information on a numerical value among legal information. For example, an adjacent channel leakage ratio (ACLR) can be used instead of the upper limit value information of the out-of-band radiation to derive an upper limit value of the out-of-band radiation. Furthermore, the ACLR itself may be used, as necessary. Furthermore, adjacent channel selectivity (ACS) may be used instead of blocking characteristics. Furthermore, these substitutes may be used in combination, and an adjacent channel interference ratio (ACIR) may be used.

The installer information may include information by which a person who installs the base station apparatus 20 (installer) can be identified, unique information associated with the installer, and the like. For example, Non Patent Literature 2 discloses a certified professional installer registration ID (CPIR-ID) and a CPI name as the information by which an installer can be identified. Furthermore, for example, a mailing/contact address, an e-mail address, a telephone number, a public key identifier (PKI), and the like are disclosed as the unique information associated with an installer. These are not limitations, and another piece of information on an installer may be included, as necessary.

[Supplement of Required Parameter]

In a registration procedure, depending on the embodiment, it is assumed that a device parameter related not only to the base station apparatus 20 but to the terminal apparatus 30 is required to be registered in the communication control apparatus 40. In such a case, the term "communication apparatus" in the above description (details of required parameter) may be replaced with a term "terminal apparatus" or an equivalent term to be applied. Furthermore, a parameter specific to the "terminal apparatus", which is not described above (in details of required parameter) may also be treated as a required parameter in the registration procedure. For example, a user equipment (UE) category specified in 3GPP can be cited.

[Details of Registration Processing]

Figure 17:
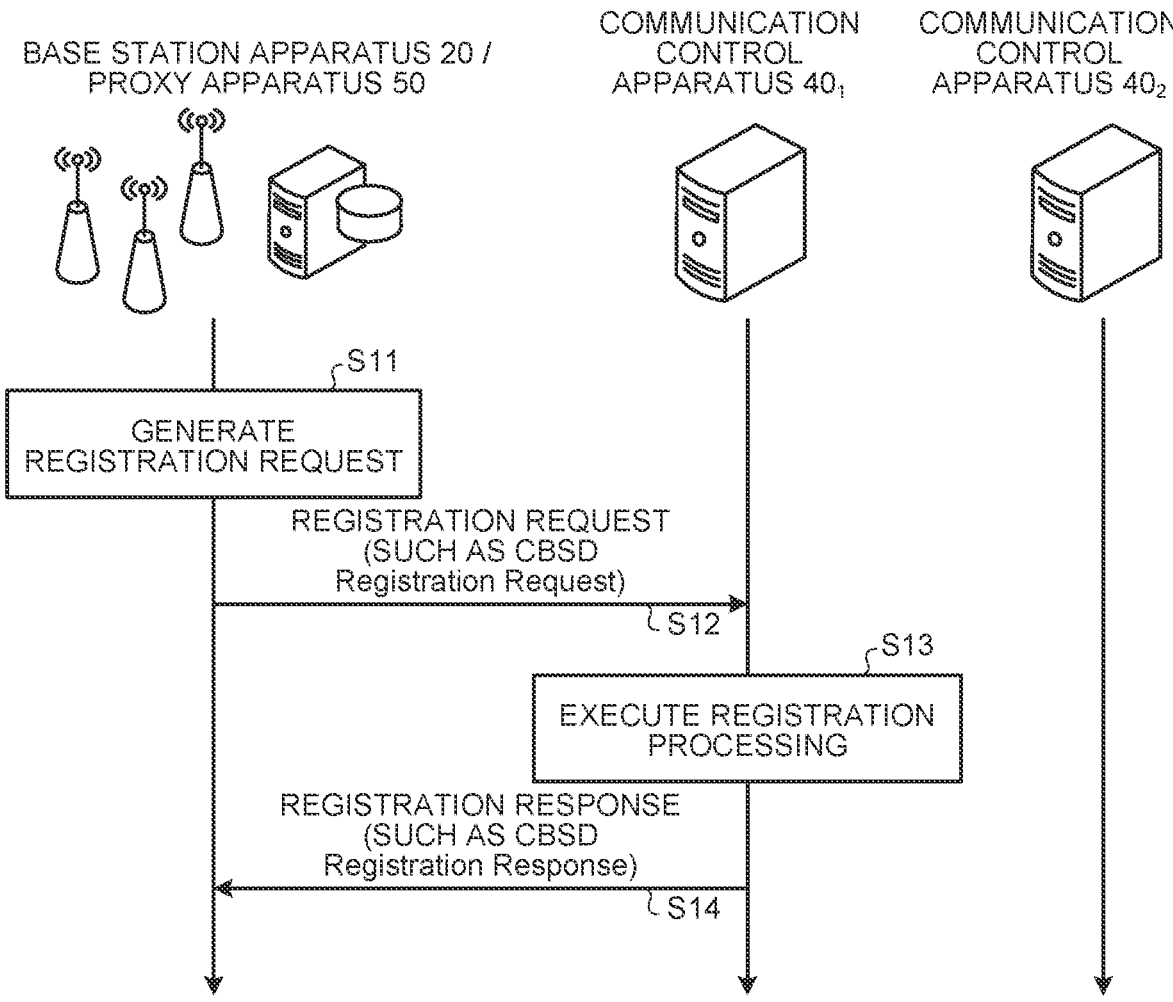
FIG. 17 is a sequence diagram for illustrating a registration procedure.

FIG. 17 is a sequence diagram for illustrating a registration procedure. One or more communication systems including the base station apparatus 20 or a plurality of base station apparatuses 20 generate a registration request message by using the above-described device parameter (Step S11), and notifies the communication control apparatus 40 of the registration request message (Step S12). The proxy apparatus 50 may perform generation and/or notification of the message.

Here, when the device parameter includes the installer information, falsification prevention processing and the like may be performed on the registration request by using the information. Furthermore, encryption processing may be performed on a part or all of the information in the registration request. Specifically, for example, processing, in which a public key specific to an installer is preliminarily shared between the installer and the communication control apparatus 40, and the installer encrypts information by using a secret key, can be performed. Examples of an object to be encrypted include security sensitive information such as position information.

Furthermore, as disclosed in Non Patent Literature 2, for example, the installer may directly write the position information into the communication control apparatus 40.

After receiving the registration request, the communication control apparatus 40 performs registration processing of the base station apparatus 20 (Step S13), and returns a registration response in accordance with a processing result (Step S14). If there is no shortage or abnormality of information necessary for registration, the communication control apparatus 40 records the information in the storage unit 42, and gives a notification of normal completion. Otherwise, the communication control apparatus 40 gives a notification of registration failure. When the registration is normally completed, the communication control apparatus 40 may individually allocate IDs to communication apparatuses, and give a notification with information on the IDs enclosed at the time of response. If the registration fails, typically, one or more communication systems including the base station apparatus 20 or the plurality of base station apparatuses 20, or an operator (e.g., mobile communication carrier or individual) or an installer thereof, for example, corrects the registration request, and tries the registration procedure until the registration is normally completed.

Note that a plurality of times of registration procedures is sometimes executed. Specifically, for example, the registration procedure can be re-executed when the position information is changed beyond a predetermined standard due to movement/accuracy improvement and the like. The predetermined standard is typically defined by a legal system. For example, in 47C.F.R Part 15, a mode II personal/portable white space device is obligated to access a database again when the position information is changed by 100 meters or more.

<5-2. Available Spectrum Query Procedure>

In the available spectrum query procedure, the base station apparatus 20, the proxy apparatus 50, or the like queries the communication control apparatus 40 about information on an available spectrum. Typically, the procedure is started when the base station apparatus 20, the proxy apparatus 50, or the like gives a query request including information by which the base station apparatus 20 (or base station apparatus 20 below proxy apparatus 50) can be identified to the communication control apparatus 40.

(1) Example 1

Here, the available spectrum information typically indicates a frequency that does not give fatal interference to the primary system at the position of the base station apparatus 20 (or base station apparatus 20 below proxy apparatus 50) and that can be secondarily used safely. For example, when the base station apparatus 20 is installed in a secondary use prohibited area such as an exclusion zone to protect the primary system using a frequency channel F1, the base station apparatus 20 is not notified of the frequency channel F1 as an available channel.

(2) Example 2

Furthermore, for example, when it is determined that fatal interference is given to the primary system even outside the secondary use prohibited area, the frequency channel is sometimes not announced as an available channel.

(3) Example 3

Furthermore, the available spectrum information may include a frequency channel that is not announced as being available depending on a condition other than the primary system protection requirement in Example 2. Specifically, for example, in order to preliminarily avoid interference that may occur between the base station apparatuses 20, a frequency channel being used by another base station apparatus 20 in the vicinity of the base station apparatus 20 (or base station apparatus 20 below proxy apparatus 50) is sometimes not announced as the available channel.

(4) Example 4

Even in a case corresponding to these cases (Example 2 and Example 3), the same frequency as that of the primary system or a neighboring base station apparatus 20 can be announced as an available channel. In such a case, typically, the available spectrum information includes the maximum acceptable transmission power information. The maximum acceptable transmission power is typically expressed by equivalent isotropic radiated power (EIRP). The maximum acceptable transmission power is not necessarily limited thereto, and may be provided by a combination of conducted power and antenna gain, for example. Feeder loss may also be included. Moreover, the antenna gain may be set with acceptable peak gain for each spatial direction.

[Details of Required Parameter]

The information by which the base station apparatus 20 can be identified can be assumed to include, for example, information specific to a communication apparatus registered at the time of the above-described registration procedure, ID information described above (in details of registration processing), and the like.

Furthermore, the query request can also include query requirement information. The query requirement information can include, for example, information indicating a frequency band for which it is desired to know whether or not the frequency band is available. Furthermore, for example, transmission power information can be included. For example, when the base station apparatus 20 or the proxy apparatus 50 desires to know only information on a frequency in which desired transmission power can probably be used, the transmission power information can be included. The query requirement information does not necessarily need to be included.

Furthermore, the query request can also include a measurement report. The measurement report includes a result of measurement performed by the base station apparatus 20 and/or the terminal apparatus 30. For example, not only raw data but processed information may be included. For example, standardized metrics represented by reference signal received power (RSRP), a reference signal strength indicator (RSSI), and reference signal received quality (RSRQ) may be used.

[Details of Available Spectrum Evaluation Processing]

Figure 18:
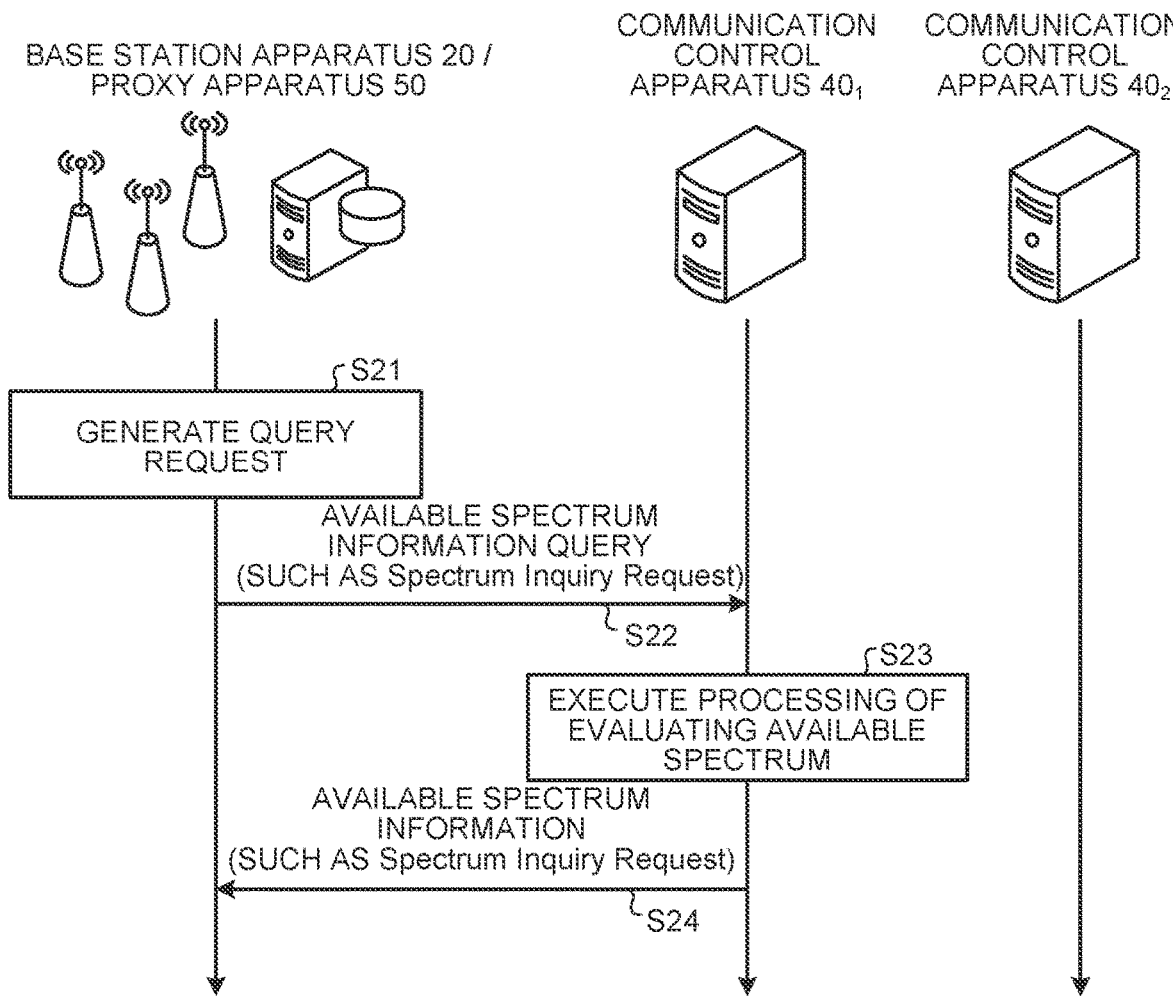
FIG. 18 is a sequence diagram for illustrating an available spectrum query procedure.

FIG. 18 is a sequence diagram for illustrating the available spectrum query procedure. The base station apparatus 20 or the proxy apparatus 50 generates a query request including information by which the base station apparatus 20 (or base station apparatus 20 below proxy apparatus 50) can be identified (Step S21), and notifies the communication control apparatus 40 (Step S22).

After receiving the query request, the communication control apparatus 40 evaluates an available spectrum based on the query requirement information (Step S23). For example, as described in Examples 1 to 3 above, evaluating an available spectrum can be performed in consideration of the primary system, a prohibited area 303 where secondary use thereof is prohibited, and the existence of a neighboring base station apparatus 20.

As described in Example 4 above, the communication control apparatus 40 may derive maximum acceptable transmission power information. Typically, the maximum acceptable transmission power is calculated by using acceptable interference power information in the primary system or a protection zone thereof, calculation reference point information on a level of interference power received by the primary system, registration information of the base station apparatus 20, and a propagation loss estimation model. Specifically, in one example, the maximum acceptable transmission power is calculated by the following mathematical expression.

$$P_{MaxTx\ (dBm)} = I_{Th\ (dBm)} + PL(d)_{(dB)} \qquad (1)$$

Here, $P_{MaxTx\ (dBm)}$ is maximum acceptable transmission power, $I_{Th\ (dBm)}$ is acceptable interference power, d is a distance between a reference point and a base station apparatus 20, and $PL(d)_{(dB)}$ is propagation loss at the distance d. Although the antenna gain in a transceiver is not explicitly indicated in the mathematical expression, the antenna gain may be included in accordance with a method of expressing maximum acceptable transmission power (e.g., EIRP and conducted power) and a consultation point (e.g., antenna input point and antenna output point) of received power. Furthermore, a safety margin and the like for compensating for variation due to fading may be included. Furthermore, feeder loss and the like may be considered, as necessary.

Furthermore, the above mathematical expression is written based on the assumption that a single base station apparatus 20 is an interference source. For example, when it is necessary to simultaneously consider aggregated interference from a plurality of base station apparatuses 20, a correction value may be added. Specifically, for example, the correction value can be determined based on three types (fixed/predetermined, flexible, and flexible minimized) of interference margin methods disclosed in Non Patent Literature 3.

Note that, although the above mathematical expression is expressed by using logarithms, the mathematical expression may, off course, be used after conversion into an antilogarithm at the time of execution. Furthermore, all parameters in logarithmic notation described in the embodiment may be appropriately converted into antilogarithms.

(1) Approach 1

Furthermore, as described in the above-described section (details of required parameter), when the query requirement information includes the transmission power information, the available spectrum can be evaluated by a method different from the above-described method. Specifically, for example, an estimated interfering amount falls below the acceptable interference power in the primary system or the protection zone thereof in a case where desired transmission power indicated by the transmission power information is assumed to be used, the frequency channel is determined to be available, and the base station apparatus 20 (or proxy apparatus 50) is notified of the frequency channel.

(2) Approach 2

Although an example in which the above-described band use condition is calculated based on the above-described other system related information has been described, the present disclosure is not limited to such an example. For example, similarly to an area of a radio environment map (REM), when an area/space in which the base station apparatus 20 can use a shared band is preliminarily determined, the available spectrum information may be derived based only on the above-described position-related information and the above-described height-related information. Furthermore, for example, also when a lookup table associating a position and a height with the available spectrum information is prepared, the above-described available spectrum information may be derived based only on the above-described position-related information and the above-described height-related information.

The available spectrum does not necessarily need to be evaluated after reception of a query request. For example, after the above-described registration procedure is normally completed, the communication control apparatus 40 may independently evaluate the available spectrum without the query request. In such a case, the communication control apparatus 40 may create the REM or the lookup table described in Approach 2 or an information table similar thereto.

In any approach, the radio wave use priority such as the PAL and GAA can be evaluated. For example, when the registered device parameter or the query requirement includes information on the radio wave use priority, whether or not a frequency can be used may be determined based on the priority to be announced. Furthermore, for example, as disclosed in Non Patent Literature 2, when a user preliminarily registers information on the base station apparatus 20 that performs high priority use (e.g., PAL) (referred to as cluster list in Non Patent Literature 2) in the communication control apparatus 40, evaluation may be performed based on the information.

After the evaluation of the available spectrum is completed, the communication control apparatus 40 notifies the base station apparatus 20 (or proxy apparatus 50) of an evaluation result (Step S24). The base station apparatus 20 may select a desired communication parameter by using the evaluation result received from the communication control apparatus 40.

<5-3. Spectrum Grant Procedure>

In a spectrum grant procedure, the base station apparatus 20 or the like receives grant of secondary use of a frequency from the communication control apparatus 40. Typically, after the registration procedure is normally completed, the procedure is started when one or more communication systems including the base station apparatus 20 or a plurality of base station apparatus 20 notify the communication control apparatus 40 of a spectrum grant request including information by which the base station apparatus 20 can be identified. The proxy apparatus 50 may give the notification. Note that the phrase "after the registration procedure is normally completed" also means that the available spectrum query procedure is not necessarily needed to be performed.

In the embodiment, it is assumed that at least two types of methods of spectrum grant request below can be used.

Designation Method

Flexible Method

The designation method is a request method in which the base station apparatus 20 designates at least a frequency band and maximum transmission power desired to be used as desired communication parameters and requests the communication control apparatus 40 to grant operation based on the desired communication parameters. These parameters are not necessarily limitations, and a parameter specific to the wireless interface technology (e.g., modulation method and duplex mode) may be designated. Furthermore, information indicating the radio wave use priority such as the PAL and GAA may be included.

The flexible method is a request method in which the base station apparatus 20 designates only a requirement regarding a communication parameter and requests the communication control apparatus 40 to designate a communication parameter by which the requirement is satisfied and secondary use can be granted. The requirement regarding a communication parameter can include a bandwidth, a desired maximum transmission power, or a desired minimum transmission power. These parameters are not necessarily limitations, and a parameter specific to the wireless interface technology (e.g., modulation method and duplex mode) may be designated. Specifically, for example, one or more of TDD frame configurations may be preliminarily selected and announced.

In any method, a measurement report may be included. The measurement report includes a result of measurement performed by the base station apparatus 20 and/or the terminal apparatus 30. For example, not only raw data but processed information may be included. For example, standardized metrics represented by reference signal received power (RSRP), a reference signal strength indicator (RSSI), and reference signal received quality (RSRQ) may be used.

[Details of Spectrum Grant Processing]

Figure 19:
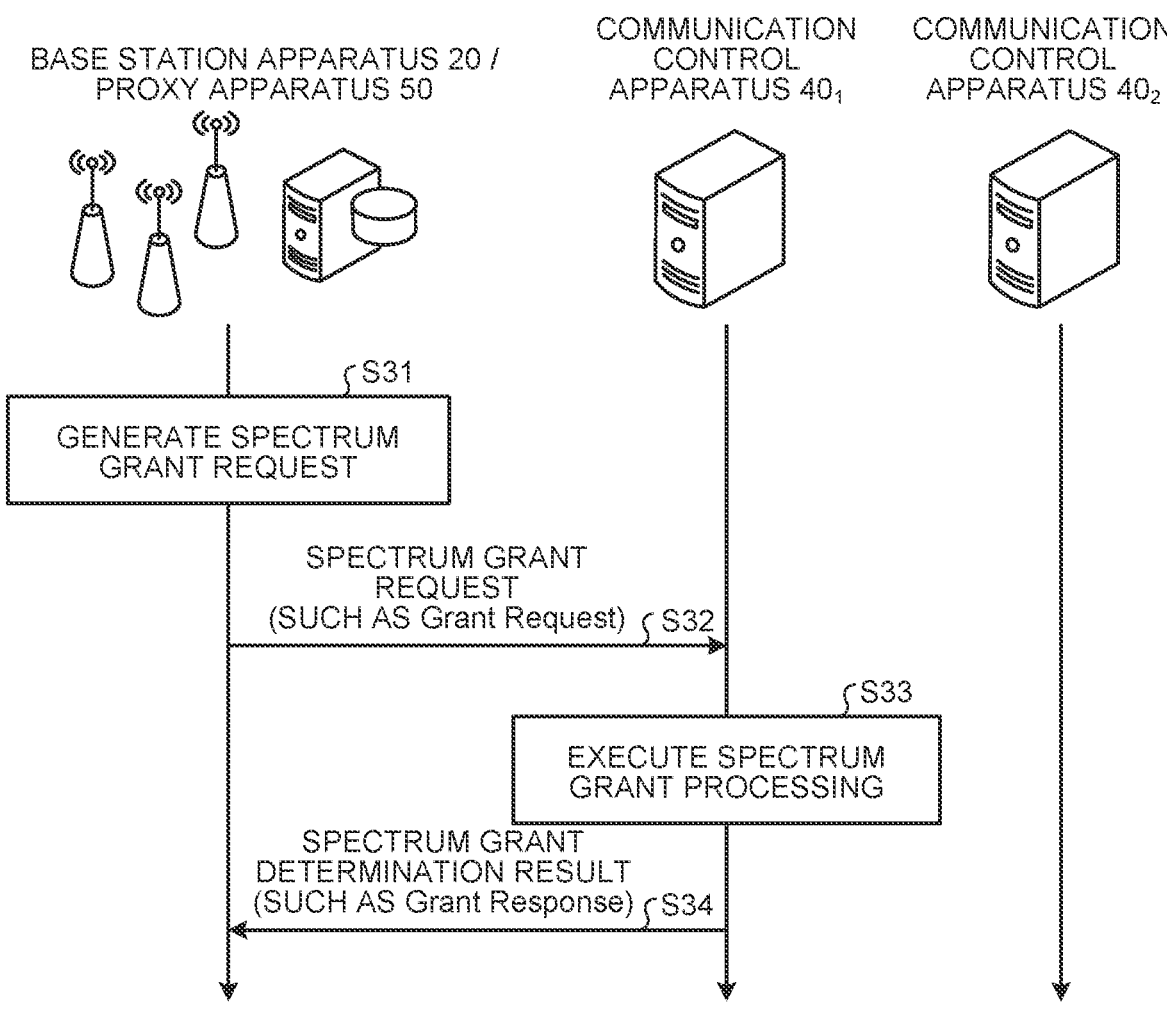
FIG. 19 is a sequence diagram for illustrating a spectrum grant procedure.

FIG. 19 is a sequence diagram for illustrating a spectrum grant procedure. One or more communication systems including the base station apparatus 20 or a plurality of base station apparatus 20 generate a spectrum grant request including information by which the base station apparatus 20 can be identified (Step S31), and notifies the communication control apparatus 40 of the spectrum grant request (Step S32). The proxy apparatus 50 may perform generation and/or notification of the request. For example, the acquisition unit 441 of the communication control apparatus 40 acquires the spectrum grant request.

After acquiring the spectrum grant request, the communication control apparatus 40 performs spectrum grant processing based on a spectrum grant request method (Step S33). For example, the communication control apparatus 40 can perform the spectrum grant processing in consideration of the primary system, the prohibited area 303 where secondary use thereof is prohibited, and the existence of the neighboring base station apparatus 20 by using the approaches described in Examples 1 to 3 of <5-2. Available Spectrum Query Procedure>.

When the flexible method is used, the communication control apparatus 40 may derive the maximum acceptable transmission power information by using the method described in Example 4 of <5-2. Available Spectrum Query Procedure>. Typically, the communication control apparatus 40 calculates the maximum acceptable transmission power by using acceptable interference power information in the primary system or a protection zone thereof, calculation reference point information on a level of interference power received by the primary system, registration information of the base station apparatus 20, and a propagation loss estimation model. For example, the communication control apparatus 40 calculates the maximum acceptable transmission power by the following Expression (2).

$$P_{MaxTx\ (dBm)} = I_{Th\ (dBm)} + PL(d)_{(dB)} \qquad (2)$$

Here, $P_{MaxTx\ (dBm)}$ is maximum acceptable transmission power, $I_{Th\ (dBm)}$ is acceptable interference power, d is a distance between a reference point and a base station apparatus 20, and $PL(d)_{(dB)}$ is propagation loss at the distance d. Although the antenna gain in a transceiver is not explicitly indicated in the mathematical expression, the mathematical expression may be deformed in accordance with a method of expressing maximum acceptable transmission power (e.g., EIRP and conducted power) and a consultation point (e.g., antenna input point and antenna output point) of received power. Furthermore, a safety margin and the like for compensating for variation due to fading may be included. Furthermore, feeder loss and the like may be considered, as necessary.

Furthermore, the above mathematical expression is written based on the assumption that a single base station apparatus 20 is an interference source. For example, when it is necessary to simultaneously consider aggregated interference from a plurality of base station apparatuses 20, a correction value may be added. Specifically, for example, the correction value can be determined based on three types (fixed/predetermined, flexible, and flexible minimized) of methods disclosed in Non Patent Literature 3.

Various models may be used as the propagation loss estimation model. When a model is designated for each application, the designated model is desirably used. For example, in Non Patent Literature 6, a propagation loss model such as extended Hata (eHATA) and irregular terrain model (ITM) is adopted for each application. Certainly, at the time of implementing the present invention, the propagation loss model does not need to be limited thereto.

In a predetermined application, when a model is not designated, models may be selectively used, as necessary. In one specific example, models can be selectively used. For example, when interfering power to another base station apparatus 20 is estimated, an aggressive model such as a free space loss model is used. When the coverage of the base station apparatus 20 is estimated, a conservative model is used.

Furthermore, when the designation method is used, the spectrum grant processing can be performed by using the method described in Approach 1 of <5-2. Available Spectrum Query Procedure>. Specifically, for example, when an estimated interfering amount falls below the acceptable interference power in the primary system or the protection zone thereof in a case where desired transmission power indicated by the transmission power information is assumed to be used, the use of the frequency channel is determined to be permissible, and the base station apparatus 20 (or proxy apparatus 50) is notified of the determination.

In any approach, the radio wave use priority such as the PAL and GAA can be evaluated. For example, when the registered device parameter or the query requirement includes information on the radio wave use priority, whether or not a frequency can be used may be determined based on the priority to be announced. Furthermore, for example, as disclosed in Non Patent Literature 2, when a user preliminarily registers information on the base station apparatus 20 that performs high priority use (e.g., PAL) (referred to as cluster list in Non Patent Literature 2) in the communication control apparatus 40, evaluation may be performed based on the information.

The spectrum grant processing does not necessarily need to be performed at the time of reception of a request. For example, after the above-described registration procedure is normally completed, the communication control apparatus 40 may independently perform the spectrum grant processing without the spectrum grant request. Furthermore, for example, spectrum grant determination processing may be performed at regular periods. In such a case, the REM or the lookup table described in Approach 2 of <5-2. Available Spectrum Query Procedure> or an information table similar thereto may be created.

After completing the spectrum grant processing, the communication control apparatus 40 notifies the base station apparatus 20 of the determination result (Step S34).

<5-4. Spectrum Use Notification/Heartbeat>

The spectrum use notification is a procedure in which the base station apparatus 20, the proxy apparatus 50, or the like notifies the communication control apparatus 40 of the frequency use based on the communication parameter allowed to be used in the above-described spectrum grant procedure. Typically, the procedure is started when the base station apparatus 20 or the proxy apparatus 50 notifies the communication control apparatus 40 of a notification message including information by which the base station apparatus 20 can be identified.

The procedure is desirably performed periodically until the communication control apparatus 40 rejects the spectrum use. When the procedure is normally completed, the base station apparatus 20 may start or continue to transmit radio waves. For example, if the state of grant is "granted", the state of the grant shifts to "authorized" due to the success of the procedure. Furthermore, if the state of the grant is "authorized", the state of the grant shifts to "granted" or "Idole" due to the failure of the procedure.

Here, the grant is authorization for radio wave transmission given by the communication control apparatus 40 (e.g., SAS) to the base station apparatus 20 (e.g., CBSD) and the like. The "grant" can be rephrased with permission for using radio resources (frequency resources). The grant is described in, for example, Non Patent Literature 2. In Non Patent Literature 2, a signaling protocol between a database (SAS) and a base station (CBSD) for spectrum access of 3550 to 3700 MHz in the United States is standardized. In the standard, authorization of radio wave transmission given by an SAS to a CBSD is called "Grant". An operation parameter allowed by the grant is defined by two of a maximum acceptable equivalent isotropic radiated power (EIRP) and a frequency channel. That is, in order to transmit radio waves by using a plurality of frequency channels, the CBSD needs to acquire a plurality of grants from the SAS.

Figure 20:
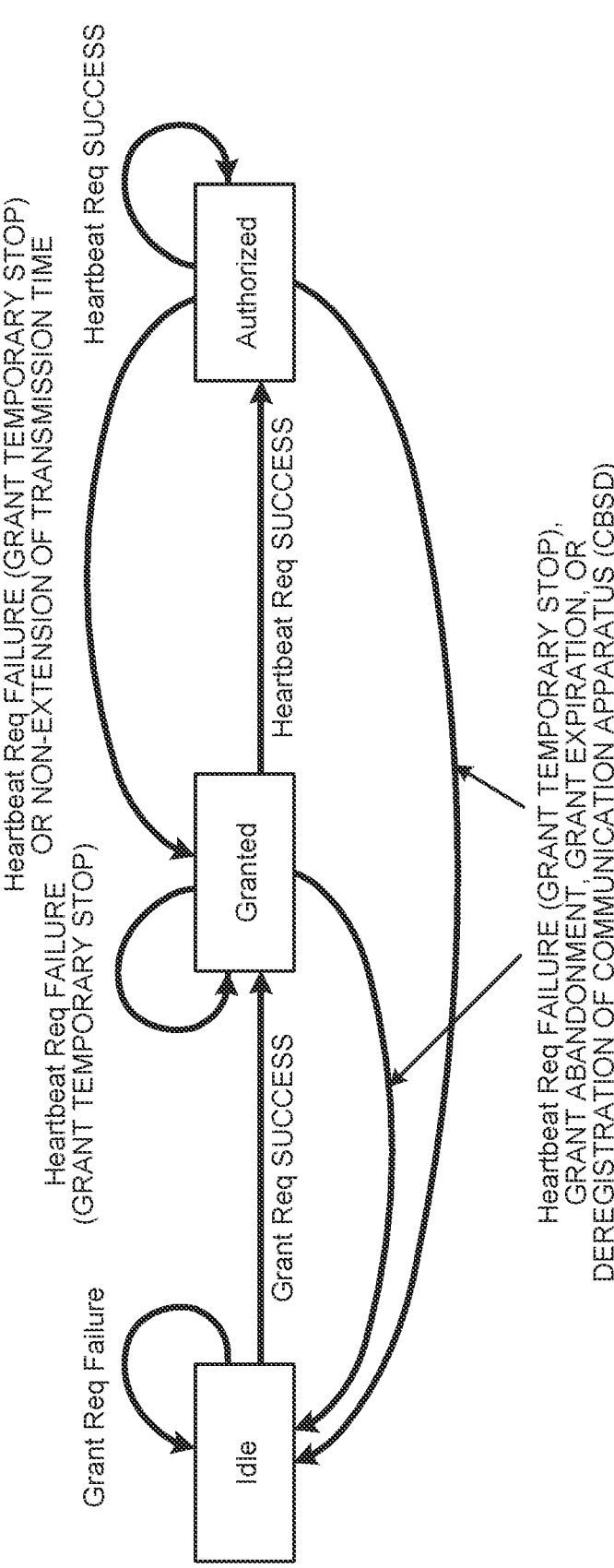
FIG. 20 is a state transition diagram illustrating a grant state of radio wave transmission.

In the grant, a state indicating a grant state of radio wave transmission is defined. FIG. 20 is a state transition diagram illustrating a grant state of radio wave transmission. In FIG. 20, in a granted state, a grant is held, but radio waves are not allowed to be transmitted. In an authorized state, radio wave transmission is permitted based on an operation parameter value defined by the grant. These two states transition in accordance with a result of a heartbeat procedure defined in the same standard.

In the following description, the spectrum use notification may be referred to as a heartbeat request or simply a heartbeat. Furthermore, a transmission interval of a heartbeat request may be referred to as a heartbeat interval. Note that, in the following description, the heartbeat request or the heartbeat can be appropriately replaced with another term indicating "a request for starting or continuing to transmit radio waves". Similarly, the heartbeat interval can be replaced with another term (e.g., transmission interval) indicating the transmission interval between spectrum use notifications.

Figure 21:
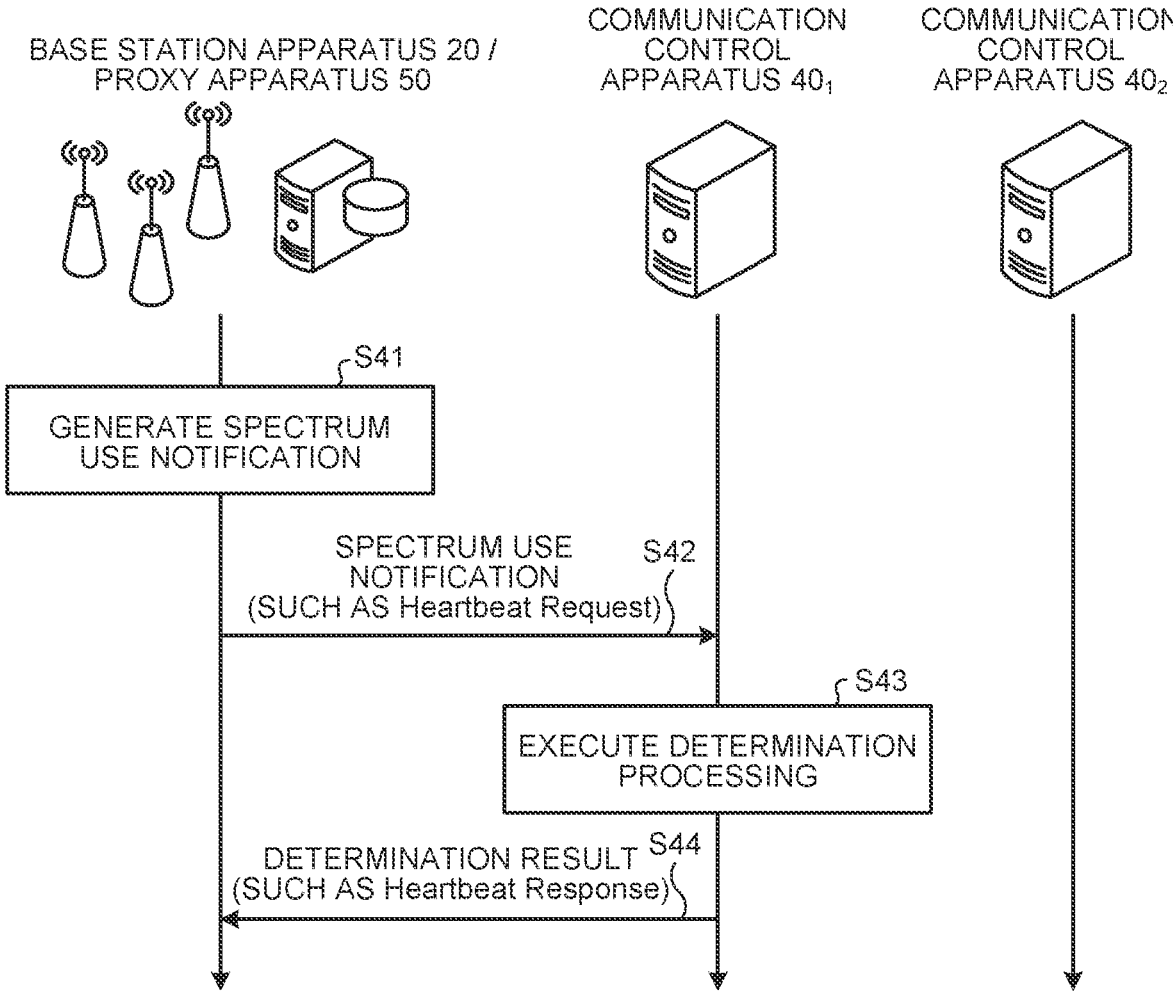
FIG. 21 is a sequence diagram for illustrating a spectrum use notification procedure.

FIG. 21 is a sequence diagram for illustrating a spectrum use notification procedure. One or more communication systems including the base station apparatus 20 or a plurality of base station apparatus 20 generate a notification message including information by which the base station apparatus 20 can be identified (Step S41), and notifies the communication control apparatus 40 of the notification message (Step S42). The proxy apparatus 50 may perform generation and/or notification of the message.

After receiving the spectrum use notification, the communication control apparatus 40 may determine whether or not the start/continuation of the radio wave transmission is accepted (Step S43). Examples of the determination method include confirmation of frequency use information of the primary system. Specifically, the start/continuation grant or rejection of radio wave transmission can be determined based on change in a frequency used by the primary system, change in a frequency use situation of the primary system (e.g., ship-based radar) which does not stationarily use radio waves, and the like.

After the determination processing is completed, the communication control apparatus 40 notifies the base station apparatus 20 (or proxy apparatus 50) of the determination result (Step S44).

In the procedure, the communication control apparatus 40 may give a communication parameter reconfiguration command to the base station apparatus 20 (or proxy apparatus 50) and the like. Typically, the command may be performed in a response of the spectrum use notification. For example, recommended communication parameter information can be provided.

<5-5. Supplement to Various Procedures>

Here, the various procedures do not necessarily need to be individually implemented as described below. For example, two different procedures may be implemented by substituting a third procedure having functions of the above-de-scribed two different procedures. Specifically, for example, the registration request and the available spectrum information query request may be integrally announced. Furthermore, for example, the spectrum grant procedure and the spectrum use notification may be integrally implemented. Of course, these combinations are not limitations, and three or more procedures may be integrally implemented. Furthermore, the above-described procedures may be separately implemented.

Furthermore, when the embodiment is applied for the purpose of spectrum access with an incumbent system, it is desirable that appropriate various procedures or equivalent procedures are selected and used based on a radio law according to the frequency band in a nation/region in which the technology of the embodiment is implemented. For example, when registration of a communication apparatus is made obligatory for using a specific frequency band in a specific nation/region, the above-described registration procedure is desirably performed.

Furthermore, the expression of "acquiring information" or an expression equivalent thereto in the embodiment does not necessarily mean acquisition in accordance with the above-described procedure. For example, although use of the position information of the base station apparatus 20 is described in the available spectrum evaluation processing, information acquired by a registration procedure does not necessarily need to be used. When an available spectrum query procedure request includes the position information, the expression or an expression equivalent thereto means that the position information may be used. In other words, the expression or an expression equivalent thereto means that the described parameters may be included in another procedure within the scope described in the embodiment and within the scope of technical feasibility.

Furthermore, information that can be included in a response from the communication control apparatus 40 to the base station apparatus 20 (or proxy apparatus 50) and the like described in the above-described procedure may be given by push notification. In one specific example, available spectrum information, recommended communication parameter information, radio wave transmission continuation rejection notification, and the like may be given by the push notification.

<5-6. Various Procedures Regarding Terminal Apparatus>

Basically, the procedures described in <5-1> to <5-4> can be adopted for the terminal apparatus 30. Note, however, that, unlike the base station apparatus 20, the terminal apparatus 30 has mobility. That is, position information is dynamically updated. When the position information changes by a certain degree or more, reregistration to the communication control apparatus 40 may be made obligatory depending on legal systems. Therefore, the following two types of communication parameters are specified in an operation form determined by the United Kingdom Office of Communication (Ofcom) (see Non Patent Literature 4).

Specific Operational Parameters
Generic Operational Parameters

The specific operational parameters are defined as "operation parameters specific to a specific slave white space device (WSD)" in the Non Patent Literature. In other words, the specific operational parameters are communication parameters calculated by using a device parameter of the slave WSD corresponding to the terminal apparatus 30. The specific operational parameters are characterized by being calculated by a white space database (WSDB) by using the position information of the slave WSD.

From such a feature, the specific operational parameters are assumed to be suitable for the terminal apparatus 30 that has low mobility or that is fixedly installed.

The generic operational parameters are defined as "operation parameters that can be used by any slave WSD located in the coverage area of a predetermined master WSD (corresponding to the base station apparatus 20)" in the Non Patent Literature. The generic operational parameters are characterized by being calculated by a WSDB without using the position information of the slave WSD.

From such a feature, the generic operational parameters are assumed to be suitable for the terminal apparatus 30 having high mobility.

These pieces of information for the terminal apparatus 30 can be provided from the base station apparatus 20 by unicast/broadcast. For example, a broadcast signal represented by a contact verification signal (CVS) specified in FCC rule Part 15 Subpart H can be used. Alternatively, the information may be provided by a broadcast signal specific to a wireless interface. Specifically, for example, the information may be provided by a physical broadcast channel (PBCH), NR-PBCH, and the like used in LTE and 5GNR.

<5-7. Procedure Occurring Between Communication Control Apparatuses>

[Information Exchange]

Figure 22:
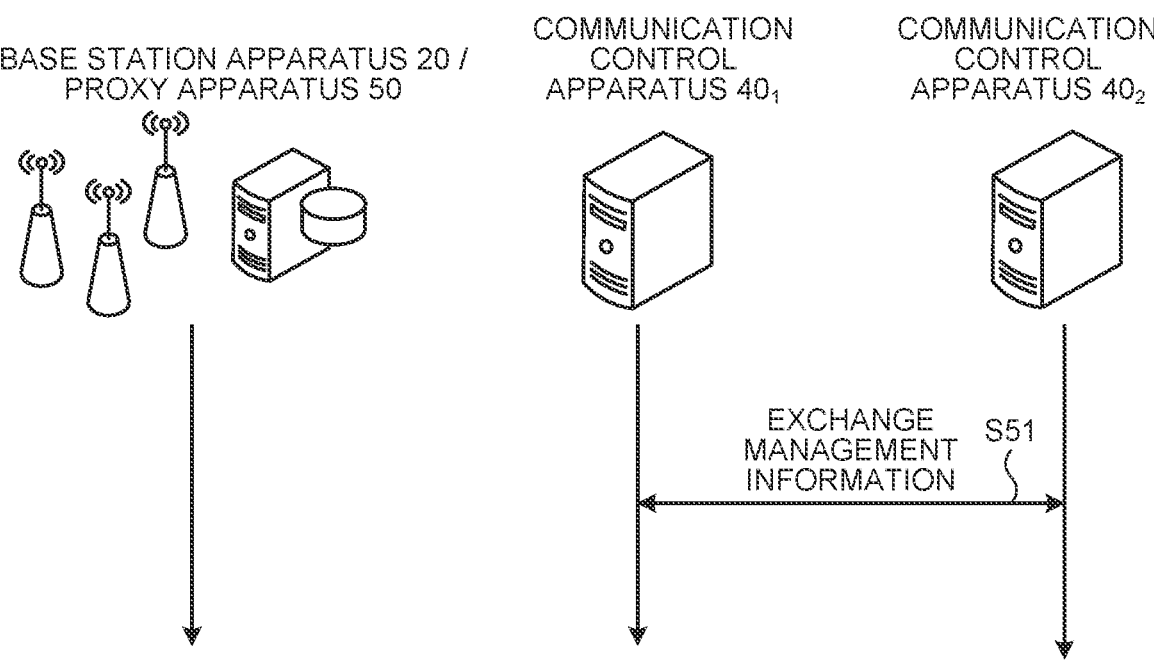
FIG. 22 is a sequence diagram for illustrating a management information exchange procedure.

The communication control apparatus 40 can exchange management information with another communication control apparatus 40. FIG. 22 is a sequence diagram for illustrating a management information exchange procedure. In the example of FIG. 22, the communication control apparatus 40₁ and the communication control apparatus 40₂ exchange management information (Step S51). Of course, the communication control apparatus that exchanges information is not limited to two of the communication control apparatus 40₁ and the communication control apparatus 40₂.

In the management information exchange procedure, at least the following information is desirably exchanged.

Communication apparatus registration information

Communication apparatus communication parameter information Area information

The communication apparatus registration information is typically a device parameter of the base station apparatus 20 registered in the communication control apparatus 40 in the above-described registration procedure. Not all the registered information need to be exchanged. For example, information that may correspond to personal information does not need to be exchanged. Furthermore, when the communication apparatus registration information is exchanged, encrypted/obscured information may be exchanged. For example, information converted into a binary value or information signed by using an electronic signature system may be exchanged.

Typically, the communication apparatus communication parameter information relates to a communication parameter currently used by the base station apparatus 20. Information indicating at least a use frequency and transmission power is desirably included. Other communication parameters may be included.

The area information indicates, typically, a predetermined geographical region. The information can include region information of various attributes in various aspects.

For example, protection region information of the base station apparatus 20 serving as a high priority secondary system such as a PAL protection area (PPA) disclosed in Non Patent Literature 5 may be included. The area information in the case can be expressed by, for example, a set of three or more geographical position coordinates. Furthermore, for example, when a plurality of communication control apparatuses 40 can refer to a common external database, the area information can be expressed by an ID indicating the information.

Furthermore, for example, information indicating the coverage of the base station apparatus 20 may be included. The area information in the case can also be expressed by, for example, a set of three or more geographical position coordinates. Furthermore, for example, the area information can be expressed by information indicating a radius size assuming a circle having a geographical position of the base station apparatus 20 as the origin. Furthermore, for example, when a plurality of communication control apparatuses 40 can refer to a common external database, the area information can be expressed by an ID indicating the information.

Furthermore, in another aspect, information related to an area section preliminarily determined by the government or the like can be included. Specifically, for example, a certain region can be indicated by indicating an address. Furthermore, for example, a license area and the like can be similarly expressed.

Furthermore, in still another aspect, the area information does not necessarily need to express a planar area, and may express three-dimensional space. For example, the area information may be expressed by using a spatial coordinate system. Furthermore, for example, information indicating predetermined closed space such as a floor number, a floor, and a room number of a building may be used.

These pieces of information can be exchanged in various methods. One example thereof will be described below.

ID designation method

Period designation method

Region designation method

Dump method

In the ID designation method, an ID preliminarily given to identify information managed by the communication control apparatus 40 is used, and information corresponding to the above-described ID is acquired. For example, it is assumed that a communication control apparatus 401 manages the base station apparatus 20 with ID: AAA. In the case, a communication control apparatus 402 designates the ID: AAA and makes an information acquisition request to the communication control apparatus 401. After receiving the request, the communication control apparatus 401 searches for information on ID: AAA, and announces the registration information and the communication parameter information of the corresponding base station apparatus 20 in a response.

In the period designation method, a specific period is designated, and information satisfying a predetermined condition can be exchanged during the period.

Examples of the predetermined condition include whether or not information is updated. For example, when acquisition of the communication apparatus information in a specific period is designated by a request, registration information and communication parameter information of the base station apparatus 20 in which registration information and communication parameter information of the base station apparatus 20 newly recorded in the specific period have been changed can be announced in a response.

Examples of the predetermined condition include whether or not the communication control apparatus 40 performs recording. For example, when acquisition of the communication apparatus information in a specific period is designated by a request, registration information and communication parameter information of the base station apparatus 20 recorded by the communication control apparatus 40 in the period can be announced in a response. Moreover, latest information in the period can be announced. Alternatively, update history may be announced for each piece of information.

In the region designation method, a specific region is designated, and information belonging to the region is exchanged. For example, when acquisition of the communication apparatus information in a specific region is designated by a request, registration information and communication parameter information of the base station apparatus 20 installed in the region can be announced in a response.

In the dump method, all pieces of information recorded by the communication control apparatus 40 are provided. At least information related to the base station apparatus 20 and the area information are desirably provided in the dump method.

All of the descriptions so far about the information exchange between the communication control apparatuses 40 are based on a pull method. That is, the pull method is a form in which information corresponding to a parameter designated by a request is responded, and can be implemented by an HTTP GET method in one example. The present invention is, however, not limited to the pull method, and information may be actively provided to another communication control apparatus 40 by a push method. The push method can be implemented by an HTTP POST method in one example.

[Command/Request Procedure]

The communication control apparatuses 40 may make a command and/or a request to each other. Specifically, in one example, reconfiguration of communication parameters of the base station apparatus 20 can be cited. For example, when it is determined that the base station apparatus $20_1$ managed by the communication control apparatus $40_1$ receives a large amount of interference from the base station apparatus $20_4$ managed by the communication control apparatus $40_2$, the communication control apparatus $40_1$ may request the communication control apparatus $40_2$ to change the communication parameters of the base station apparatus $20_4$.

Reconfiguration of the area information can be cited as another example. For example, when a flaw is found in calculation of the coverage information and the protection region information regarding the base station apparatus $20_4$ managed by the communication control apparatus $40_2$, the communication control apparatus $40_1$ may request the communication control apparatus $40_2$ to reconfigure the area information. The area information reconfiguration request may be made for various other reasons.

6. OPERATION RELATED TO GRANT

Next, an operation example related to grant will be described.

<6-1. Initial Registration Sequence (when Current Position is in Permitted Area)>

Figure 23:
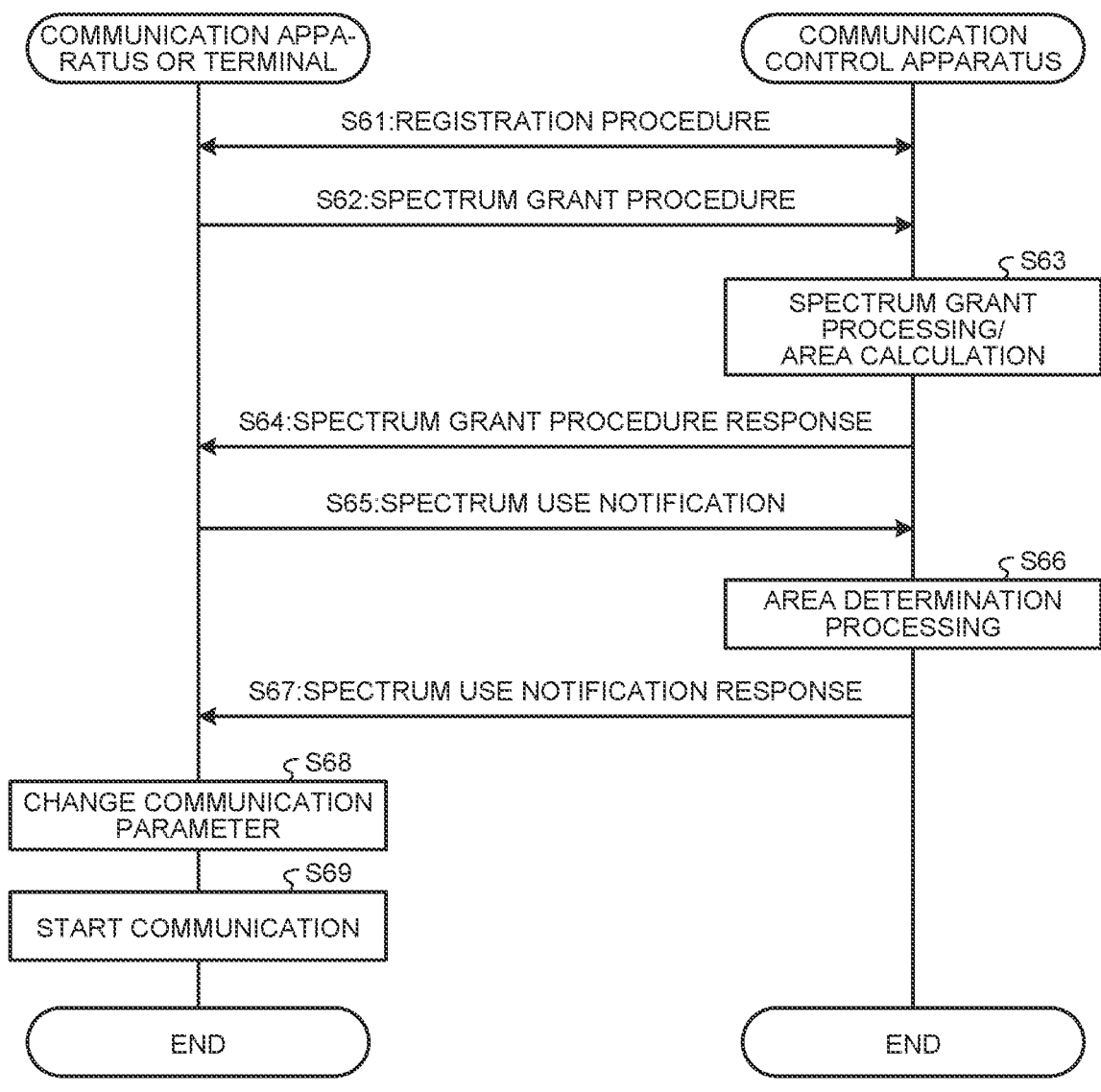
FIG. 23 is a sequence diagram illustrating one example of an initial registration sequence.

First, an initial registration sequence in the case where the current position of the terminal apparatus 30 is in the permitted area 302 will be described. FIG. 23 is a sequence diagram illustrating one example of the initial registration sequence. Specifically, FIG. 23 is a sequence diagram illustrating operations of the terminal apparatus 30 and the communication control apparatus 40 corresponding to the procedures of <5-1. Registration Procedure> to <5-4. Spectrum Use Notification>. Note that the current position of the terminal apparatus 30 is in the permitted area 302 in which the primary system can be secondarily used.

As illustrated in FIG. 23, in the initial registration sequence, first, the acquisition unit 441 of the communication control apparatus 40 receives a registration procedure from a communication apparatus or a terminal (hereinafter, terminal apparatus 30) in the secondary system (Step S61). Then, the control unit 44 of the communication control apparatus 40 performs <5-1. Registration Procedure> above.

Next, the acquisition unit 441 of the communication control apparatus 40 receives an available spectrum query procedure from the terminal apparatus 30 (Step S62). Then, the control unit 44 of the communication control apparatus 40 performs <5-2. Available Spectrum Query Procedure> above.

The acquisition unit 441 acquires position information of the terminal apparatus 30 and area information indicating the predicted movement area 301 where the terminal apparatus 30 is predicted to move in either of the procedures of Steps S61 and S62.

Note that the terminal apparatus 30 may designate the predicted movement area 301 where the terminal apparatus 30 is predicted to move, or the communication control apparatus 40 may designate the predicted movement area 301 based on the position information of the terminal apparatus 30 and the like. When the side of the terminal apparatus 30 designates an area, the communication control apparatus 40 may be notified of the area information in a frequency use procedure.

For example, in the case of the terminal apparatus 30 such as an FPU, in which the predicted movement area 301 to move in advance is preliminarily set, the communication control apparatus 40 may be notified of the area information set in the frequency use procedure. Furthermore, the acquisition unit 441 may acquire the area information based on the position information from the terminal apparatus 30, such as an FPU, in which the predicted movement area 301 to move in advance is preliminarily set.

Furthermore, in a case of a normal terminal apparatus 30 (e.g., other than FPU) such as a mobile phone, a movement area is not particularly limited. An area where the terminal apparatus 30 is predicted to move from the current position of the terminal apparatus 30 to all in a certain distance may be set as the predicted movement area 301.

Furthermore, the size of the predicted movement area 301 where the terminal apparatus 30 is predicted to move, that is, an area to be calculated to determine whether the terminal apparatus 30 can secondarily use the primary system may be determined in accordance with the situation of the communication control apparatus 40 or the terminal apparatus 30.

For example, the area may be determined in accordance with the computing power of the terminal apparatus 30 or the communication control apparatus 40. In one example, in the case of computing power of a predetermined value or more, a wide area is determined. In the case of computing power less than a predetermined value, a narrow area is determined. Furthermore, the area may be determined in accordance with a movement speed of the terminal apparatus 30. In one example, in the case of a movement speed of a predetermined value or more, a wide area is determined. In the case of the movement speed less than a predetermined value, a narrow area is determined. Furthermore, the area may be determined in accordance with a movement direction of the terminal apparatus 30. In one example, an area in a movement direction may be widened, and an area opposite to the movement direction may be narrowed. Furthermore, the area may be determined in accordance with a case where the terminal apparatus 30 is mounted in a moving object such as a train and a car. For example, when the terminal apparatus 30 is mounted in a moving object such as a train and a car, the terminal apparatus 30 moves on a road and a track. Thus, the area may be limited to those on a road, a track, and the like based on map information.

Next, the determination unit 442 of the communication control apparatus 40 performs spectrum grant processing in <5-3. Spectrum Grant Procedure> and area calculation (Step S63).

Specifically, the determination unit 442 determines not only whether the primary system can be secondarily used at the current position of the terminal apparatus 30 but whether the primary system can be secondarily used for the entire announced area. Then, the determination unit 442 determines the permitted area 302 and the prohibited area 303 in the predicted movement area 301.

The determination unit 442 performs area calculation for determining the permitted area 302 and the prohibited area 303 in the predicted movement area 301 as follows. For example, the determination unit 442 converts the predicted movement area 301 into a grid, and performs calculation corresponding to the above-described available spectrum evaluation processing for a calculation point representing each grid. Furthermore, when there is another terminal apparatus 30 that secondarily uses the primary system, determination unit 442 may perform calculation after fixing another terminal apparatus 30 with a parameter at the time of area calculation.

Furthermore, the determination unit 442 may recalculate an area, for example, when an aggregated interference amount greatly changes over time. Furthermore, the determination unit 442 may convert an area into a grid in accordance with the computing power of the communication control apparatus 40. For example, when the computing power of the communication control apparatus 40 is less than a predetermined value, the determination unit 442 may expand the grid of the area to reduce the calculation points.

Furthermore, the determination unit 442 may reliably protect the primary system by providing a sufficient margin for the interference power or making a change to a conservative path loss model.

Furthermore, when the predicted movement area 301 is far from the primary system and the influence on the primary system is small, the determination unit 442 may reduce the calculation points to widen a calculation area.

Furthermore, when there is no change in the state (parameter) of the primary system or another terminal apparatus 30 (e.g., variation amount of parameter is less than predetermined value) at the time of recalculating the area calculation, the determination unit 442 may merge the previous calculation result and the recalculation result.

Furthermore, the determination unit 442 may recalculate the area in the following cases.

Case where the number of terminal apparatuses 30 to be calculated is increased or decreased Case where the number, position, and state of a primary system to be protected changes Note that the area recalculation in the determination unit 442 is not required to be performed when aggregated interference is not greatly influenced. When the area recalculation is performed in the determination unit 442, communication continuation rejection or information for updating a communication parameter may be transmitted by periodic spectrum use notifications or some push notifications. Furthermore, when the area is recalculated, a determination area that is no longer available may be canceled.

Furthermore, since communication with constant transmission power is not necessarily needed in the predicted movement area 301, the determination unit 442 may adjust a transmission power amount in consideration of the control of transmission power in calculation at a calculation point. As described above, transmission power control can reduce interference power, and expand the permitted area 302 where the secondary use is permitted.

Figure 24:
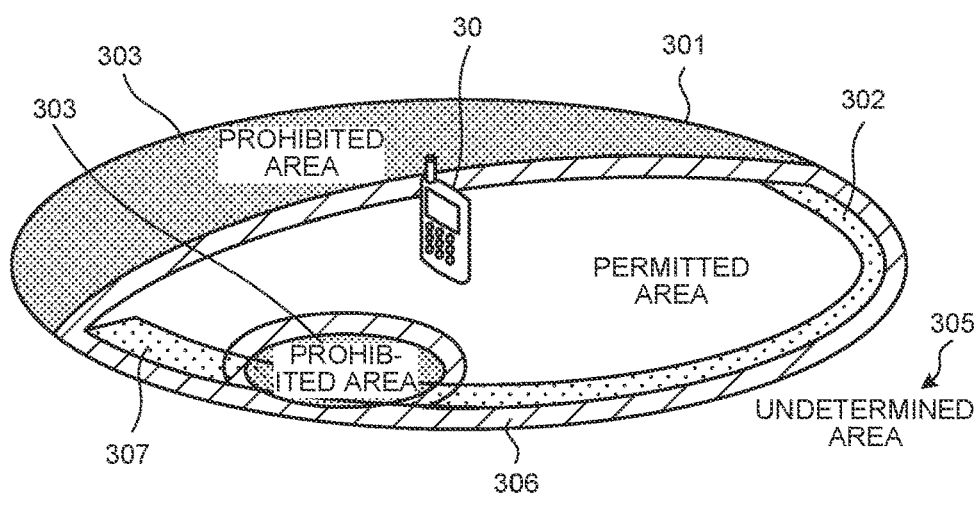
FIG. 24 is an explanatory diagram illustrating one example of area calculation.

FIG. 24 is an explanatory diagram illustrating one example of area calculation. As illustrated in FIG. 24, the determination unit 442 performs area calculation to determine the permitted area 302 and the prohibited area 303 in the predicted movement area 301. In the permitted area 302, the primary system can be secondarily used. In the prohibited area 303, the secondary use of the primary system is prohibited. Furthermore, the determination unit 442 sets an area other than the predicted movement area 301 as the undetermined area 305 that is not calculated.

Furthermore, the determination unit 442 may provide a margin area 306 by, for example, reducing the permitted area 302 close to the primary system and controlling transmission power. For example, the determination unit 442 determines a margin width (m) from the movement speed (m/s) of the terminal apparatus 30×frequency reason notification interval (second (s)). Note that the determination unit 442 may calculate the margin width based on the movement direction of the terminal apparatus 30. The determination unit 442 may calculate the margin width based on the movement speed and the movement direction of the terminal apparatus 30. Next, the determination unit 442 sets the margin area 306 at a boundary between the permitted area 302 and the undetermined area 305 or a boundary between the permitted area 302 and the prohibited area 303 based on the determined margin width.

Furthermore, the determination unit 442 may provide the recalculation area 304 for automatically performing area recalculation before the terminal apparatus 30 approaches the undetermined area 305 and communication by secondarily using the primary system is rejected.

For example, the determination unit 442 determines distance (m) to the undetermined area 305=movement speed (m/s) of the terminal apparatus 30×estimated required recalculation time (s) based on the position information and the speed information of the terminal apparatus 30. Next, the determination unit 442 sets the recalculation area 304 at a boundary between the permitted area 302 and the undetermined area 305 and the like based on the determined distance to the undetermined area 305. As described above, the recalculation area 304 is preliminarily provided, and area recalculation is performed when the terminal apparatus 30 enters the recalculation area 304. Communication by the secondary use of the primary system can be performed as continuously as possible.

Returning to FIG. 23, after Step S63, the notification unit 443 notifies the terminal apparatus 30 of a response of the spectrum grant procedure (Step S64). For example, when the permitted area 302 exists in the determined predicted movement area 301, the notification unit 443 notifies the terminal apparatus 30 that the primary system can be secondarily used by using the response of the spectrum grant procedure.

Note that, when the permitted area 302 exists in the determined predicted movement area 301 even if the current position of the terminal apparatus 30 is in the prohibited area 303, the notification unit 443 may notify the terminal apparatus 30 that the secondary use is possible. In the case, the terminal apparatus 30 comes in a suspended state, and the secondary use is made possible when the terminal apparatus 30 enters the permitted area 302 in periodic heartbeats.

Next, the terminal apparatus 30 notified that there is an area where the primary system can be secondarily used transmits a spectrum use notification to the communication control apparatus 40 for actual secondary use (Step S65).

The determination unit 442 of the communication control apparatus 40 that has received the spectrum use notification performs area determination processing, and determines whether or not the primary system can be secondarily used at the current position of the terminal apparatus 30 (Step S66). Next, the notification unit 443 transmits the determination result of the determination unit 442 to the terminal apparatus 30 as a response of the spectrum use notification (Step S67). As described above, the terminal apparatus 30 and the communication control apparatus 40 execute processing related to <5-4. Spectrum Use Notification/Heartbeat> above.

Specifically, when the current position of the terminal apparatus 30 is in the permitted area 302 (example in FIG. 23), the determination unit 442 permits communication by the secondary use of the primary system. Then, the notification unit 443 notifies the terminal apparatus 30 of the permission to start communication by the secondary use of the primary system and a communication parameter for the secondary use. Then, the control unit 34 of the terminal apparatus 30 changes communication settings based on the announced communication parameter (Step S68), and starts communication by the secondary use of the primary system (Step S69).

Furthermore, when the current position of the terminal apparatus 30 is in the prohibited area 303, the determination unit 442 does not permit communication by the secondary use of the primary system. Then, the notification unit 443 notifies the terminal apparatus 30 of non-permission of communication by the secondary use of the primary system. In the case, for example, the terminal apparatus 30 periodically transmits a spectrum use notification to the communication control apparatus 40 until entering the permitted area 302.

Furthermore, when the current position of the terminal apparatus 30 is outside a determined area (undetermined area 305), the determination unit 442 does not permit communication by the secondary use of the primary system. Then, the notification unit 443 notifies the terminal apparatus 30 of non-permission of communication by the secondary use of the primary system. In the case, for example, the terminal apparatus 30 may request a spectrum grant procedure again, and may periodically transmit a spectrum use notification to the communication control apparatus 40 until entering the permitted area 302.

Note that, after the initial registration sequence, the terminal apparatus 30 periodically gives a spectrum use notification regardless of the determination result of whether or not communication is possible.

Figure 25:
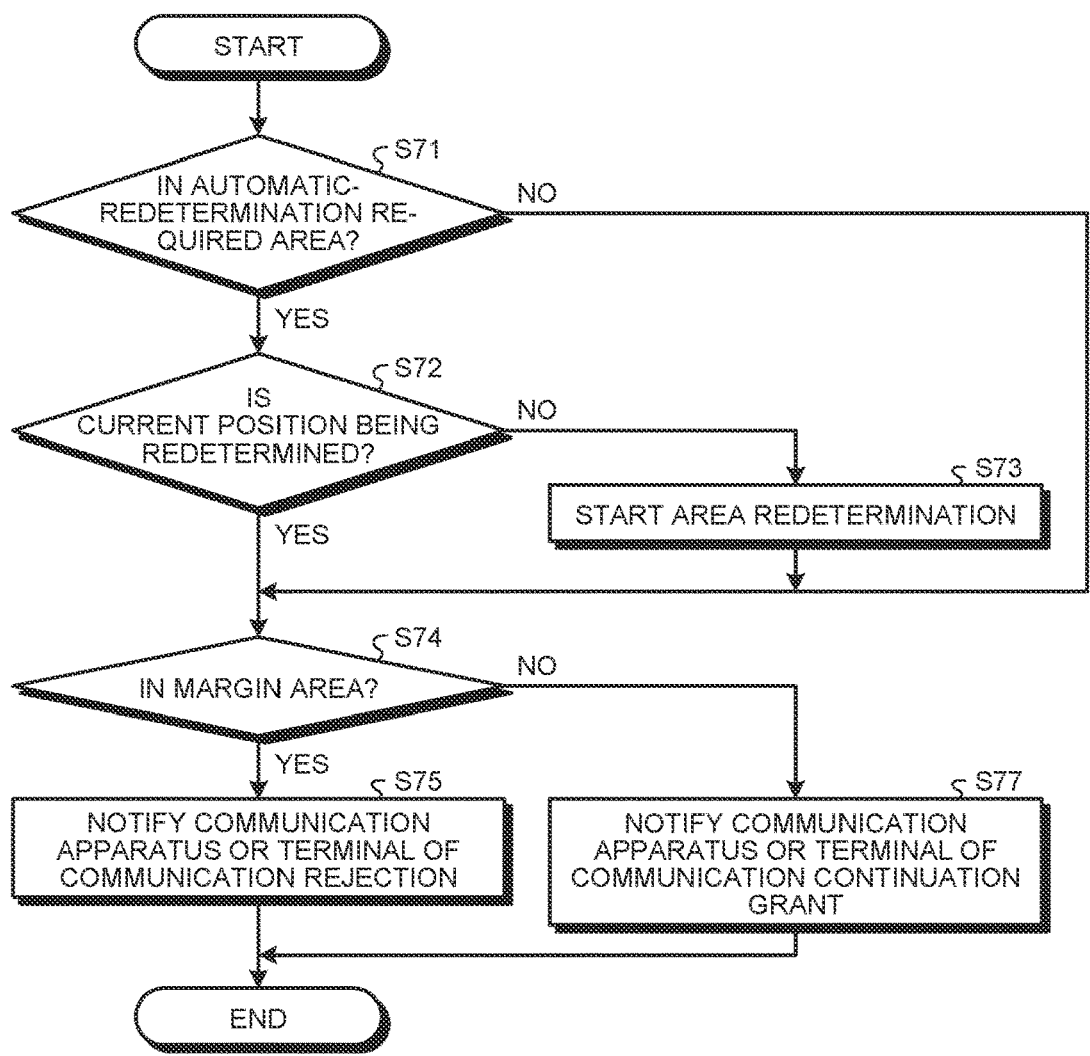
FIG. 25 is a flowchart illustrating one example of area determination processing.

FIG. 25 is a flowchart illustrating one example of the area determination processing. As illustrated in FIG. 25, when the area determination processing is started, the determination unit 442 determines whether or not the current position of the terminal apparatus 30 is in an automatic-redetermination required area (recalculation area 304) (Step S71). If the current position is not in the automatic-redetermination required area (Step S71: NO), the determination unit 442 advances the processing to Step S74.

When the current position is in the automatic-redetermination required area (Step S71: YES), the determination unit 442 determines whether or not the current position of terminal apparatus 30 is being redetermined (area calculation is being recalculated) (Step S72). When the redetermination is being performed (Step S72: YES), the determination unit 442 advances the processing to Step S74.

If the redetermination is not being performed (Step S72: NO), the determination unit 442 starts area redetermination (recalculation of area calculation) (Step S73).

Next, the determination unit 442 determines whether or not the current position of the terminal apparatus 30 is in the margin area 306 (Step S74). If the current position is in the margin area 306 (Step S74: YES), the determination unit 442 notifies the terminal apparatus 30 of communication rejection (stop of secondary use of primary system) (Step S75). If the current position is not in the margin area 306 (Step S74: NO), the determination unit 442 notifies the terminal apparatus 30 of communication continuation grant (grant of secondary use of primary system) (Step S77).

When the terminal apparatus 30 stops the secondary use of the primary system after entering the prohibited area 303 (continues secondary use immediately after entering prohibited area 303), a large amount of interference may be given to the primary system. Therefore, such a large amount of interference to the primary system can be inhibited by stopping the secondary use of the primary system at the time when the terminal apparatus 30 enters the margin area 306.

<6-2. Sequence of Determining Whether or not Communication can be Continued (when Current Position is in Permitted Area)>

Figure 26:
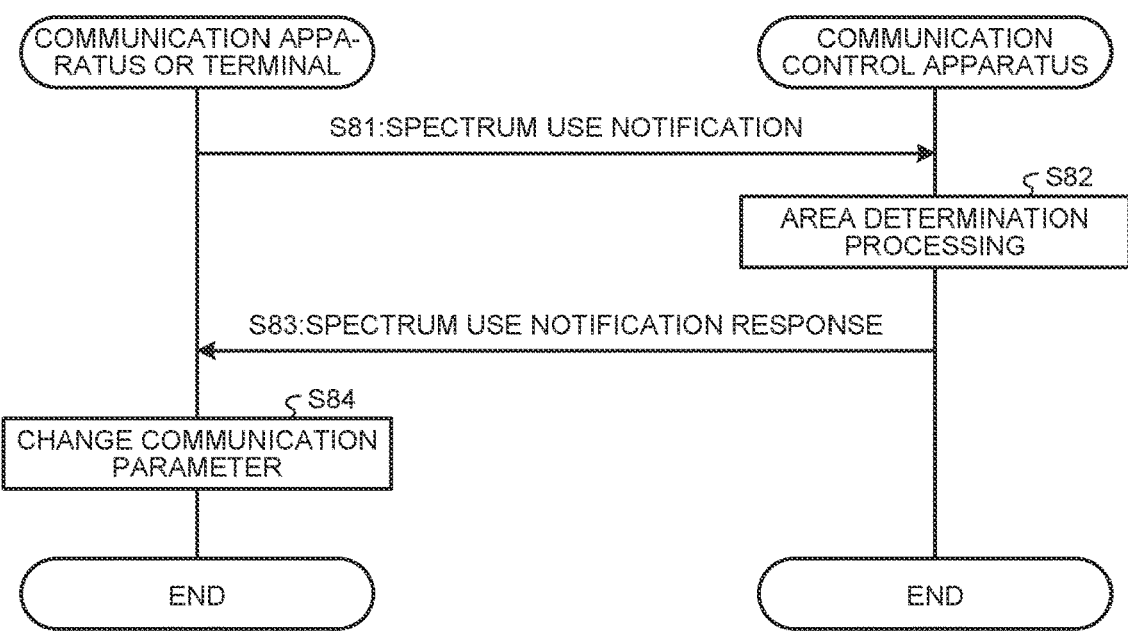
FIG. 26 is a sequence diagram illustrating one example of a sequence of determining whether or not communication can be continued.

Next, a sequence of determining whether or not communication can be continued in the case where the current position of the terminal apparatus 30 is in the permitted area 302 will be described. FIG. 26 is a sequence diagram illustrating one example of the sequence of determining whether or not communication can be continued. Note that the current position of the terminal apparatus 30 is in the permitted area 302 in which the primary system can be secondarily used.

As illustrated in FIG. 26, the terminal apparatus 30 performing communication by the secondary use of the primary system in the permitted area 302 periodically transmits a spectrum use notification to the communication control apparatus 40 in order to continue the communication (Step S81).

The determination unit 442 of the communication control apparatus 40 that has received the spectrum use notification performs area determination processing, and determines whether or not the primary system can be secondarily used at the current position of the terminal apparatus 30 (Step S82). Next, the notification unit 443 transmits the determination result of the determination unit 442 to the terminal apparatus 30 as a response of the spectrum use notification (Step S83). As described above, the terminal apparatus 30 and the communication control apparatus 40 execute processing related to <5-4. Spectrum Use Notification/Heartbeat> above.

Note that, when transmission power is controlled to protect the primary system, a recommended communication parameter may be included in a response of a spectrum use notification. Furthermore, the interval between spectrum use notifications in the terminal apparatus 30 may be dynamically controlled to be an optimum value by the communication control apparatus 40 or the terminal apparatus 30 (details will be described later). Then, the control unit 34 of the terminal apparatus 30 changes communication settings based on the announced communication parameter (Step S84), and continues communication by the secondary use of the primary system.

Note that the area determination processing in the sequence of determining whether or not communication can be continued may be similar to that of the initial registration sequence.

For example, when the current position of the terminal apparatus 30 at the time of spectrum use notification is in the permitted area 302, the terminal apparatus 30 is notified of the communication continuation grant and, if necessary, a recommended communication parameter.

Furthermore, when the current position of the terminal apparatus 30 at the time of the spectrum use notification approaches the prohibited area 303 and the undetermined area 305 (when in the margin area 306), the communication control apparatus 40 instructs the terminal apparatus 30 to immediately stop the communication by a spectrum use notification response. Even after the communication is stopped, the terminal apparatus 30 can request a communication start grant again by periodically transmitting the spectrum use notifications to the communication control apparatus 40.

As described above, the determination unit 442 provides the margin area 306 at the boundary between the permitted area 302 and the prohibited area 303 and the like, and stops communication at the time when the terminal apparatus 30 enters the margin area 306, so that a large amount of interference given to the primary system is inhibited.

Furthermore, when the current position of the terminal apparatus 30 at the time of the spectrum use notification is in the recalculation area 304, the communication control apparatus 40 can prevent communication by the secondary use of the primary system from being interrupted by the communication control apparatus 40 automatically performing area recalculation before the terminal apparatus 30 approaches the undetermined area 305 and communication is rejected.

<6-3. Sequence of Determining Whether or not Communication can be Continued (First Case where Interval Control is Performed)>

Figure 27:
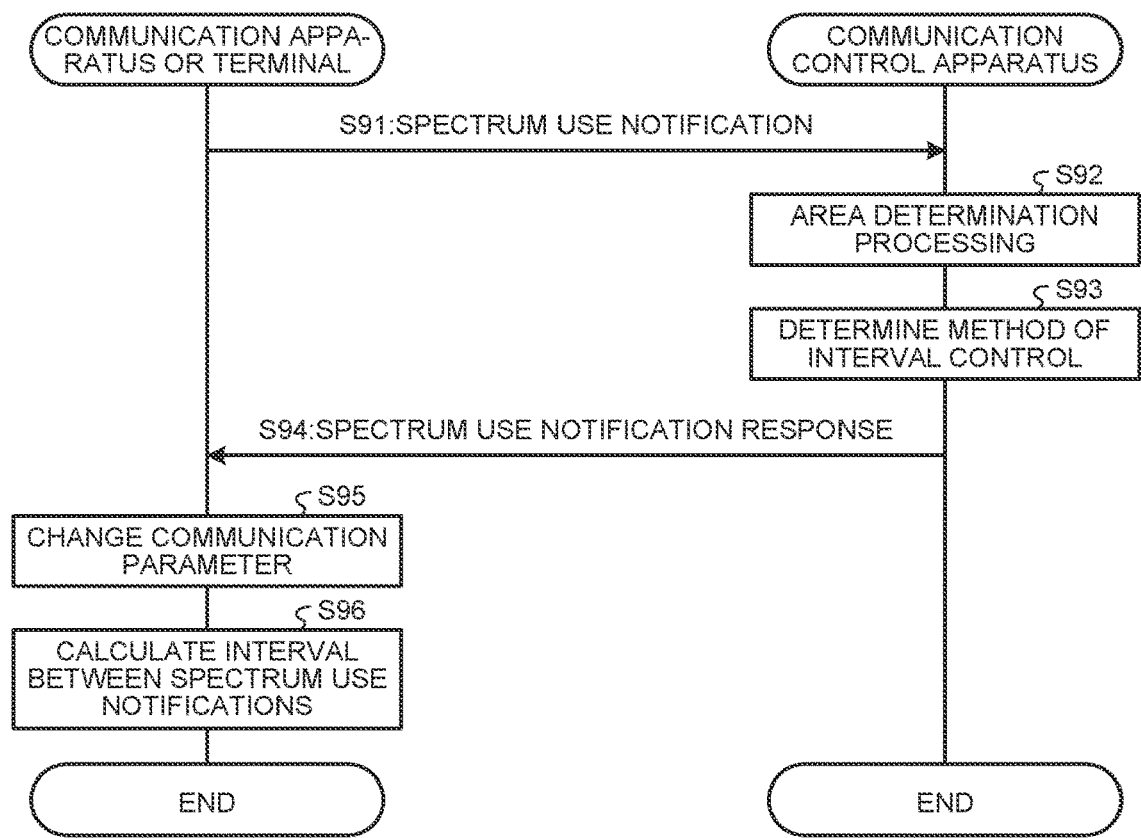
FIG. 27 is a sequence diagram illustrating one example of the sequence of determining whether or not communication can be continued.

Next, interval control in which an interval between spectrum use notifications is dynamically controlled will be described. FIG. 27 is a sequence diagram illustrating one example of the sequence of determining whether or not communication can be continued. Specifically, FIG. 27 illustrates a sequence for a first case where the communication control apparatus 40 notifies the terminal apparatus 30 of a method of interval control determined by the communication control unit 444 by a response of a spectrum use notification, and the side of the terminal apparatus 30 autonomously performs interval control.

First, dynamic control of an interval between spectrum use notifications in the communication control unit 444 will be described. For example, when the interval between spectrum use notifications is decreased, the margin area 306 set in the prohibited area 303 and the undetermined area 305 can be reduced. Furthermore, notification frequency can be reduced by increasing the interval between spectrum use notifications in a place that does not need frequent spectrum use notifications, such as a central portion of the permitted area 302. Furthermore, the communication control unit 444 may dynamically change the interval between spectrum use notifications in accordance with the movement speed of the terminal apparatus 30. Furthermore, the communication control unit 444 may dynamically change the interval between spectrum use notifications in accordance with the movement direction of the terminal apparatus 30.

As described above, in an example of the dynamic control of an interval between spectrum use notifications, the communication control unit 444 may set a long interval at the time of low-speed movement and a short interval at the time of high-speed movement based on the movement speed of the terminal apparatus 30. The communication control unit 444 may set a long interval when the terminal apparatus 30 moves away from the prohibited area 303 or the undetermined area 305, and a short interval when the terminal apparatus 30 approaches the prohibited area 303 or the undetermined area 305 based on the movement direction of the terminal apparatus 30. The communication control unit 444 may control the interval between spectrum use notifications based on the movement speed and the movement direction of the terminal apparatus 30. Furthermore, the communication control unit 444 may set a short interval when the current position of the terminal apparatus 30 is near the prohibited area 303 or the undetermined area 305. For example, the communication control unit 444 may control the interval by preliminarily preparing a mathematical expression and a table using the movement speed of the terminal apparatus 30, the distances to the prohibited area 303 and the undetermined area 305, and the like as parameters.

Furthermore, the communication control unit 444 may perform control based on two or more parameters by switching a mathematical expression or a table used for controlling an interval between spectrum use notifications by parameters. For example, in a place where the terminal apparatus 30 enters the prohibited area 303 or the undetermined area 305 even by slight movement, such as near the prohibited area 303 and the undetermined area 305, a risk of giving interference can be reduced by making a notification as frequently as possible (reducing an interval).

Furthermore, the communication control unit 444 may increase the interval when the current position of the terminal apparatus 30 is a predetermined value or more away from the primary system (when communication environment does not vary much), and may decrease the interval when the current position is close to the primary system and the communication environment varies drastically.

Specifically, as illustrated in FIG. 27, similarly in Steps S81 and S82, the communication control apparatus 40 receives a spectrum use notification from the terminal apparatus 30 (Step S91), and performs the area determination processing (Step S92). Next, the communication control unit 444 selects a mathematical expression or a table to be used for control, and determines a method of interval control based on a parameter such as the position and the movement speed of the terminal apparatus 30 (Step S93). Next, the notification unit 443 transmits the determined method of interval control (mathematical expression and table) to the terminal apparatus 30 in a response of a spectrum use notification (Step S94).

The control unit 34 of the terminal apparatus 30 changes communication settings based on a communication parameter in the spectrum use notification (Step S95), and performs communication by the secondary use of the primary system. Furthermore, the control unit 34 calculates an interval to transmit a spectrum use notification by applying the position, speed, and the like of the control unit 34 itself based on the method of interval control (mathematical expression and table) announced from the communication control apparatus 40 (Step S96). As a result, the control unit 34 makes a spectrum use notification from the next time based on the interval obtained by the calculation.

<6-4. Sequence of Determining Whether or not Communication can be Continued (Second Case where Interval Control is Performed)>

Figure 28:
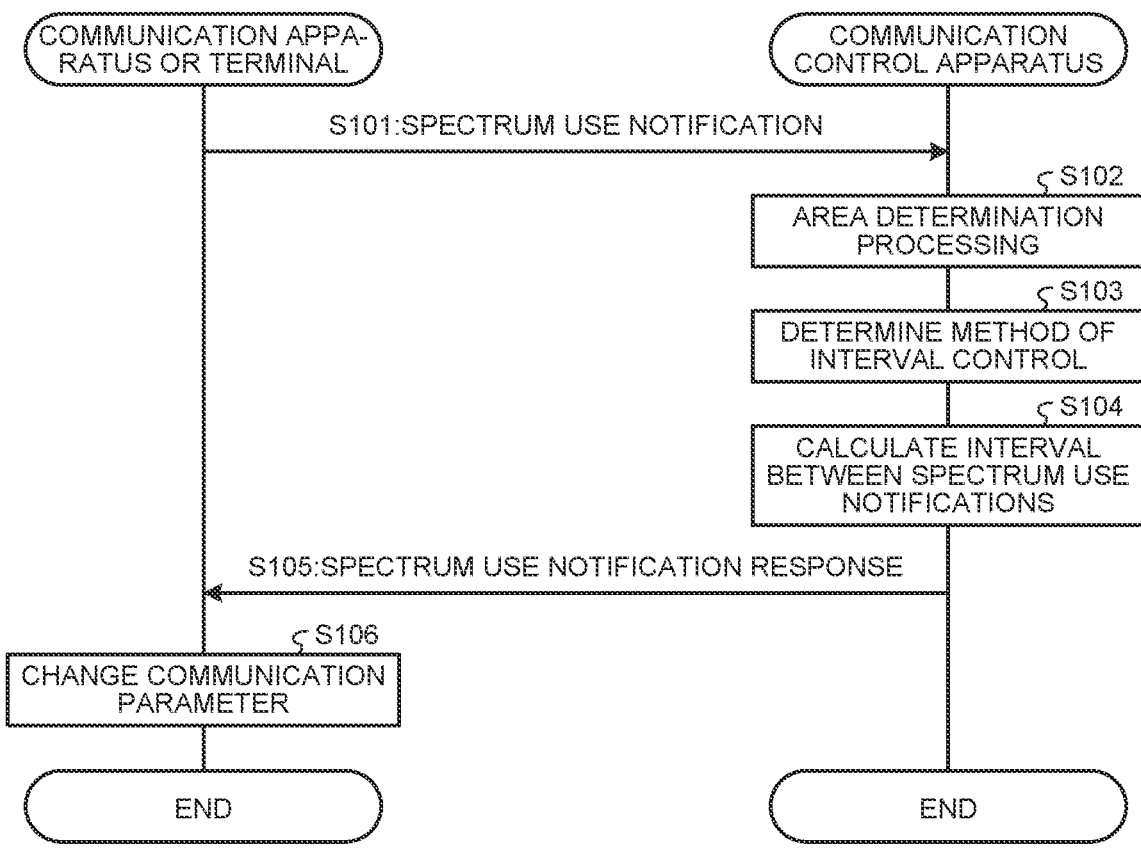
FIG. 28 is a sequence diagram illustrating one example of the sequence of determining whether or not communication can be continued.

Next, a second case will be described. In the second case, the communication control apparatus 40 controls intervals by the communication control unit 444 calculating an interval between spectrum use notifications and notifying the terminal apparatus 30 of the calculated interval in a response of the spectrum use notification. FIG. 28 is a sequence diagram illustrating one example of the sequence of determining whether or not communication can be continued, and specifically, illustrates a sequence about the second case.

As illustrated in FIG. 28, similarly in Steps S81 and S82, the communication control apparatus 40 receives a spectrum use notification from the terminal apparatus 30 (Step S101), and performs the area determination processing (Step S102). Next, the communication control unit 444 selects a mathematical expression or a table to be used for control, and determines a method of interval control based on a parameter such as the position and the movement speed of the terminal apparatus 30 (Step S103). Next, the notification unit 443 calculates an interval to transmit a spectrum use notification by using the determined method of interval control (mathematical expression and table), and transmits the calculation result to the terminal apparatus 30 in a response of a spectrum use notification (Steps S104 and S105).

The control unit 34 of the terminal apparatus 30 changes communication settings based on a communication parameter in the spectrum use notification (Step S106), and performs communication by the secondary use of the primary system. Furthermore, the control unit 34 makes a spectrum use notification from the next time based on the interval obtained in the response of the spectrum use notification.

<6-5. Sequence of Determining Whether or not Communication can be Continued (Third Case where Interval Control is Performed)>

Figure 29:
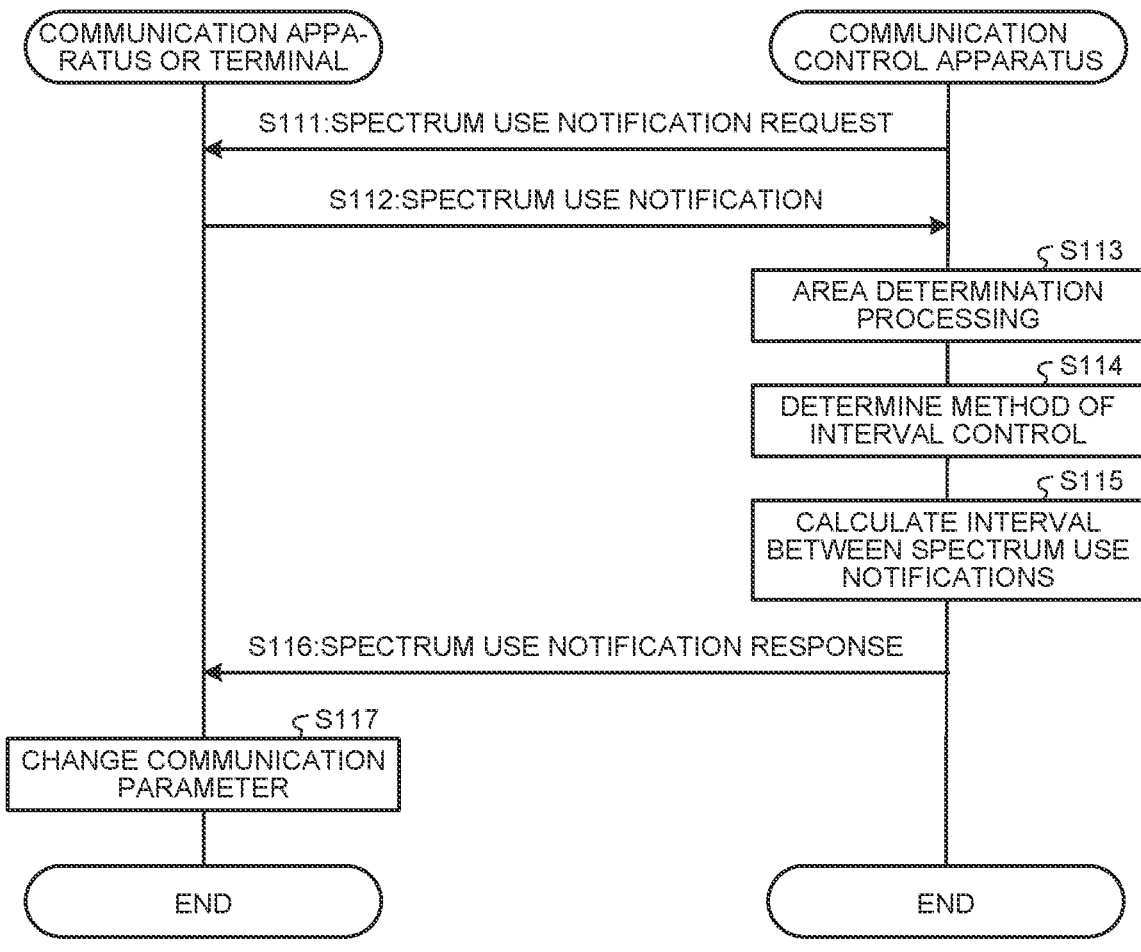
FIG. 29 is a sequence diagram illustrating one example of the sequence of determining whether or not communication can be continued.

Next, in a variation of the second case, a third case in which the side of the communication control apparatus 40 requests a frequency reason notification will be described. FIG. 29 is a sequence diagram illustrating one example of the sequence of determining whether or not communication can be continued, and specifically, illustrates a sequence about the third case.

As illustrated in FIG. 29, the notification unit 443 of the communication control apparatus 40 requests a spectrum use notification from the terminal apparatus 30 (Step S111). The terminal apparatus 30 that has received the spectrum use notification request transmits a spectrum use notification to the communication control apparatus 40 (Step S112). Thereafter, the terminal apparatus 30 and the communication control apparatus 40 perform processing similar to that in Steps S102 to S106 (Steps S113 to S117).

<6-6. Initial Registration Sequence (Variation)>

Figure 30:
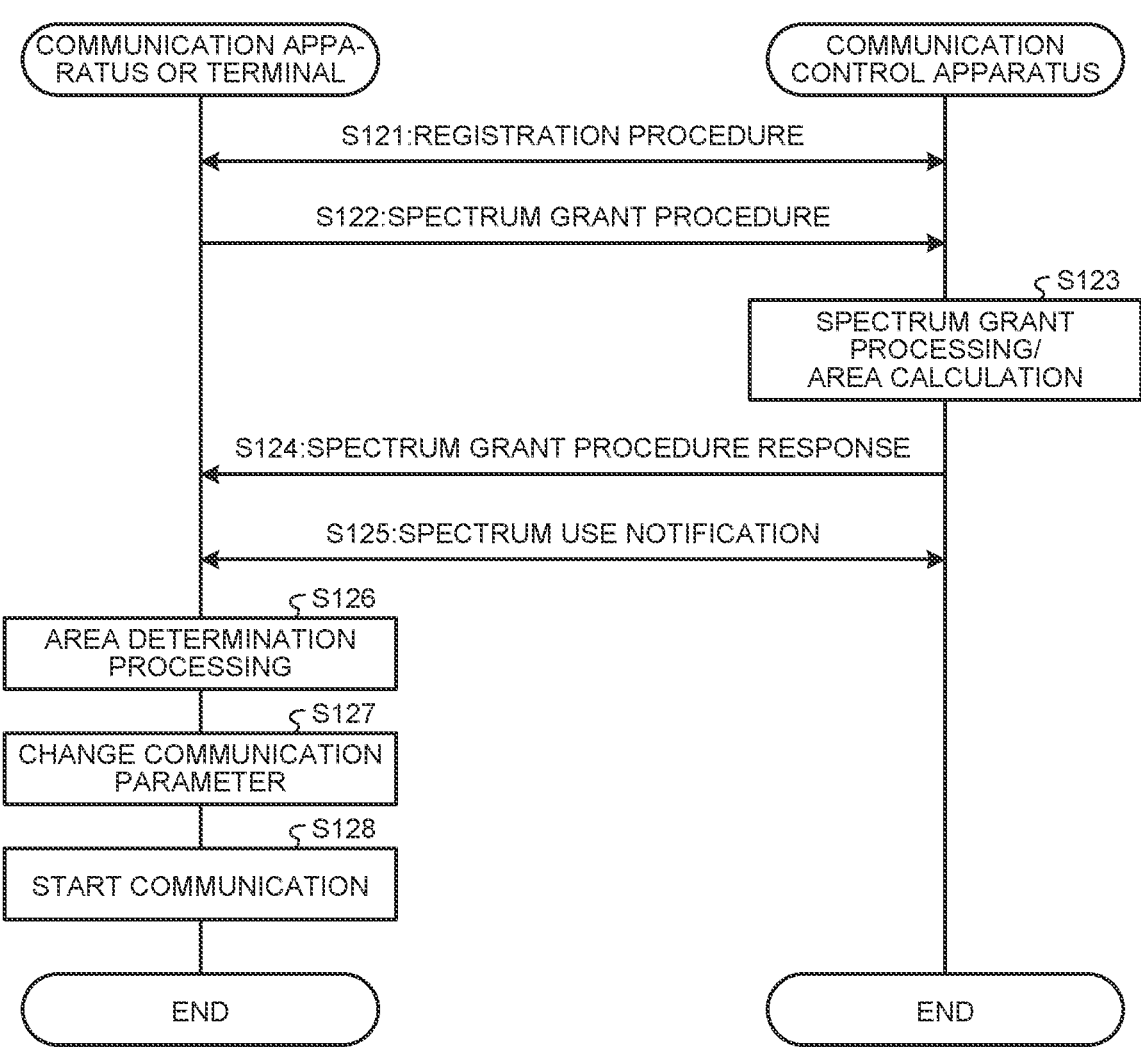
FIG. 30 is a sequence diagram illustrating one example of the initial registration sequence.

Next, a variation of the initial registration sequence will be described. FIG. 30 is a sequence diagram illustrating one example of the initial registration sequence, and illustrates a sequence of a variation of the initial registration sequence in FIG. 23.

As is clear from the comparison between FIG. 23 and FIG. 30, the variation of the initial registration sequence is different from the example in FIG. 23 in that the side of the terminal apparatus 30 performs area determination processing (Step S126).

Specifically, the notification unit 443 of the communication control apparatus 40 transmits information on the permitted area 302 and the prohibited area 303 calculated by the determination unit 442 and on parameter change necessary in the areas to the terminal apparatus 30 in a response of the spectrum use notification (Step S125). The control unit 34 of the terminal apparatus 30 autonomously performs the area determination processing with reference to the position information of the control unit 34 itself and the like based on the information transmitted in the response of the spectrum use notification (Step S126).

Note that the area determination processing is similar to the above-described processing in Step S66, and thus description thereof will be omitted. Note that the other pieces of processing (Steps S121 to S124, S127, and S128) is similar to those in Steps S61 to S64, S68, and S69 above, and thus description thereof will be omitted. As described above, the area determination may be autonomously performed by the side of the terminal apparatus 30 when the side of the terminal apparatus 30 receives the result of the area calculation performed by the determination unit 442 of the communication control apparatus 40.

7. VARIATION

The above-described embodiment is one example, and various modifications and applications are possible.

<7-1. Variation Related to System Configuration>

The communication control apparatus 40 of the embodiment is not limited to the apparatus described in the above-described embodiment. For example, the communication control apparatus 40 may have a function other than that of controlling the base station apparatus 20 that secondarily uses a frequency band in which spectrum access is performed. For example, a network manager may have the function of the communication control apparatus 40 of the embodiment. In the case, the network manager may be, for example, a centralized base band unit (C-BBU) having a network configuration called a centralized radio access network (C-RAN) or an apparatus including the C-BBU. Furthermore, a base station (including access point) may have the function of the network manager. These apparatuses (such as network manager) can also be regarded as the communication control apparatuses.

Note that, in the above-described embodiment, the communication system 1 is the first wireless system, and the base station apparatus 20 is the second wireless system. The first wireless system and the second wireless system are, however, not limited to the example. For example, the first wireless system may be a communication apparatus (e.g., wireless communication apparatus 10), and the second wireless system may be a communication system (communication system 2). Note that the wireless system described in the embodiment is not limited to a system including a plurality of apparatuses, and can be appropriately replaced with an "apparatus", a "terminal", and the like.

Furthermore, in the above-described embodiment, the communication control apparatus 40 belongs to the communication system 2, but is not necessarily required to belong to the communication system 2. The communication control apparatus 40 may be an apparatus outside the communication system 2. The communication control apparatus 40 may indirectly control the base station apparatus 20 via an apparatus constituting the communication system 2 without directly controlling the base station apparatus 20. Furthermore, a plurality of secondary systems (communication systems 2) may be provided. In the case, the communication control apparatus 40 may manage a plurality of secondary systems. In the case, each of the secondary systems can be regarded as the second wireless system.

Note that, in the spectrum access in general, an incumbent system using a target band is referred to as a primary system, and a secondary user is referred to as a secondary system. The primary system and the secondary system may be replaced with another term. A macro cell in a heterogeneous network (HetNet) may be used as a primary system, and a small cell or a relay station may be used as a secondary system. Furthermore, a base station may be used as a primary system, and relay UE or vehicle UE that implements D2D or vehicle-to-everything (V2X) existing in the coverage thereof may be used as a secondary system. The base station is not limited to a fixed type of base station, and may be a portable/mobile type of base station.

Moreover, the interface between entities may be wired/wireless. For example, the interface between the entities (communication apparatus, communication control apparatus, or terminal apparatus) described in the embodiment may be a wireless interface that does not depend on the spectrum access. Examples of the wireless interface that does not depend on the spectrum access include a wireless interface provided by a mobile communication carrier via a licensed band, wireless LAN communication using an incumbent license-exempt band, and the like.

<7-2. Other Variations>

A dedicated computer system or a general-purpose computer system may implement a control apparatus that controls the wireless communication apparatus 10, the base station apparatus 20, the terminal apparatus 30, the communication control apparatus 40, or the proxy apparatus 50 of the embodiment.

For example, a program for executing the above-described operation is stored and distributed in a computer-readable recording medium such as an optical disk, a semiconductor memory, a magnetic tape, and a flexible disk. Then, for example, the program is installed in a computer, and the above-described processing is executed to constitute a control apparatus. In the case, the control apparatus may be an apparatus (e.g., personal computer) outside the wireless communication apparatus 10, the base station apparatus 20, the terminal apparatus 30, the communication control apparatus 40, or the proxy apparatus 50. Furthermore, the control apparatus may be an apparatus (e.g., control unit 24, control unit 34, control unit 44, or control unit 54) inside the wireless communication apparatus 10, the base station apparatus 20, the terminal apparatus 30, the communication control apparatus 40, or the proxy apparatus 50.

Furthermore, the above-described communication program may be stored in a disk apparatus of a server apparatus on a network such as the Internet so that the communication program can be, for example, downloaded to a computer. Furthermore, the above-described functions may be implemented by cooperation of an operating system (OS) and application software. In the case, a portion other than the OS may be stored in a medium and distributed, or the portion other than the OS may be stored in a server apparatus so that the portion can be, for example, downloaded to a computer.

Furthermore, among pieces of processing described in the above-described embodiment, all or part of processing described as being performed automatically can be performed manually, or all or part of processing described as being performed manually can be performed automatically by a known method. In addition, the processing procedure, specific name, and information including various pieces of data and parameters in the above document and drawings can be optionally changed unless otherwise specified. For example, various pieces of information in each figure are not limited to the illustrated information.

Furthermore, each component of each illustrated apparatus is functional and conceptual, and does not necessarily need to be physically configured as described. That is, the specific form of distribution/integration of each apparatus is not limited to the illustrated form, and all or part of the apparatus can be configured in a functionally or physically distributed/integrated manner in any unit in accordance with various loads and usage situations.

Furthermore, the above-described embodiment can be appropriately combined in a region where the processing contents do not contradict each other. Furthermore, the order of steps in the sequence diagrams or the flowcharts of the embodiment can be appropriately changed.

8. CONCLUSION

As described above, according to one embodiment of the present disclosure, the communication control apparatus 40 acquires the predicted movement area 301 where the terminal apparatus 30 is predicted to move. The terminal apparatus 30 secondarily uses a predetermined frequency band (e.g., frequency band capable of being shared in frequency band allocated to communication system 1). Furthermore, the communication control apparatus 40 acquires position information of the terminal apparatus 30. Furthermore, the communication control apparatus 40 determines whether or not the terminal apparatus 30 can secondarily use the communication system 1 based on the acquired predicted movement area 301 and position information of the terminal apparatus 30. Furthermore, the communication control apparatus 40 notifies the terminal apparatus 30 of the determination of whether or not the secondary use of the communication system 1 is possible.

Then, the communication control apparatus 40 can execute efficient management of grant (e.g., allocation or stop of frequency resources to moving terminal apparatus 30). As a result, radio resources can be efficiently used.

Although the embodiment of the present disclosure has been described above, the technical scope of the present disclosure is not limited to the above-described embodiment as it is, and various modifications can be made without departing from the gist of the present disclosure. Furthermore, components of different embodiments and variations may be appropriately combined.

Furthermore, the effects in the embodiment described in the specification are merely examples and not limitations. Other effects may be exhibited.

Note that the present technology may also have the configurations as described below.

(1)

A communication control apparatus including:

an action prediction range acquisition unit that acquires movement prediction range information indicating a range where a use terminal that performs secondary use of a predetermined frequency band is predicted to move;

a position acquisition unit that acquires position information of the use terminal;

a determination unit that determines whether or not the secondary use of the use terminal is possible based on the movement prediction range information and the position information, which have been acquired; and a notification unit that notifies the use terminal of determination of whether or not the secondary use is possible.

(2)

The communication control apparatus according to (1), in which the determination unit calculates whether or not the secondary use is possible at each point, and determines a range where the secondary use is possible and a range where the secondary use is rejected in a predicted range, and when a position of the use terminal is in a range where the secondary use is possible, determines that the secondary use is possible.

(3)

The communication control apparatus according to (2), in which, when the use terminal is at a predetermined position in the predicted range, the determination unit calculates whether or not the secondary use is possible at each point.

(4)

The communication control apparatus according to (2) or (3), in which the position acquisition unit further acquires speed information of the use terminal, and the determination unit sets an interval between points or a number of points at which whether or not the secondary use is possible is calculated based on the speed information of the use terminal.

(5)

The communication control apparatus according to any one of (2) to (4), in which the determination unit sets an interval between points or a number of points at which whether or not the secondary use is possible is calculated based on a distance between a position of the use terminal and service that primarily uses a predetermined frequency band.

(6)

The communication control apparatus according to any one of (2) to (5), in which the determination unit sets a margin region with a predetermined width in a boundary between a range where the secondary use is possible and a range where the secondary use is rejected or a boundary between a range where the secondary use is possible and an outside of the predicted range, and when the position of the use terminal is in the margin region, determines to stop the secondary use.

(7)

The communication control apparatus according to (6), in which the position acquisition unit further acquires speed information of the use terminal, and the determination unit sets a width of the margin region based on the speed information of the use terminal.

(8)

The communication control apparatus according to (6), in which the position acquisition unit further acquires information on a movement direction of the use terminal, and the determination unit sets a width of the margin region based on the information on a movement direction of the use terminal.

(9)

The communication control apparatus according to any one of (1) to (8), in which the notification unit announces determination of whether or not the secondary use is possible based on a notification of whether or not the secondary use is possible from the use terminal.

(10)

The communication control apparatus according to (9), further including a communication control unit that controls an interval between notifications regarding whether or not the secondary use is possible, in which the communication control unit controls the interval based on a point for which whether or not the secondary use is possible has been determined and position information of the use terminal.

(11)

The communication control apparatus according to (10), in which the communication control unit sets the interval in accordance with a distance between a point for which rejection of the secondary use has been determined and the use terminal.

(12)

The communication control apparatus according to (10) or (11), in which the communication control unit controls the interval based on a distance between a position of the use terminal and service that primarily uses the predetermined frequency band.

(13)

The communication control apparatus according to any one of (10) to (12), in which the position acquisition unit further acquires speed information of the use terminal, and the communication control unit controls the interval based on the speed information of the use terminal, which has been acquired.

(14)

The communication control apparatus according to any one of (10) to (13), in which the position acquisition unit further acquires information on a movement direction of the use terminal, and the determination unit controls the width based on the information on a movement direction of the use terminal, which has been acquired.

(15)

The communication control apparatus according to any one of (1) to (14), in which the predicted range is set based on a speed of the use terminal.

(16)

The communication control apparatus according to any one of (1) to (14), in which the predicted range is set based on a movement direction of the use terminal.

(17)

A communication apparatus that performs secondary use of a predetermined frequency band, including:

a transmission unit that transmits information on a use mode of a frequency resource, the information including position information of the communication apparatus itself;

an acquisition unit that acquires a result of processing related to the frequency resource, the processing being performed based on information on the use mode of a frequency resource; and a wireless communication control unit that performs wireless communication based on the result of processing related to the frequency resource, the result being acquired by the acquisition unit.

(18)

A communication control method including:

acquiring movement prediction range information indicating a range where a use terminal that performs secondary use of a predetermined frequency band is predicted to move;

acquiring position information of the use terminal;

determining whether or not the secondary use of the use terminal is possible based on the movement prediction range information and the position information, which have been acquired; and notifying the use terminal of determination of whether or not the secondary use is possible.

REFERENCE SIGNS LIST 1, 2 COMMUNICATION SYSTEM
10 WIRELESS COMMUNICATION APPARATUS
20 BASE STATION APPARATUS
30 Terminal apparatus
40 Communication control apparatus
50 PROXY APPARATUS
60 FILE SERVER
21, 31, 41, 51 WIRELESS COMMUNICATION UNIT
22, 32, 42, 52 STORAGE UNIT
23, 43, 53 NETWORK COMMUNICATION UNIT
24, 34, 44, 54 CONTROL UNIT
33 INPUT/OUTPUT UNIT
211, 311 RECEPTION PROCESSING UNIT
211a WIRELESS RECEPTION UNIT
211b DEMULTIPLEXING UNIT
211c DEMODULATION UNIT
211d DECODING UNIT
212, 312 TRANSMISSION PROCESSING UNIT
212a ENCODING UNIT
212b MODULATION UNIT
212c MULTIPLEXING UNIT
212d WIRELESS TRANSMISSION UNIT
213, 313 ANTENNA
241, 441, 541 ACQUISITION UNIT
242 SETTING UNIT
243 TRANSMISSION UNIT
244 WIRELESS COMMUNICATION CONTROL UNIT
301 PREDICTED MOVEMENT AREA
302 PERMITTED AREA
303 PROHIBITED AREA
304 RECALCULATION AREA
305 UNDETERMINED AREA
306 MARGIN AREA
442 DETERMINATION UNIT
443 NOTIFICATION UNIT
444 COMMUNICATION CONTROL UNIT
542 FIRST TRANSMISSION UNIT
543 SECOND TRANSMISSION UNIT

The invention claimed is:

1. A communication control apparatus, comprising:
a range acquisition unit configured to acquire, from a communication device that performs secondary use of a frequency band, specific information associated with the communication device, wherein
  the specific information includes predicted range information of the communication device and position information of the communication device, and
  the predicted range information is associated with a three-dimensional space;
a determination unit configured to:
  determine a first area where the secondary use is rejected;
  determine, based on the specific information, a transmission power of the communication device, wherein the transmission power is associated with the secondary use of the frequency band;

determine a rejection of the secondary use based on a first position of the communication device in the first area;

set a margin region with a specific width in a first boundary that is between the first area and a second area; and determine, to stop the secondary use, based on a third position of the communication device that is in the margin region; and a notification unit configured to:

transmit, to the communication device, a first notification associated with the determined transmission power; and transmit, to the communication device, a second notification associated with the rejection of the secondary use.

2. The communication control apparatus according to claim 1, wherein the determination unit is further configured to determine the second area where the secondary use is accepted, the second area is in a specific range of the communication device, the specific range includes a plurality of points, and the determination unit is further configured to determine an acceptance of the secondary use based on a second position of the communication device in the second area.

3. The communication control apparatus according to claim 2, wherein the determination unit is further configured to determine, based on the communication device being at the second position, one of the rejection of the secondary use at each of the plurality of points or the acceptance of the secondary use at each of the plurality of points.

4. The communication control apparatus according to claim 2, wherein the range acquisition unit is further configured to acquire speed information of the communication device, the determination unit is further configured to set one of an interval between a number of points of the plurality of points, based on the speed information of the communication device, and the acceptance of the secondary use is at the number of points of the plurality of points.

5. The communication control apparatus according to claim 2, wherein the determination unit is further configured to:

set one of an interval between a number of points of the plurality of points, based on a distance between a fourth position of the communication device and a system associated with the frequency band, the acceptance of the secondary use is at the number of points of the plurality of points, and the fourth position is in one of the first area or the second area.

6. The communication control apparatus according to claim 1, wherein the range acquisition unit is further configured to acquire speed information of the communication device, and the determination unit is further configured to set a width of the margin region based on the speed information of the communication device.

7. The communication control apparatus according to claim 1, wherein the specific information includes a movement direction of the communication device, and the determination unit is further configured to set a width of the margin region based on the movement direction.

8. The communication control apparatus according to claim 1, wherein the determination unit is further configured to receive a third notification from the communication device, the third notification is associated with an acceptance of the secondary use by the communication device, and the notification unit is further configured to announce determination of the acceptance of the secondary use is based on the third notification.

9. The communication control apparatus according to claim 8, further comprising a communication control unit configured to:

control an interval between notifications associated with one of the rejection of the secondary use or the acceptance of the secondary use; and control the interval based on a first point for which the secondary use is accepted, and the position information of the communication device.

10. The communication control apparatus according to claim 9, wherein the communication control unit is further configured to set the interval based on a distance between a second point and the communication device, and the second point is associated with the rejection of the secondary use.

11. The communication control apparatus according to claim 9, wherein the communication control unit is further configured to control the interval based on a distance between a second position of the communication device and a system, and the system is associated with the frequency band.

12. The communication control apparatus according to claim 9, wherein the range acquisition unit is further configured to acquire speed information of the communication device, and the communication control unit is further configured to control the interval based on the speed information of the communication device.

13. The communication control apparatus according to claim 9, wherein the specific information includes a movement direction of the communication device, and the determination unit is further configured to control the interval based on the movement direction.

14. The communication control apparatus according to claim 2, wherein the determination unit is further configured to set the specific range based on a speed of the communication device.

15. The communication control apparatus according to claim 2, wherein the determination unit is further configured to set the specific range based on a movement direction of the communication device.

16. The communication control apparatus according to claim 1, wherein the determination unit is further configured to:

determine a number of systems in a plurality of systems, positions of each of the plurality of systems, and states of each of the plurality of systems;

determine a first calculation based on at least one of the number of systems in the plurality of systems, the positions of each of the plurality of systems, or the states of each of the plurality of systems, wherein the first calculation is associated with the first area;

determine a change in at least one of the number of systems in the plurality of systems, the positions of each of the plurality of systems, or the states of each of the plurality of systems; and determine, based on the determined change, a second calculation associated with the first area.

17. The communication control apparatus according to claim 16, wherein the determination unit is further configured to:

merge the first calculation and the second calculation; and determine a third calculation based on the merge of the first calculation and the second calculation.

18. A communication control method, comprising:

acquiring, from a communication device that performs secondary use of a frequency band, information associated with the communication device, wherein the information includes predicted range information of the communication device and position information of the communication device, and the predicted range information is associated with a three-dimensional space;

determining a first area where the secondary use is rejected;

determining, based on the information, a transmission power of the communication device, wherein the transmission power is associated with the secondary use of the frequency band;

determining a rejection of the secondary use based on a position of the communication device in the first area;

setting a margin region with a specific width in a first boundary that is between the first area and a second area;

determining, to stop the secondary use, based on a third position of the communication device is in the margin region;

transmitting, to the communication device, a first notification associated with the determined transmission power; and transmitting, to the communication device, a second notification associated with the rejection of the secondary use.

19. The communication control apparatus according to claim 2, wherein the specific range is at least one of geographical range or a three-dimensional space range.

* * * * *